(12) United States Patent
Sasaki et al.

(10) Patent No.: US 10,237,141 B2
(45) Date of Patent: Mar. 19, 2019

(54) METHOD FOR CONTROLLING INFORMATION APPARATUS AND COMPUTER-READABLE RECORDING MEDIUM

(71) Applicant: PANASONIC INTELLECTUAL PROPERTY CORPORATION OF AMERICA, Torrance, CA (US)

(72) Inventors: Takamitsu Sasaki, Osaka (JP); Kohei Tahara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 92 days.

(21) Appl. No.: 14/453,767

(22) Filed: Aug. 7, 2014

(65) Prior Publication Data
US 2015/0033136 A1 Jan. 29, 2015

Related U.S. Application Data

(63) Continuation of application No. PCT/JP2013/006592, filed on Nov. 8, 2013.
(Continued)

(51) Int. Cl.
*G08C 17/02* (2006.01)
*H04L 12/24* (2006.01)
(Continued)

(52) U.S. Cl.
CPC .......... *H04L 41/22* (2013.01); *G06F 3/0482* (2013.01); *G06F 3/04817* (2013.01);
(Continued)

(58) Field of Classification Search
CPC .................. H04L 12/2803–12/2838; H04L 2012/284–2012/285;
(Continued)

(56) References Cited

U.S. PATENT DOCUMENTS 5,475,364 A * 12/1995 Kenet .................. G08B 19/005
340/522
6,600,499 B1 7/2003 MacPhail
(Continued)

FOREIGN PATENT DOCUMENTS

CN 1989479 6/2007
CN 101110011 1/2008
(Continued)

OTHER PUBLICATIONS

Tech-HomeSolutions. "Home Automation and Control Part 1 (Lighting, HVAC and Whole Home Audio)." YouTube. YouTube, Mar. 8, 2011. Web. Jul. 15, 2016. <https://www.youtube.com/watch?v=KcMEXX1nSio>.*
(Continued)

*Primary Examiner* — Jennifer N To
*Assistant Examiner* — Liang Y Li
(74) *Attorney, Agent, or Firm* — Greenblum & Bernstein, P.L.C.

(57) ABSTRACT

A method of the present disclosure causes a computer of an information apparatus to: display device type icons on a display; display room icons on the display; when it is determined that selection of any one of the device type icons is detected, display room icons each representing a room, in which a target device of a type corresponding to the selected device type icon is installed, in a different display mode from a mode for room icons each representing a room in which the target device of the type is not installed; when it is determined that selection of a room icon displayed in the different display mode is detected, display a first operation screen for operating a controlled target device on the display; and output a control command for controlling the controlled target device to the network based on an operation on the first operation screen.

6 Claims, 55 Drawing Sheets

Related U.S. Application Data

(60) Provisional application No. 61/881,589, filed on Sep. 24, 2013, provisional application No. 61/856,238, filed on Jul. 19, 2013, provisional application No. 61/766,854, filed on Feb. 20, 2013.

(51) Int. Cl.
  *G06F 3/0481* (2013.01)
  *G06F 3/0482* (2013.01)

(52) U.S. Cl.
  CPC ......... *G08C 17/02* (2013.01); *G08C 2201/30* (2013.01); *G08C 2201/93* (2013.01)

(58) Field of Classification Search
  CPC ...... G05B 19/418–19/41895; G06F 17/30126; G06F 17/30554; G06F 17/30572; G06F 17/30601; G06F 17/30643; G06F 17/30651; G06F 17/30696; G06F 17/30713; G06F 17/30716; G06F 17/30973; G06F 17/30991; G06F 17/30994; G06F 3/048–3/04897; G08C 2201/30–2201/34
  See application file for complete search history.

(56) References Cited

U.S. PATENT DOCUMENTS

| | | | |
|---|---|---|---|
| 6,756,998 B1 | 6/2004 | Bilger | |
| 6,792,319 B1 | 9/2004 | Bilger | |
| 6,912,429 B1 | 6/2005 | Bilger | |
| 7,571,014 B1* | 8/2009 | Lambourne | H04R 27/00 700/94 |
| 7,730,223 B1 | 6/2010 | Bavor et al. | |
| 8,560,580 B1* | 10/2013 | Nacey | G06F 19/327 707/607 |
| 8,947,437 B2* | 2/2015 | Garr | G06T 11/206 345/440 |
| 2001/0030597 A1 | 10/2001 | Inoue et al. | |
| 2001/0038392 A1 | 11/2001 | Humpleman et al. | |
| 2002/0158919 A1 | 10/2002 | Nacey | |
| 2003/0038730 A1 | 2/2003 | Imafuku et al. | |
| 2003/0050737 A1 | 3/2003 | Osann, Jr. | |
| 2004/0059815 A1 | 3/2004 | Buckingham et al. | |
| 2004/0063405 A1 | 4/2004 | Song | |
| 2004/0148632 A1 | 7/2004 | Park et al. | |
| 2005/0097478 A1* | 5/2005 | Killian | G06F 3/0481 715/851 |
| 2005/0131991 A1 | 6/2005 | Ogawa et al. | |
| 2005/0154574 A1 | 7/2005 | Takemura et al. | |
| 2005/0210395 A1 | 9/2005 | Wakita et al. | |
| 2006/0052884 A1 | 3/2006 | Staples et al. | |
| 2006/0101338 A1* | 5/2006 | Kates | H04N 5/4403 715/716 |
| 2006/0277486 A1* | 12/2006 | Skinner | G06F 3/0481 715/772 |
| 2007/0080940 A1 | 4/2007 | Aoki et al. | |
| 2007/0171091 A1 | 7/2007 | Nisenboim et al. | |
| 2007/0197236 A1 | 8/2007 | Ahn et al. | |
| 2007/0219645 A1 | 9/2007 | Thomas et al. | |
| 2007/0223048 A1 | 9/2007 | Misawa et al. | |
| 2007/0233323 A1 | 10/2007 | Wiemeyer et al. | |
| 2008/0062167 A1 | 3/2008 | Boggs et al. | |
| 2008/0141172 A1 | 6/2008 | Yamamoto et al. | |
| 2008/0180228 A1 | 7/2008 | Wakefield et al. | |
| 2008/0306985 A1 | 12/2008 | Murray et al. | |
| 2008/0316730 A1 | 12/2008 | Diederiks et al. | |
| 2009/0089694 A1 | 4/2009 | Mori | |
| 2009/0243852 A1 | 10/2009 | Haupt et al. | |
| 2010/0122215 A1* | 5/2010 | MacGregor | G06F 3/0482 715/834 |
| 2010/0205528 A1 | 8/2010 | Bavor et al. | |
| 2010/0275139 A1 | 10/2010 | Hammack et al. | |
| 2010/0312366 A1* | 12/2010 | Madonna | H05B 37/0245 700/90 |
| 2011/0031897 A1 | 2/2011 | Henig et al. | |
| 2011/0072373 A1 | 3/2011 | Yuki | |
| 2011/0088000 A1* | 4/2011 | Mackay | G06T 19/00 715/853 |
| 2011/0106279 A1 | 5/2011 | Cho et al. | |
| 2011/0289427 A1 | 11/2011 | Toprani | |
| 2011/0301722 A1 | 12/2011 | Sato et al. | |
| 2012/0001567 A1 | 1/2012 | Knapp et al. | |
| 2012/0064887 A1 | 3/2012 | Shobatake | |
| 2012/0130513 A1 | 5/2012 | Hao et al. | |
| 2012/0242500 A1 | 9/2012 | Hirose | |
| 2012/0253818 A1 | 10/2012 | Owada | |
| 2012/0266095 A1 | 10/2012 | Killian et al. | |
| 2012/0291068 A1 | 11/2012 | Khushoo et al. | |
| 2012/0324366 A1* | 12/2012 | Latvakoski | H04L 12/2814 715/740 |
| 2013/0057395 A1 | 3/2013 | Ohashi | |
| 2013/0094667 A1 | 4/2013 | Millington et al. | |
| 2013/0111384 A1* | 5/2013 | Kim | G06F 3/048 715/765 |
| 2013/0111410 A1* | 5/2013 | Okada | G06F 3/0482 715/841 |
| 2013/0113822 A1 | 5/2013 | Putrevu et al. | |
| 2013/0247117 A1 | 9/2013 | Yamada et al. | |
| 2014/0040831 A1 | 2/2014 | Akasaka et al. | |
| 2014/0043791 A1 | 2/2014 | Diederiks et al. | |
| 2014/0089859 A1 | 3/2014 | Ishizaka | |
| 2014/0095654 A1 | 4/2014 | Finnerty et al. | |
| 2014/0164966 A1 | 6/2014 | Kim et al. | |
| 2014/0167929 A1 | 6/2014 | Shim et al. | |
| 2014/0167931 A1 | 6/2014 | Lee et al. | |
| 2014/0169274 A1 | 6/2014 | Kweon et al. | |
| 2014/0180968 A1 | 6/2014 | Song et al. | |
| 2014/0188299 A1 | 7/2014 | Odakura | |
| 2014/0208214 A1 | 7/2014 | Stern | |
| 2014/0236325 A1 | 8/2014 | Sasaki et al. | |
| 2014/0236358 A1 | 8/2014 | Sasaki et al. | |
| 2014/0277619 A1* | 9/2014 | Nixon | G05B 15/02 700/83 |
| 2015/0039100 A1 | 2/2015 | Yoshida et al. | |
| 2015/0082225 A1 | 3/2015 | Shearer | |
| 2016/0139752 A1* | 5/2016 | Shim | G06F 3/0483 715/771 |
| 2017/0185278 A1* | 6/2017 | Sundermeyer | G06F 3/04847 |

FOREIGN PATENT DOCUMENTS

| | | |
|---|---|---|
| CN | 101389384 | 3/2009 |
| EP | 0341022 | 11/1989 |
| JP | 4-175921 | 6/1992 |
| JP | 5-83764 | 4/1993 |
| JP | 2000-138979 | 5/2000 |
| JP | 2001-92762 | 4/2001 |
| JP | 2002-300680 | 10/2002 |
| JP | 2002-318843 | 10/2002 |
| JP | 2003-52093 | 2/2003 |
| JP | 2003-85356 | 3/2003 |
| JP | 2004-21522 | 1/2004 |
| JP | 2005-198252 | 7/2005 |
| JP | 2005-310022 | 11/2005 |
| JP | 2007-104567 | 4/2007 |
| JP | 2007-259329 | 10/2007 |
| JP | 2008-175783 | 7/2008 |
| JP | 2009-213107 | 9/2009 |
| JP | 2010-145169 | 7/2010 |
| JP | 2010-206569 | 9/2010 |
| JP | 2011-118750 | 6/2011 |
| JP | 2011-120428 | 6/2011 |
| JP | 2011-187080 | 9/2011 |
| JP | 2012-231249 | 11/2012 |

(56) References Cited

FOREIGN PATENT DOCUMENTS

| JP | 5128489 | 1/2013 |
|---|---|---|
| JP | 2013-70326 | 4/2013 |

OTHER PUBLICATIONS

Office Action from U.S. Patent and Trademark Office (USPTO) in U.S. Appl. No. 14/462,609, dated Jun. 30, 2016.
U.S. Appl. No. 14/482,453 to Takamitsu Sasaki et al., filed Sep. 10, 2014.
U.S. Appl. No. 14/462,614 to Takamitsu Sasaki et al., filed Aug. 19, 2014.
U.S. Appl. No. 14/325,755 to Takamitsu Sasaki et al., filed Jul. 8, 2014.
U.S. Appl. No. 14/487,438 to Takamitsu Sasaki et al., filed Sep. 16, 2014.
U.S. Appl. No. 14/462,609 to Takamitsu Sasaki et al., filed Aug. 19, 2014.
U.S. Appl. No. 14/487,431 to Takamitsu Sasaki et al., filed Sep. 16, 2014.
U.S. Appl. No. 14/282,514 to Takamitsu Sasaki et al., filed May 20, 2014.
U.S. Appl. No. 14/482,440 to Takamitsu Sasaki et al., filed Sep. 10, 2014.
U.S. Appl. No. 14/482,391 to Takamitsu Sasaki et al., filed Sep. 10, 2014.
U.S. Appl. No. 14/482,404 to Takamitsu Sasaki et al., filed Sep. 10, 2014.
U.S. Appl. No. 14/482,424 to Takamitsu Sasaki et al., filed Sep. 10, 2014.
International Search Report, dated Jul. 2, 2013 for Application No. PCT/JP2013/002197.
International Search Report, dated Jan. 14, 2014 for Application No. PCT/JP2013/006183.
International Search Report, dated Jan. 21, 2014 for Application No. PCT/JP2013/006348.
International Search Report, dated Feb. 18, 2014 for Application No. PCT/JP2013/006466.
International Search Report, dated May 20, 2014 for Application No. PCT/JP2014/00864.
International Search Report, dated Jan. 28, 2014 for Application No. PCT/JP2013/006592.
Office Action from U.S. Patent and Trademark Office (USPTO) in U.S. Appl. No. 14/165,728, dated Mar. 11, 2016.
Office Action from U.S. Patent and Trademark Office (USPTO) in U.S. Appl. No. 14/462,609, dated Oct. 6, 2017.
Office Action from U.S. Patent and Trademark Office (USPTO) in U.S. Appl. No. 14/674,600, dated Nov. 28, 2017.
*Ex parte McAward*, PTAB Appeal No. 2015-006416, (PTAB Aug. 2017) (precedential) (available at http://www.uspto.gov/sites/default/files/documents/Ex%20parte%20McAward%202017_08_25.pdf).
Office Action from U.S. Patent and Trademark Office (USPTO) in U.S. Appl. No. 14/325,755, dated Jul. 28, 2017.
Office Action from U.S. Patent and Trademark Office (USPTO) in U.S. Appl. No. 14/462,609, dated Jun. 29, 2017.
Office Action from United States Patent and Trademark Office (USPTO) in U.S. Appl. No. 14/674,600, dated Jul. 9, 2018.

\* cited by examiner

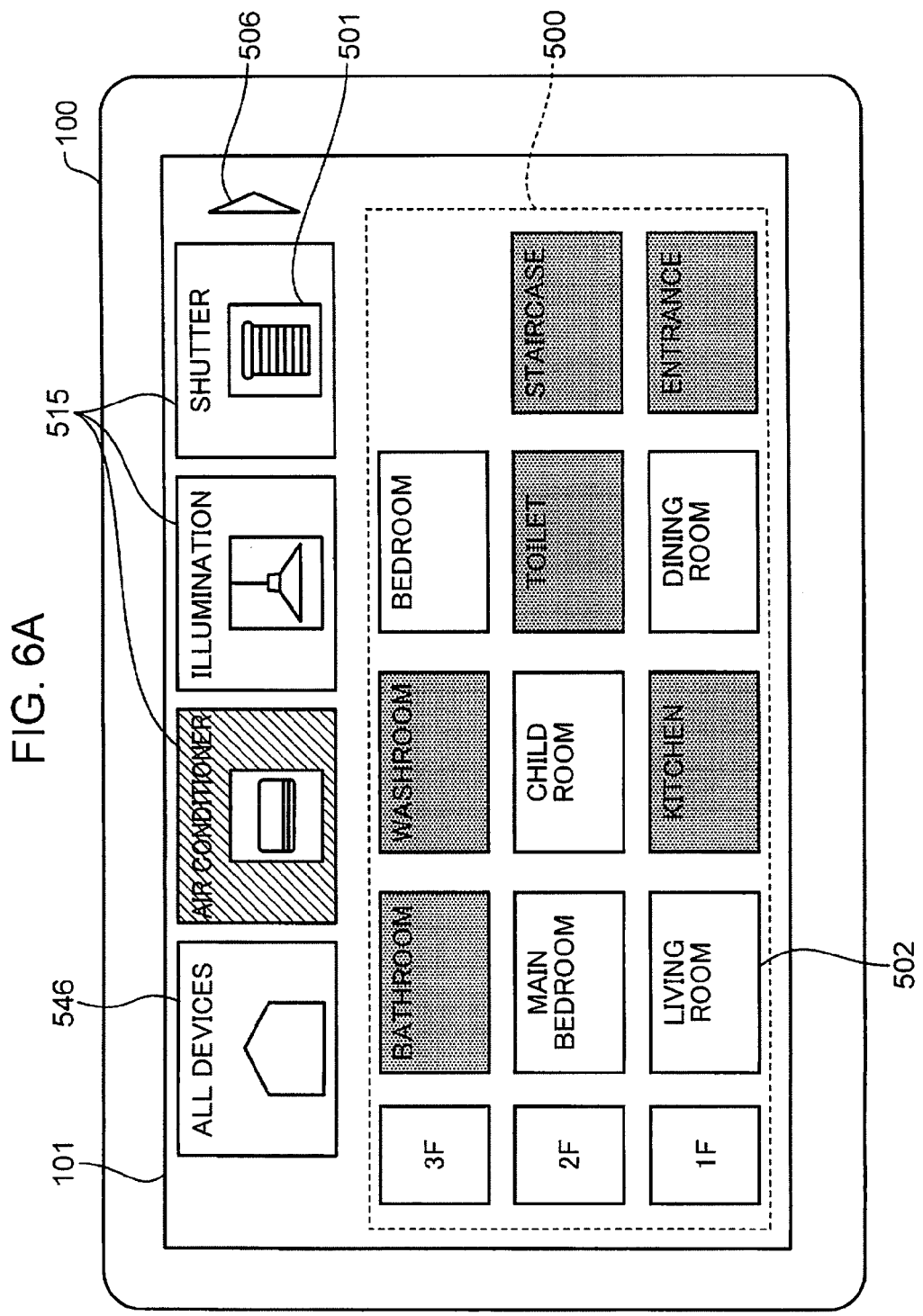

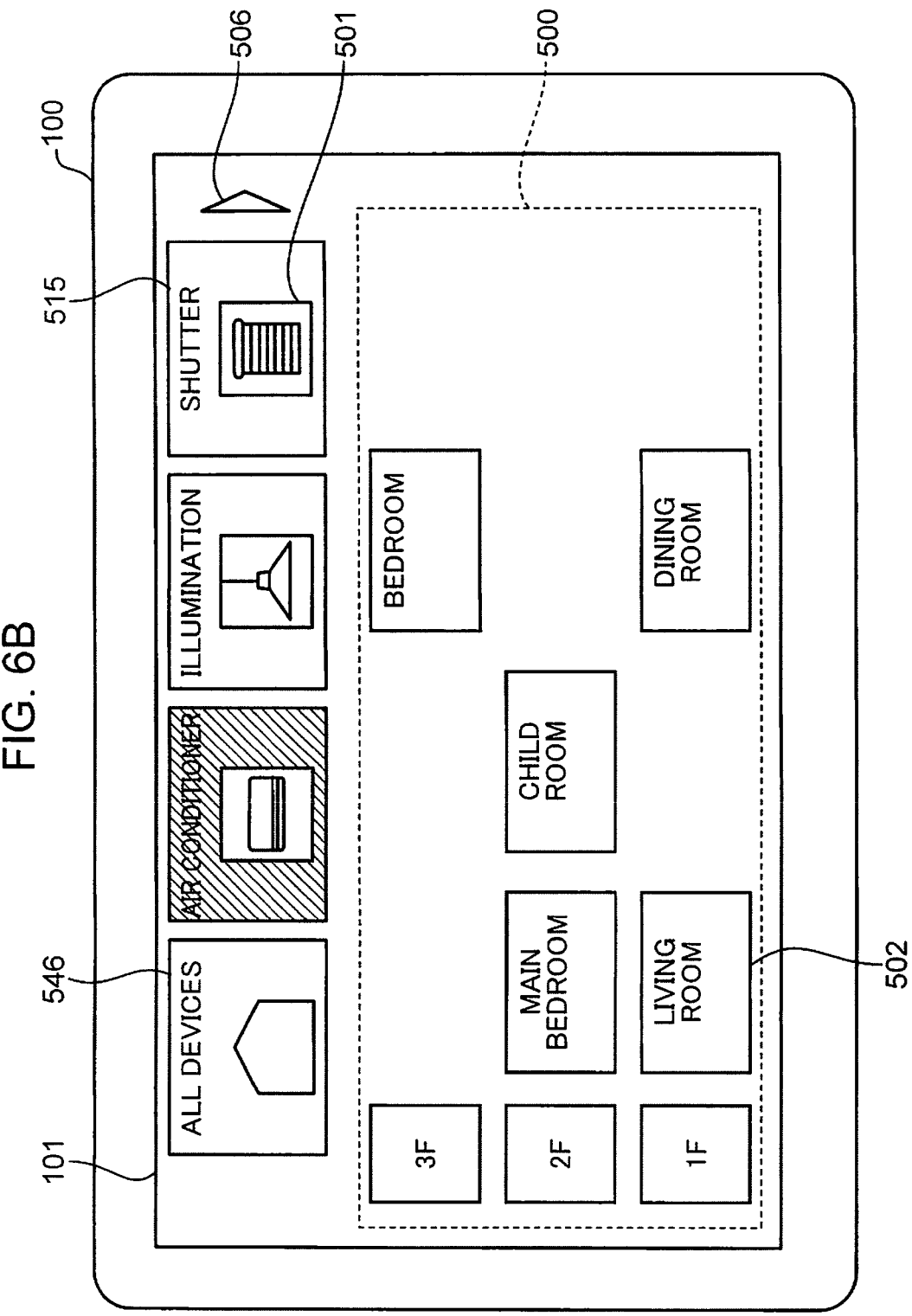

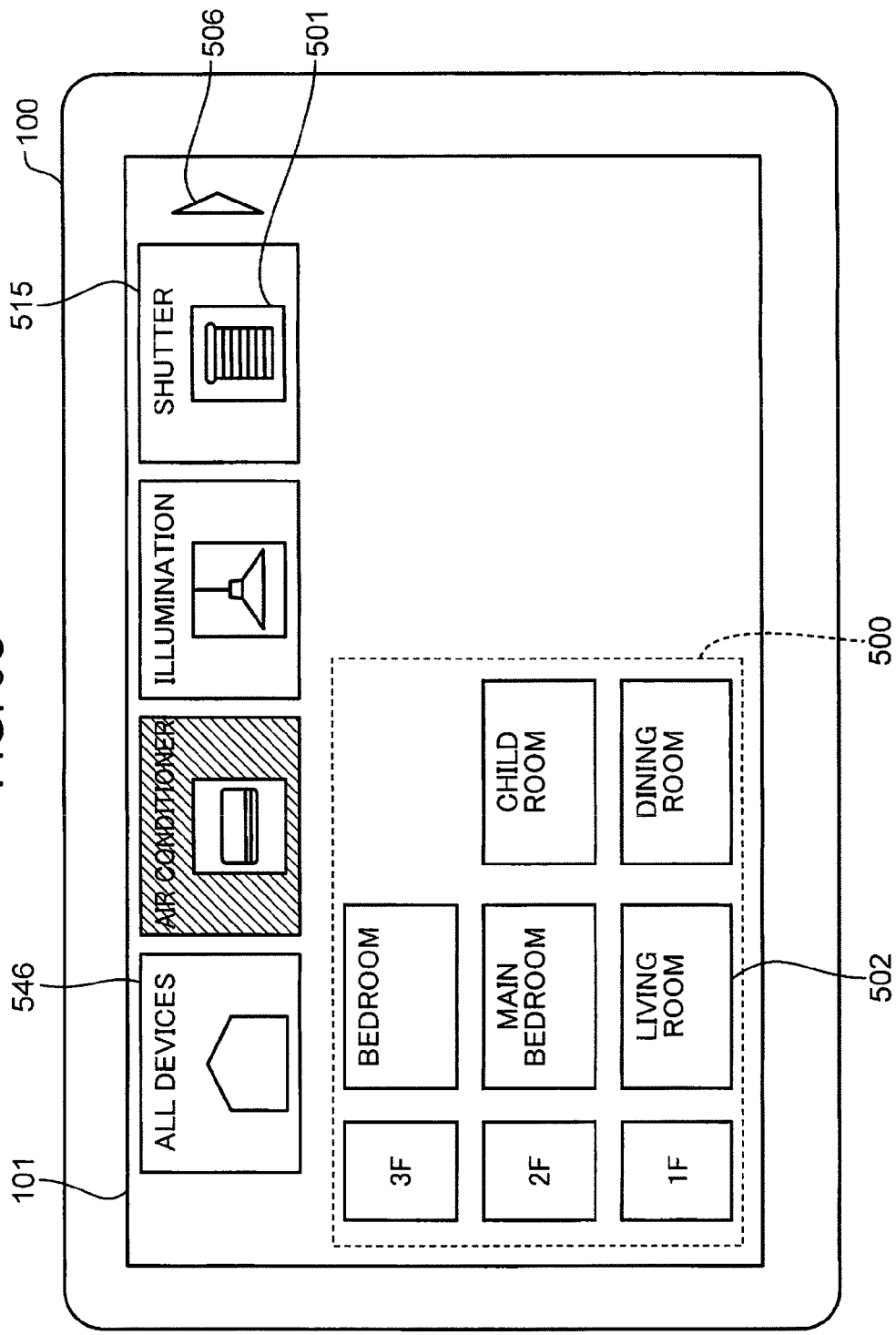

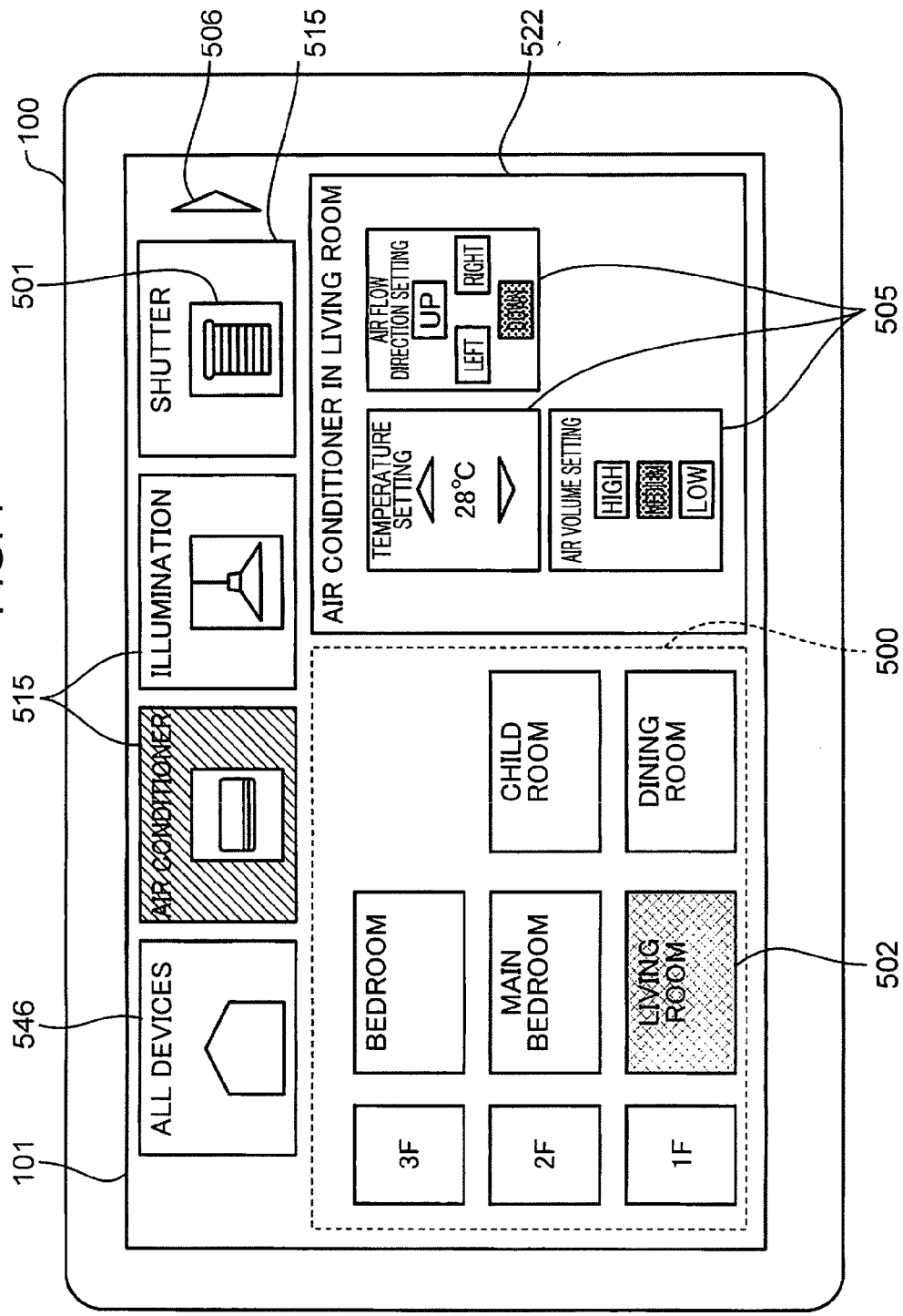

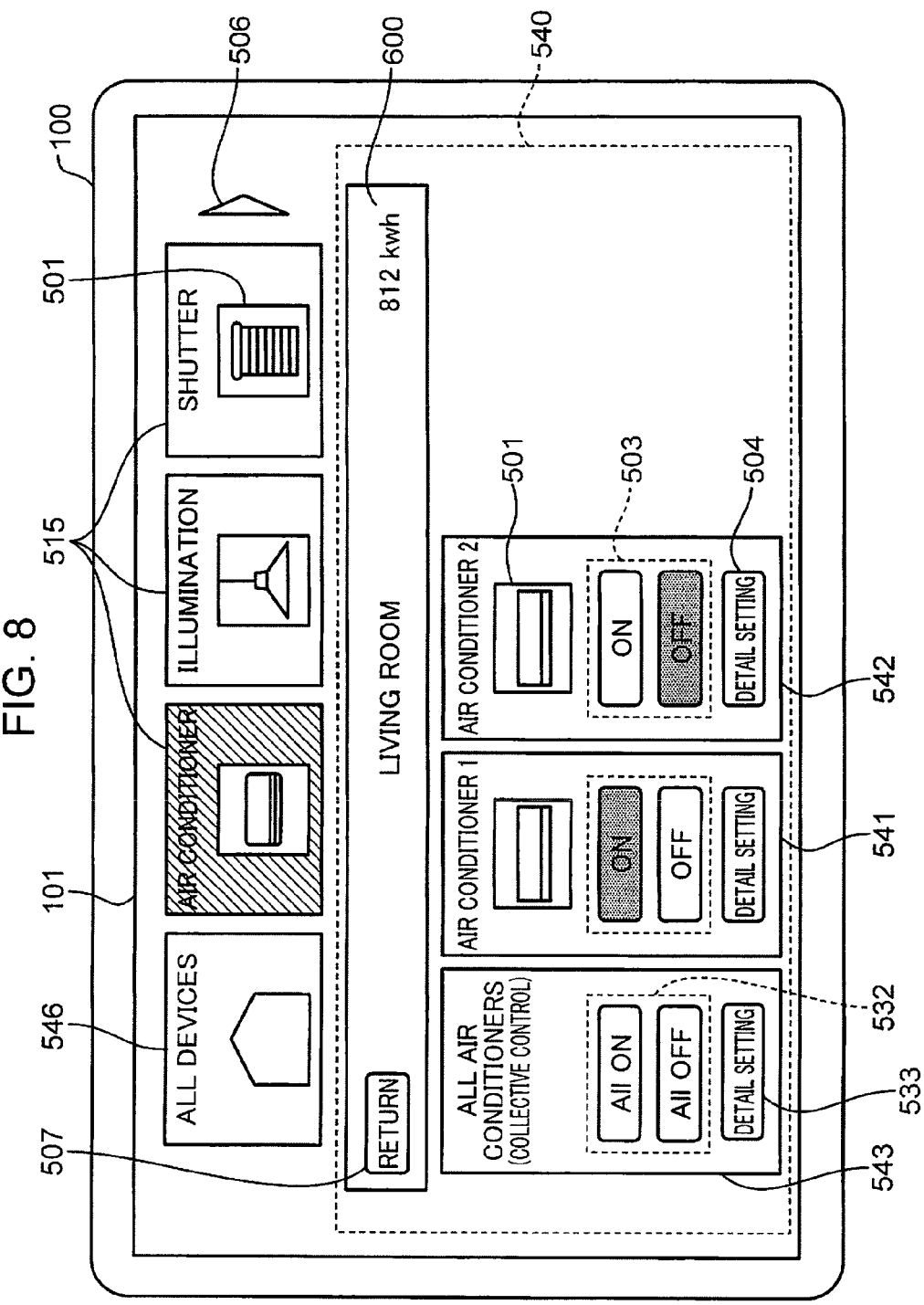

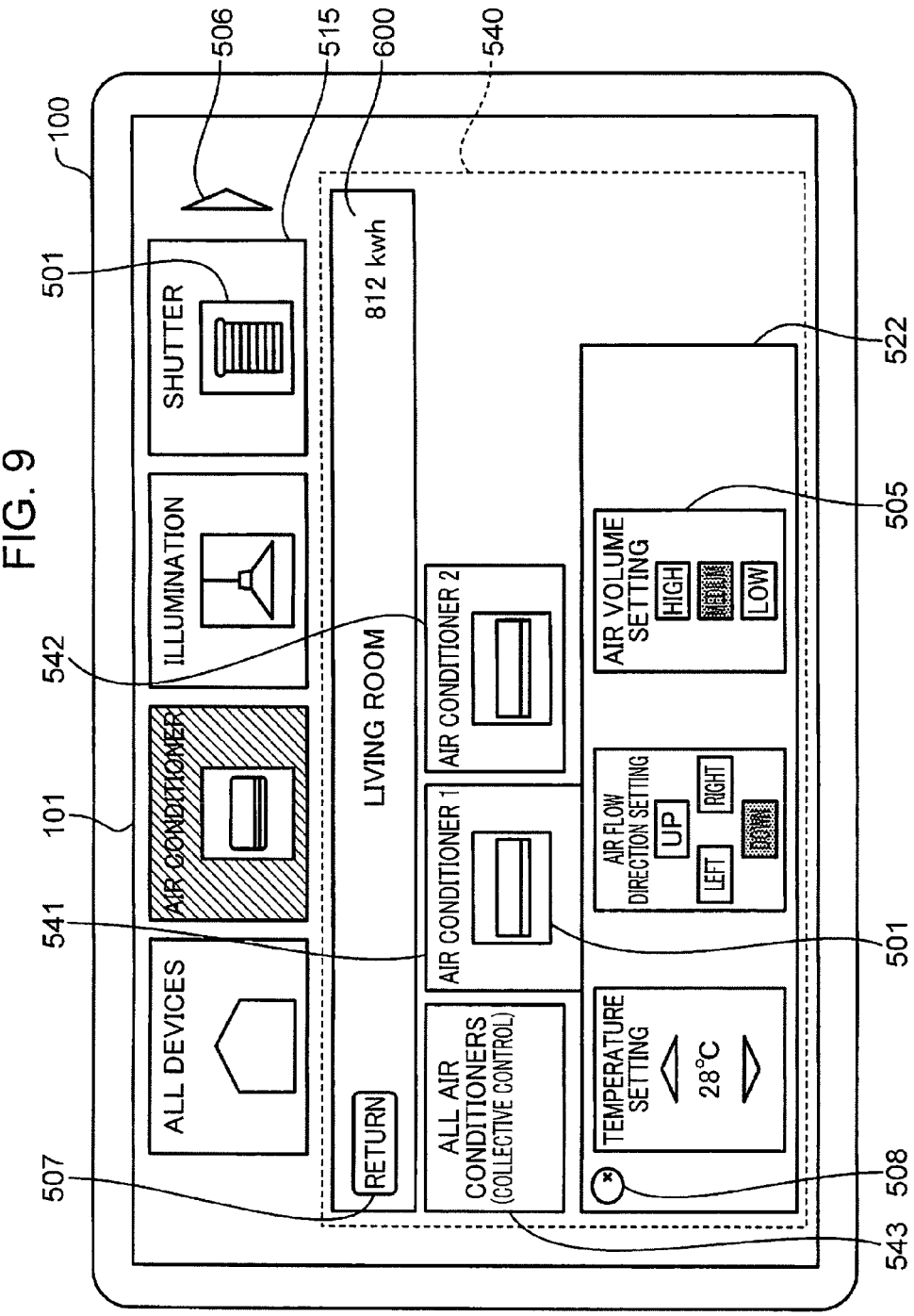

FIG. 22

| ROOM ID (1401) | ROOM TYPE (1402) | STORY (1403) | POWER CONSUMPTION (1404) |
|---|---|---|---|
| A | LIVING ROOM | 1ST FLOOR | 812kwh |
| B | DINING ROOM | 1ST FLOOR | 500kwh |
| C | MAIN BEDROOM | 2ND FLOOR | 198kwh |
| D | CHILD ROOM | 2ND FLOOR | 203kwh |
| E | ENTRANCE | 1ST FLOOR | 24kwh |
| ... | | | |

| DEVICE ID 1601 | DEVICE TYPE 1602 | MODEL 1603 | ARRANGEMENT 1604 | CAPABILITY INFORMATION 1605 | CONTROL COMMAND TRANSMISSION DESTINATION 1606 | POWER CONSUMPTION (kwh) 1607 | STATUS 1608 |
|---|---|---|---|---|---|---|---|
| A | AIR CONDITIONER | CS-X403C | LIVING ROOM | TEMPERATURE CONTROL, AIR FLOW DIRECTION CONTROL, AIR VOLUME CONTROL | DEVICE | 204 | 27°C |
| B | AIR CONDITIONER | CS-X403C | DINING ROOM | TEMPERATURE CONTROL, AIR FLOW DIRECTION CONTROL, AIR VOLUME CONTROL | DEVICE | 312 | OFF |
| C | AIR CONDITIONER | CS-X404C | BEDROOM | TEMPERATURE CONTROL, AIR FLOW DIRECTION CONTROL, AIR VOLUME CONTROL | DEVICE | 250 | 25°C |
| D | AIR CONDITIONER | CS-X404C | CHILD ROOM | TEMPERATURE CONTROL, AIR FLOW DIRECTION CONTROL, AIR VOLUME CONTROL | DEVICE | 284 | OFF |
| E | SHUTTER | NK-NEA80 | BEDROOM | OPEN/CLOSE CONTROL | DEVICE | 0 | CLOSED |
| F | SHUTTER | NK-NEA10 | LIVING ROOM | OPEN/CLOSE CONTROL | DEVICE | 2 | OPEN |
| G | ILLUMINATION | HH-LC710A | LIVING ROOM | ON/OFF CONTROL, DIMMING CONTROL | DEVICE | 4 | ON |
| ... | ... | ... | ... | ... | ... | | |

| DEVICE ID (1701) | DEVICE TYPE (1702) | MODEL (1703) | ARRANGEMENT (1704) | CAPABILITY INFORMATION (1705) | CONTROL COMMAND TRANSMISSION DESTINATION (1706) | IP ADDRESS (1707) | POWER CONSUMPTION (kwh) (1708) | STATUS (1709) |
|---|---|---|---|---|---|---|---|---|
| A | AIR CONDITIONER | CS-X403C | LIVING ROOM | TEMPERATURE CONTROL, AIR FLOW DIRECTION CONTROL, AIR VOLUME CONTROL | DEVICE | 192.168.0.5 | 204 | 27°C |
| B | AIR CONDITIONER | CS-X403C | DINING ROOM | TEMPERATURE CONTROL, AIR FLOW DIRECTION CONTROL, AIR VOLUME CONTROL | DEVICE | 192.168.0.6 | 312 | OFF |
| C | AIR CONDITIONER | CS-X404C | BEDROOM | TEMPERATURE CONTROL, AIR FLOW DIRECTION CONTROL, AIR VOLUME CONTROL | DEVICE | 192.168.0.7 | 250 | 25°C |
| D | AIR CONDITIONER | CS-X404C | CHILD ROOM | TEMPERATURE CONTROL, AIR FLOW DIRECTION CONTROL, AIR VOLUME CONTROL | DEVICE | 192.168.0.8 | 284 | OFF |
| E | SHUTTER | NK-NEA80 | BEDROOM | OPEN/CLOSE CONTROL | DEVICE | 192.168.0.9 | 0 | CLOSED |
| F | SHUTTER | NK-NEA10 | LIVING ROOM | OPEN/CLOSE CONTROL | DEVICE | 192.168.0.10 | 2 | OPEN |
| G | ILLUMINATION | HH-LC710A | LIVING ROOM | ON/OFF CONTROL, DIMMING CONTROL | DEVICE | 192.168.0.11 | 4 | ON |
| ... | ... | ... | ... | ... | ... | | | |

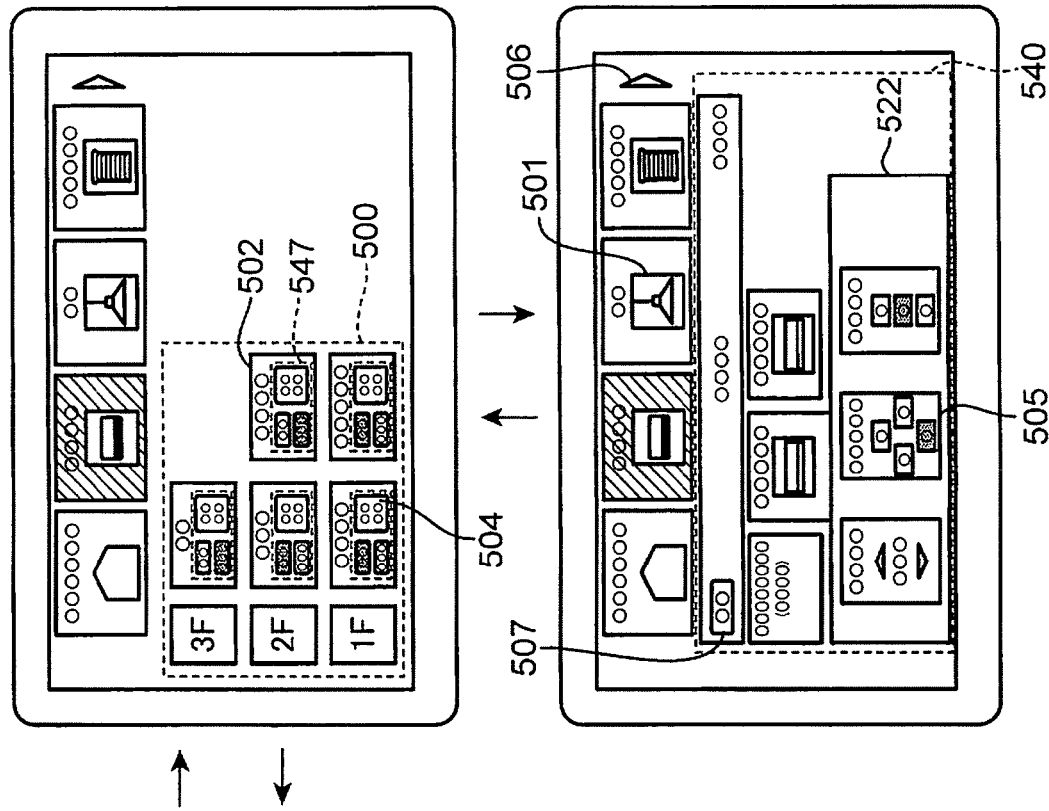
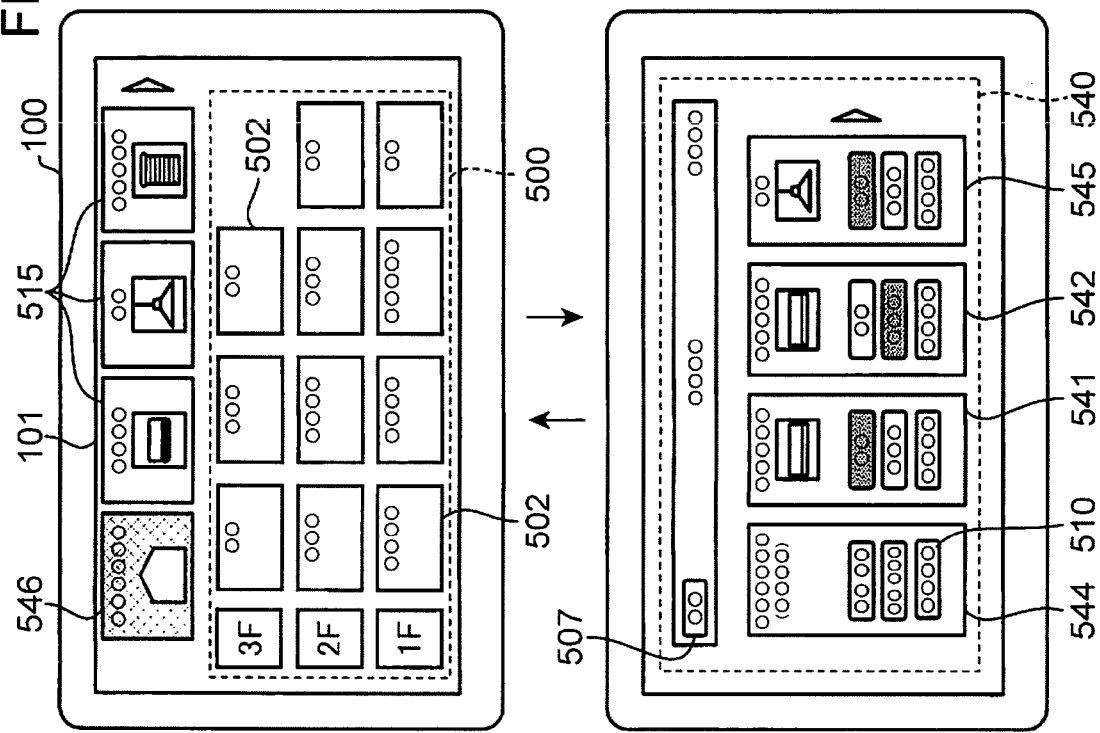
FIG. 48

METHOD FOR CONTROLLING INFORMATION APPARATUS AND COMPUTER-READABLE RECORDING MEDIUM

RELATED APPLICATIONS

This application is a Continuation of International Application No. PCT/JP2013/006592, filed Nov. 8, 2013, which claims the benefit of U.S. Provisional applications No. 61/766,854, filed Feb. 20, 2013, No. 61/856,238, filed Jul. 19, 2013, and No. 61/881,589, filed Sep. 24, 2013, the disclosures of which are incorporated by reference herein in their entireties.

TECHNICAL FIELD

The present disclosure relates to a method for controlling an information apparatus and a computer-readable recording medium.

BACKGROUND ART

Technologies for remotely monitoring or remotely controlling one or more target devices using one remote controller are proposed.

Patent Document 1 discloses a technology for remotely operating one or more target devices from a monitor of a television set. Specifically, icons for the one or more target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

However, Patent Document 1 described above needs a further improvement.
Patent Document 1: Japanese Patent Application Laid-open No. 2007-104567

SUMMARY OF THE INVENTION

In one general aspect, the techniques disclosed here feature a method for controlling a computer of an information apparatus to: display device type icons on a display; display room icons on the display; when it is determined that selection of any one of the device type icons is detected, display room icons each representing a room, in which a target device of a type corresponding to the selected device type icon is installed, in a different display mode from a mode for room icons each representing a room in which the target device of the type is not installed; when it is determined that selection of a room icon displayed in the different display mode is detected, display a first operation screen for operating a controlled target device on the display; and output a control command for controlling the controlled target device to the network based on an operation on the first operation screen.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 6A is a diagram showing an example of a display screen on a display when a device type icon is selected on the basic screen according to an embodiment of the present disclosure.

FIG. 6B is a diagram showing another example of a display screen on a display when a device type icon is selected on the basic screen according to an embodiment of the present disclosure.

FIG. 6C is a diagram showing another example of a display screen on a display when a device type icon is selected on the basic screen according to an embodiment of the present disclosure.

FIG. 7 is a diagram showing an example of a detail control screen that is displayed on a display of a home controller when a room icon is selected in the display example shown in FIG. 6C according to an embodiment of the present disclosure.

FIG. 8 is a diagram showing an example of a room screen that is displayed on a display of a home controller according to an embodiment of the present disclosure.

FIG. 9 is a diagram showing another example of a detail control screen that is displayed on a display of a home controller according to an embodiment of the present disclosure.

FIG. 22 is a diagram showing a configuration of room information that is managed by a server according to an embodiment of the present disclosure.

FIG. 24 is a diagram showing a configuration of a device list that is managed by a server according to an embodiment of the present disclosure.

FIG. 25 is a diagram showing a configuration of a device list that is managed by a home controller according to an embodiment of the present disclosure.

FIG. 48 is a diagram showing an example of transition of display screens on a display including the display screens shown in FIGS. 43 and 45 according to an embodiment of the present disclosure.

Figure 1:
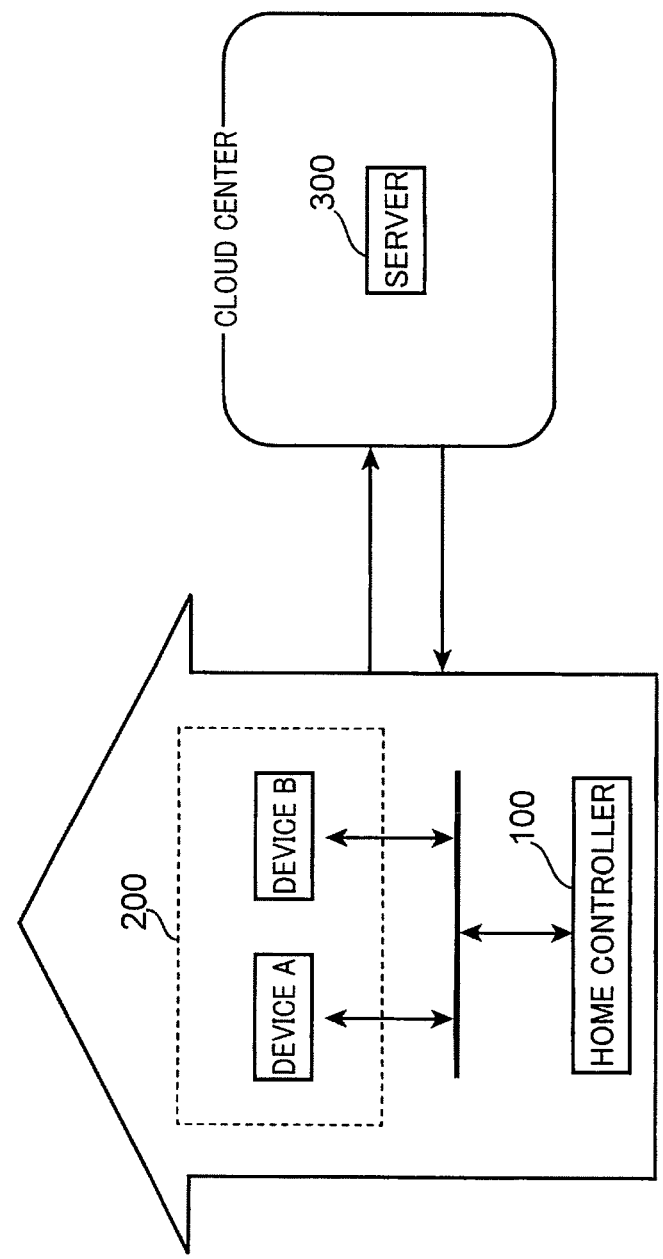
FIG. 1 is a diagram showing an overall configuration of a home control system to which a home controller according to an embodiment of the present disclosure is applied.

DETAILED DESCRIPTION (Story Before Inventing Aspect According to Present Disclosure)

First, viewpoints of an aspect according to the present disclosure will be described.

In Patent Document 1 described above, when a desired icon is selected from icons of one or more target devices displayed in a right side corner of a monitor screen, a floor plan is displayed on a left side of the same monitor screen and an installation location of a target device is displayed on the floor plan.

Due to the configuration described above, in Patent Document 1, a room which has a specific shape and which is included in a floor plan of a particular building is displayed. For example, a room is displayed which is included in a floor plan of a particular building owned by an individual A who is a particular individual and which has a specific shape that is only applicable to the individual A.

Therefore, a room icon that is commonly applicable to individuals A, B, C, and D who own buildings represented by different floor plans cannot be provided. In addition, for example, when the individual A moves into a building represented by a different floor plan, a new floor plan must be obtained.

Based on the considerations described above, the present inventors arrived at the respective aspects of the present disclosure as presented below.

A method according to an aspect of the present disclosure is a method for controlling an information apparatus, the information apparatus having a display and being connected to a network, one or more target devices, which are installed in a building, being controlled over the network, the method causing a computer of the information apparatus to: display on the display one or more device type icons representing types of the respective target devices installed in the building; display on the display one or more room icons representing each of rooms included in the building; when it is determined that selection of any one of the device type icons among the one or more device type icons is detected, display one or more room icons each representing a room, in which a target device of a type corresponding to the selected device type icon is installed, in a different display mode from a display mode for one or more room icons each representing a room, in which the target device of the type corresponding to the selected device type icon is not installed; when it is determined that selection of any one of the room icons among the one or more room icons displayed in the different display mode is detected, display on the display a first operation screen for operating a controlled target device, the controlled target device being installed in a room corresponding to the selected room icon, the type of the controlled target device corresponding to the selected device type icon; and output a control command for controlling the controlled target device to the network based on an operation on the first operation screen, the controlled target device being installed in a room corresponding to the selected room icon, the type of the controlled target device corresponding to the selected device type icon.

According to the aspect described above, first, one or more device type icons representing types of respective target devices installed in the building are displayed on a display and one or more room icons representing each of the rooms included in the building are displayed on the display. Next, when it is determined that selection of any one of the device type icons among the one or more device type icons is detected, one or more room icons each representing a room, in which a target device of a type corresponding to the selected device type icon is installed, are displayed in a different display mode from a display mode for one or more room icons each representing a room in which the target device of the type corresponding to the selected device type icon is not installed. Subsequently, when it is determined that selection of any one of the room icons among the one or more room icons displayed in the different display mode is detected, a first operation screen for operating a controlled target device is displayed on the display, the controlled target device being installed in a room corresponding to the selected room icon, the type of the controlled target device corresponding to the selected device type icon.

For example, there are cases where a plurality of air conditioners are individually installed in a plurality of rooms in a building. In this case, simply displaying only an operation screen of a target device corresponding to the selected device icon on the display does not provide a clear understanding as to which air conditioner installed in which room corresponds to the operation screen and may cause an erroneous operation such as operating an air conditioner that is not the desired air conditioner. On the other hand, displaying a device icon representing an air conditioner for each installed air conditioner increases the number of device icons to be displayed on the display and makes it difficult to select a desired device icon from the plurality of displayed device icons.

In the present aspect, as described above, one or more device type icons representing types of respective target devices installed in the building are displayed on the display and one or more room icons representing each of the rooms included in the building are displayed on the display.

Therefore, since displaying one device type icon for each type of device will suffice such as displaying a device type icon representing an illumination device in case of an illumination device, the number of icons to be displayed on the display can be prevented from increasing.

Next, when it is determined that selection of any one of the device type icons among the one or more device type icons is detected, one or more room icons each representing a room, in which a target device of a type corresponding to the selected device type icon is installed, are displayed in a different display mode from a display mode for one or more room icons each representing a room in which the target device of the type corresponding to the selected device type icon is not installed.

Therefore, a target device of a desired type such as an illumination device can be discriminated as to in which room the illumination device is installed without making mistakes. Subsequently, the desired target device can be selected from rooms in which the target device of the desired type is installed.

Accordingly, it is made clear which target device such as an illumination device that is installed in which room is to be operated. In addition, by preventing an increase in the number of icons to be displayed on the display, selection of the desired device type icon can be prevented from becoming complicated, selection of the desired target device can be readily performed, and an erroneous operation in which a target device other than the desired target device is operated can be prevented.

Furthermore, the room icons are to be displayed and do not represent rooms with specific shapes that are included in a floor plan of a particular building. In other words, for example, a room icon does not represent a room which is included in a floor plan of a particular building owned by an individual A who is a particular individual and which has a specific shape that is only applicable to the individual A. Therefore, a room icon that is commonly applicable to individuals A, B, C, and D who own buildings represented by different floor plans can be provided. In addition, for example, the individual A may move into a building represented by a different floor plan. Even in such a case, by adjusting a correspondence between a target device to be used and a room in which the target device is to be installed, use of the room icons can be continued without having to order a new floor plan.

In addition, in the aspect described above, for example, the one or more room icons each representing the room, in which the target device of the type corresponding to the selected device type icon is installed, may be displayed brighter than the one or more room icons each representing the room in which the target device of the type corresponding to the selected device type icon is not installed.

Furthermore, in the aspect described above, for example, the one or more room icons each representing the room, in which the target device of the type corresponding to the selected device type icon is not installed, may be displayed darker than the one or more room icons each representing the room in which the target device of the type corresponding to the selected device type icon is installed.

In addition, in the aspect described above, for example, the one or more room icons each representing the room, in which the target device of the type corresponding to the selected device type icon is installed, may be displayed in a first color that differs from a second color for one or more room icons each representing the room in which the target device of the type corresponding to the selected device type icon is not installed.

Furthermore, in the aspect described above, for example, the one or more room icons each representing the room, in which the target device of the type corresponding to the selected device type icon is not installed, may be undisplayed on the display, and the one or more room icons each representing the room, in which the target device of the type corresponding to the selected device type icon is installed, may be displayed on the display.

In addition, in the aspect described above, for example, the one or more room icons each representing the room, in which the target device of the type corresponding to the selected device type icon is installed, may be rearranged to be displayed closely to each other using an area, in which the one or more room icons each representing the room, in which the target device of the type corresponding to the selected device type icon is not installed, are undisplayed.

Furthermore, in the aspect described above, for example, the first operation screen may be displayed in a vacant area made available by displaying the one or more room icons closely to each other, the one or more room icons each representing the room in which the target device of the type corresponding to the selected device type icon is installed.

According to the present aspect, a vacant area made available by displaying the one or more room icons closely to each other can be effectively utilized. In addition, the need to follow a procedure of first closing the first operation screen and then displaying the one or more room icons once again to select a room icon of a different room can be eliminated when selecting the room icon of the different room in which the target device of the type corresponding to the selected device type icon is installed. In other words, an operation for selecting the different room icon can be simplified.

Furthermore, in the aspect described above, for example, an all-types icon for selecting all types of the respective target devices installed in the building may be displayed on the display, and when it is determined that selection of the all-types icon is detected, all of the one or more room icons respectively representing all of the rooms included in the building may be displayed on the display.

According to the present aspect, an operation for restoring a display state in which the one or more room icons respectively representing all of the rooms included in the building are displayed on the display can be readily performed.

In addition, in the aspect described above, for example, when it is determined that selection of any one room icon among the one or more room icons displayed in the different display mode is detected, a collective operation screen may be displayed alongside the first operation screen on the display, the collective operation screen for collectively controlling power supplies of target devices of all types that are installed in a room corresponding to the selected room icon.

There are cases where, after selecting any one room icon among the one or more room icons displayed in the different display mode, the power supplies of target devices of different types that are installed in a room corresponding to the one selected room icon are controlled. In this case, according to the present aspect, an occurrence of a complicated operation involving taking the trouble to return to the initial display screen to select a device type icon of the different type and once again selecting the same room icon as the selected room icon can be prevented.

Furthermore, with the collective operation screen, the power supplies of target devices of all types that are installed in the room corresponding to the selected room icon are collectively controlled. Therefore, the power supplies of all of the target devices that are installed in the room corresponding to the one selected room icon can be controlled by one operation instead of individually controlling the power supply of each of the target devices that are installed in the room corresponding to the one selected room icon. Accordingly, operation efficiency can be improved.

In addition, in the aspect described above, for example, the one or more room icons may have a same size and a same shape.

Accordingly, the one or more room icons cease to represent, for example, a room which has a specific shape and which is included in a floor plan of a particular building. Therefore, a room icon that is commonly applicable to individuals A, B, C, and D who own buildings represented by different floor plans can be provided. In addition, for example, the individual A may move into a building represented by a different floor plan. Even in such a case, by adjusting a correspondence between a target device to be used and a room in which the target device is to be installed, use of the room icons can be continued without having to order a new floor plan.

Furthermore, in the aspect described above, for example, the one or more room icons may include an operation button for causing a second operation screen to be displayed, the second operation screen being used operating instructions other than instructions operable by the first operation screen, and when it is determined that selection of the operation button is detected, the second operation screen may be displayed on the display.

A method according to another aspect of the present disclosure is a method for controlling an information apparatus, the information apparatus having a display and being connected to a network, one or more target devices, which are installed in a building, being controlled over the network, the method causing a computer of the information apparatus to: display on the display one or more device type icons representing types of the respective target devices installed in the building; display on the display one or more room icons representing each of rooms included in the building; when it is determined that selection of any one of the device type icons among the one or more device type icons is detected, display one or more room icons each representing a room, in which a target device of a type corresponding to the selected device type icon is installed, in a different display mode from a display mode for one or more room icons each representing a room in which the target device of the type corresponding to the selected device type icon is not installed, the one or more room icons displayed in the different display mode including a first operation screen for operating a controlled target device, the type of the controlled target device corresponding to the selected device type icon; and output a first control command for controlling the controlled target device to the network based on an operation on the first operation screen, the controlled target device being installed in a room corresponding to the selected room icon, the type of the controlled target device corresponding to the selected device type icon.

According to the aspect described above, first, one or more device type icons representing types of respective target devices installed in the building are displayed on a display and one or more room icons representing each of the rooms included in the building are displayed as a list on the display. Next, when it is determined that selection of any one of the device type icons among the one or more device type icons is detected, one or more room icons each representing a room, in which a target device of a type corresponding to the selected device type icon is installed, are displayed in a different display mode from a display mode for one or more room icons each representing a room in which the target device of the type corresponding to the selected device type icon is not installed.

For example, there are cases where a plurality of air conditioners are individually installed in a plurality of rooms in a building. In this case, simply displaying only an operation screen of a target device corresponding to the selected device icon on the display does not provide a clear understanding as to which air conditioner installed in which room corresponds to the operation screen and may cause an erroneous operation such as operating an air conditioner that is not the desired air conditioner. On the other hand, displaying a device icon representing an air conditioner for each installed air conditioner increases the number of device icons to be displayed on the display and makes it difficult to select a desired device icon from the plurality of displayed device icons.

In the present aspect, as described above, one or more device type icons representing types of respective target devices installed in the building are displayed on the display and one or more room icons representing each of the rooms included in the building are displayed on the display.

Therefore, since displaying one device type icon for each type of device will suffice such as displaying a device type icon representing an illumination device in case of an illumination device, the number of icons to be displayed on the display can be prevented from increasing.

Next, when it is determined that selection of any one of the device type icons among the one or more device type icons is detected, one or more room icons each representing a room, in which a target device of a type corresponding to the selected device type icon is installed, are displayed in a different display mode from a display mode for one or more room icons each representing a room in which the target device of the type corresponding to the selected device type icon is not installed.

Therefore, a target device of a desired type such as an illumination device can be discriminated as to which room the illumination device is installed in without making mistakes. Subsequently, the desired target device is to be selected from rooms in which the target device of the desired type is installed.

Accordingly, it is made clear which target device such as an illumination device that is installed in which room is to be operated. In addition, by preventing an increase in the number of icons to be displayed on the display, selection of the desired device type icon can be prevented from becoming complicated, selection of the desired target device can be readily performed, and an erroneous operation in which a target device other than the desired target device is operated can be prevented.

Furthermore, the room icons are to be displayed and do not represent rooms with specific shapes that are included in a floor plan of a particular building. In other words, for example, a room icon does not represent a room which is included in a floor plan of a particular building owned by an individual A who is a particular individual and which has a specific shape that is only applicable to the individual A. Therefore, a room icon that is commonly applicable to individuals A, B, C, and D who own buildings represented by different floor plans can be provided. In addition, for example, the individual A may move into a building represented by a different floor plan. Even in such a case, by adjusting a correspondence between a target device to be used and a room in which the target device is to be installed, use of the room icons can be continued without having to order a new floor plan.

In addition, the one or more room icons that are displayed in the different display mode include a first operation screen for operating the target device of the type corresponding to the selected device type icon. Accordingly, at a stage where the one or more room icons each representing a room, in which the target device of the type that corresponds to the selected device type icon is installed, are displayed in a display mode that differs from the one or more room icons each representing a room in which the target device of the type that corresponds to the selected device type icon is not installed, the target device of the type that corresponds to the selected device type icon can be controlled without separately displaying the first operation screen from the display of the room icon.

In this case, which target device installed in which room is to be operated can be readily identified without the risk of an erroneous operation. In addition, the number of operations by the user that are required until operating a desired target device can be reduced and the number of process steps in an apparatus that are required until operating the desired target device can be reduced.

Furthermore, in the other aspect described above, for example, the first operation screen may include an operation button for causing a second operation screen to be displayed, the second operation screen being used for operating instructions other than instructions operable by the first operation screen, and when it is determined that selection of the operation button is detected, the second operation screen may be displayed on the display.

According to the present aspect, the first operation screen may be included in the one or more room icons for a part of the instructions to the target device, and the second operation screen can be separately displayed on the display for the remaining instructions. Therefore, for example, by including only frequently used instructions in the room icon, a size of the room icon can be reduced. Accordingly, for example, even in a case where many room icons are displayed for a target device that is installed in a large number such as an illumination device or an air conditioner, a larger number of room icons can be displayed in a limited display area. On the other hand, for example, less frequently used instructions can be accommodated by separately displaying the second operation screen for operating such instructions on the display.

In addition, in the other aspect described above, for example, a second control command for controlling the controlled target device may be outputted to the network based on an operation on the second operation screen, the controlled target device being installed in the room corresponding to the selected room icon, the type of the controlled target device corresponding to the selected device type icon.

Furthermore, in the other aspect described above, for example, the first operation screen may include a power supply button for controlling a power supply of the target device of the type that corresponds to the selected device type icon.

In this case, control of a power supply of a target device is a frequently used operation. Therefore, by including the power supply button for controlling the power supply of the target device in the room icon that is displayed in the different display mode, the number of operations by the user that is required until operating a desired target device can be reduced, the number of process steps in an apparatus that is required until operating the desired target device can be reduced, and a size of the room icon can be reduced.

In addition, in the other aspect described above, for example, the one or more room icons may have a same size and a same shape.

Accordingly, the one or more room icons cease to represent, for example, a room which has a specific shape and which is included in a floor plan of a particular building. Therefore, a room icon that is commonly applicable to individuals A, B, C, and D who own buildings represented by different floor plans can be provided. In addition, for example, the individual A may move into a building represented by a different floor plan. Even in such a case, by adjusting a correspondence between a target device to be used and a room in which the target device is to be installed, use of the room icons can be continued without having to order a new floor plan.

(The Present Disclosure)

The present disclosure will be described below with reference to the drawings. In the drawings, the same symbols are used for the same constituent elements.

In the present disclosure, a home controller which can singly control one or more devices will be described.

(Overall Configuration)

FIG. 1 is a diagram showing an overall configuration of a home control system to which a home controller according to the embodiment is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
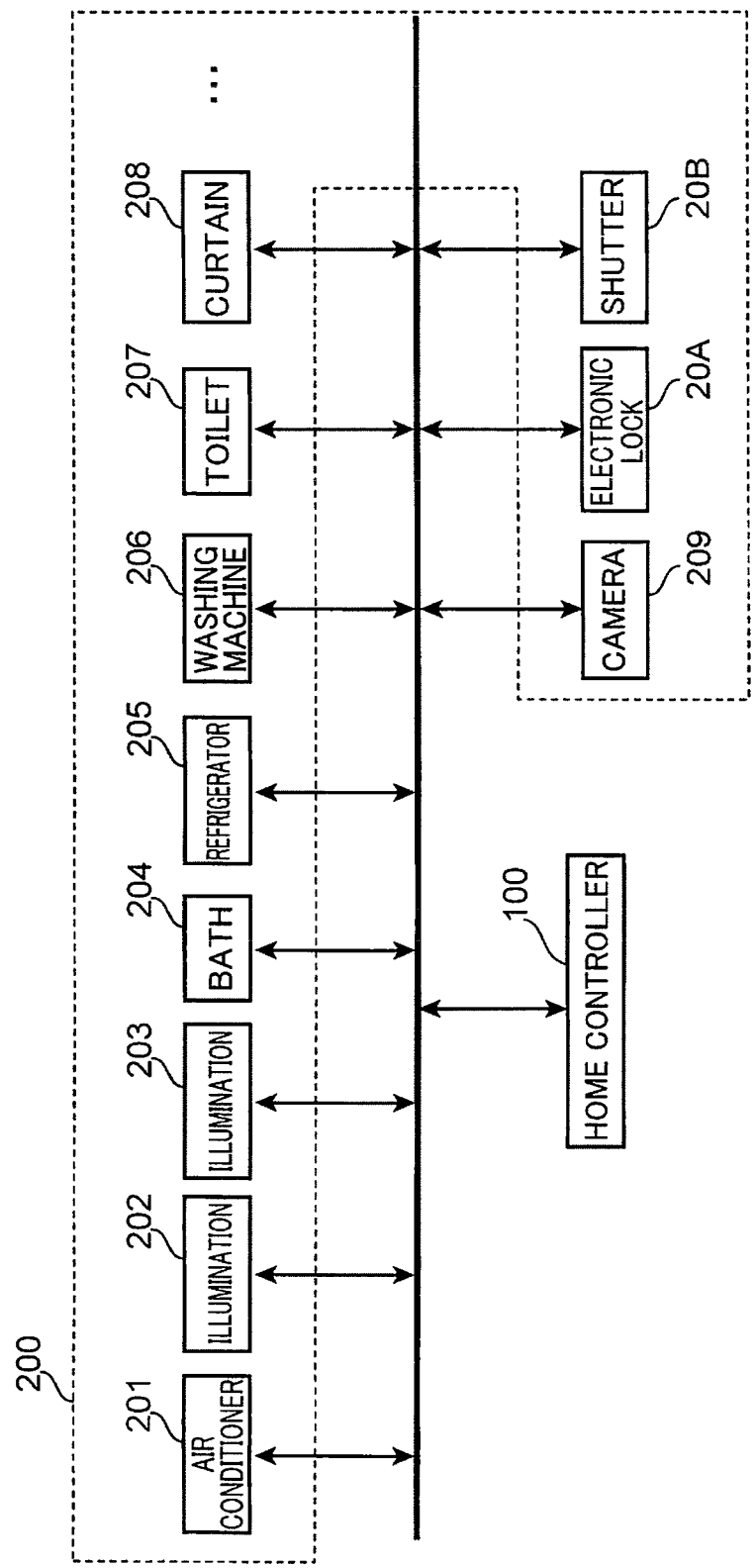
FIG. 2 is a diagram showing main devices to be controlled by the home controller according to an embodiment of the present disclosure.

FIG. 2 is a diagram showing the main devices 200 to be controlled by the home controller 100. The home controller 100 controls the devices 200 such as an air conditioning apparatus (hereinafter called "air conditioner") 201, illumination devices 202 and 203, a bath 204, a refrigerator 205, a washing machine 206, a toilet 207, and a curtain 208. The devices 200 to be controlled by the home controller 100 may include a plurality of devices 200 of the same type such as the illumination devices 202 and 203. An air conditioner is an apparatus for adjusting temperature, humidity, cleanliness, and the like of air inside a room. Air conditioners include a cooling apparatus, a heating apparatus, a cooling and heating apparatus, a humidifier, a dehumidifier, and an air cleaner.

The devices 200 such as the air conditioner 201 shown in FIG. 2 are merely exemplary, and a television set (hereinafter called "television"), a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the embodiment is not limited thereto, and office devices for use in offices or the like may be adopted as the devices 200. Examples of the office devices include a printer, a personal computer, a scanner, and a copy machine.

Figure 3:
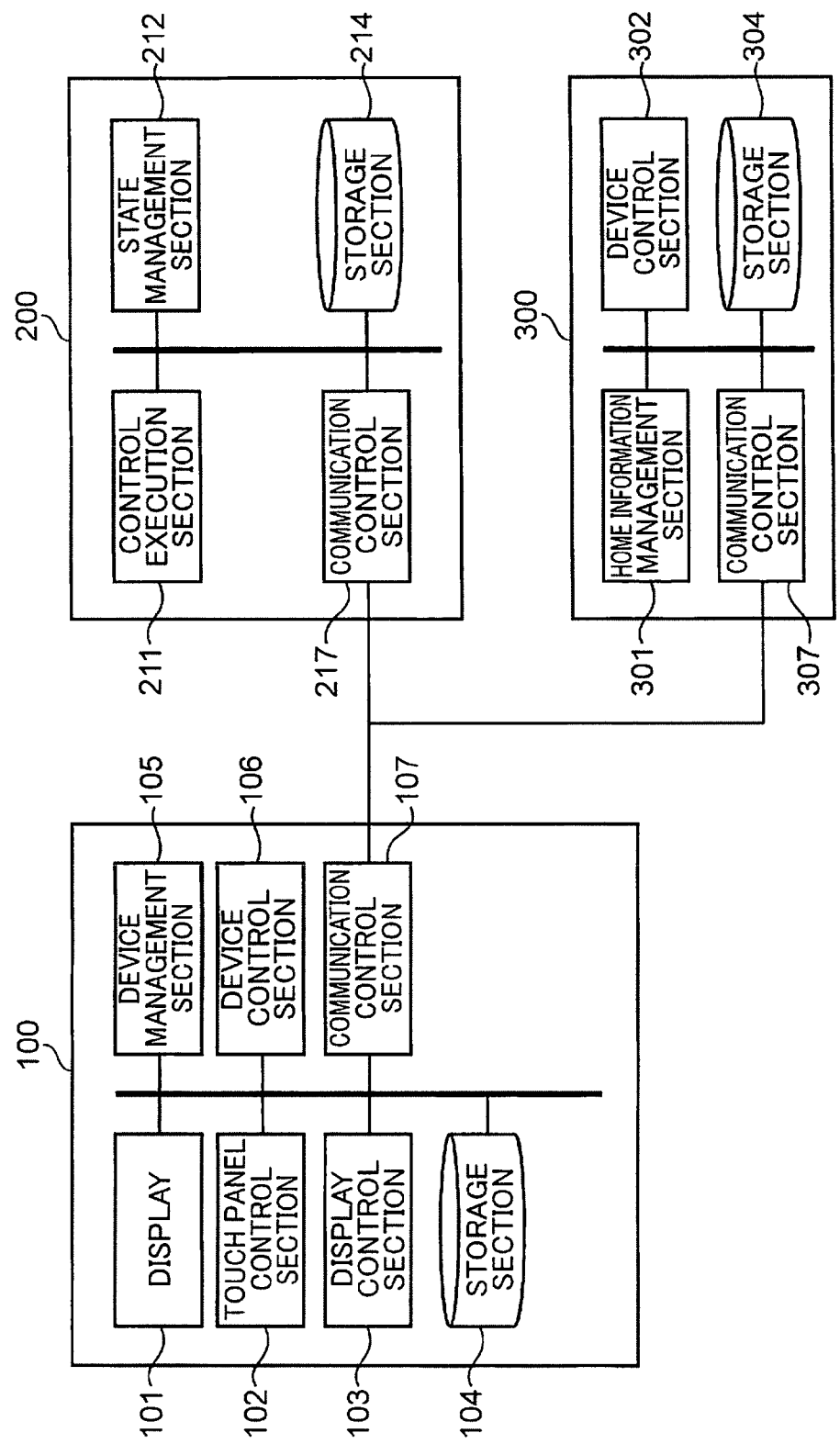
FIG. 3 is a block diagram showing the configuration of the home controller, a device, and a server according to an embodiment of the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 1300 to be discussed later from the server 300, stores the acquired home information 1300 in the storage section 104, and manages the home information 1300. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the embodiment, a series of operations performed by the user by contacting the display 101 may be replaced with operations of moving a pointer and clicking using an external input device such as a mouse.

As shown in FIG. 3, the device 200 includes a control execution section 211, a state management section 212, a storage section 214, and a communication control section 217. The control execution section 211 receives a control command from the home controller 100 or the server 300, and controls the device 200 in accordance with the received control command. The content of control of the device 200 performed by the control execution section 211 differs in accordance with the type of the device 200. For example, if the device 200 is an illumination device, the control execution section 211 turns on and off the illumination device. In addition, the control execution section 211 transmits the result of execution of the control command and the state of the device 200 to the home controller 100 or the server 300.

The state management section 212 manages the state of the device 200. The content of management of the device 200 performed by the state management section 212 differs in accordance with the type of the device 200. For example, if the device 200 is an illumination device, the state management section 212 manages whether the illumination device is currently turned on or turned off. The storage section 214 stores information related to the state of the device 200 managed by the state management section 212. The communication control section 217 controls communication between the device 200 and the home controller 100 and communication between the device 200 and the server 300. In addition, the communication control section 217 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 1300 to be discussed later for each house or each user account. In addition, the home information management section 301 transmits the home information 1300 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 1300 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
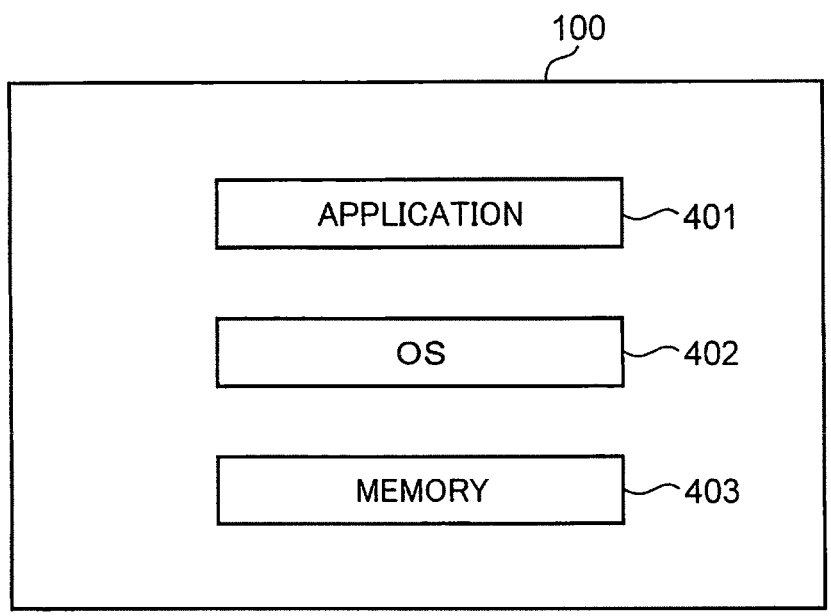
FIG. 4 is a diagram showing a configuration example of the form of implementation of the home controller according to an embodiment of the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the embodiment, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the home controller 100 according to the embodiment can be embodied. In the embodiment, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
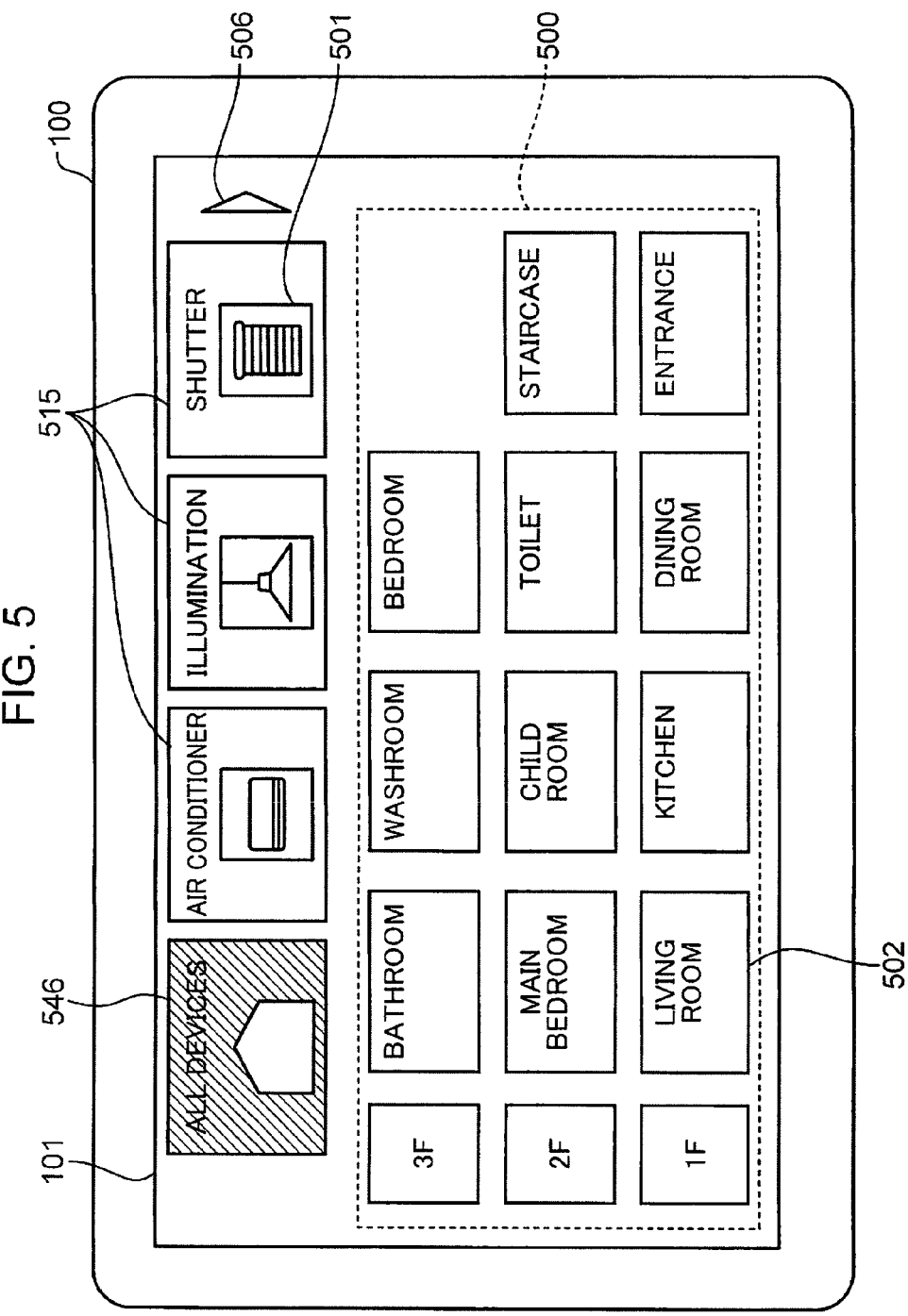
FIG. 5 is a diagram showing the configuration of a basic screen of the home controller according to an embodiment of the present disclosure.

FIG. 5 is a diagram showing a configuration of a basic screen of the home controller 100. As shown in FIG. 5, the basic screen of the home controller 100 that is displayed on the display 101 includes an all-types icon 546, device type icons 515, a floor plan 500, and a next page button 506.

The all-types icon 546 is an icon representing devices of all types. The all-types icon 546 includes a device icon 501 which schematically represents a home that is provided with devices of all types. The all-types icon 546 is labeled "all devices". In the present embodiment, the all-types icon 546 is selected by default. Therefore, as shown in FIG. 5, the display control section 103 displays the all-types icon 546 in a different mode (for example, in a different color or brightness) from the device type icons 515 on the basic screen.

The device type icons 515 are icons representing a type of the device 200. A device type icon 515 is prepared for each type of the device 200. The device type icons 515 include a device icon 501 which schematically represents a device that typifies a type of the device 200. The device type icons 515 are labeled with a name or an abbreviated name of a device.

In the present embodiment, for example, the display control section 103 arranges the all-types icon 546 and the device type icons 515 side by side at an upper end of the display 101. In FIG. 5, the display control section 103 displays, in order from left to right, the all-types icon 546, a device type icon 515 representing an air conditioner, a device type icon 515 representing an illumination device, and a device type icon 515 representing an electric shutter apparatus on the display 101.

The floor plan 500 is a diagram that schematically shows an arrangement of one or more rooms that constitute each floor of a house. The floor plan 500 includes room icons 502 that represent rooms. The room icons 502 schematically represent rooms and are depicted by square blocks. In the floor plan 500, respective room icons 502 representing respective rooms that constitute the respective floors are arranged in a matrix pattern.

As shown in FIG. 5, the room icons 502 are depicted by blocks of a same size. The room icons 502 are labeled with a name or an abbreviated name of a room. In addition, floor numbers are displayed in a vertical direction, and room icons 502 representing rooms that constitute a same floor are arranged in horizontal rows.

In the example shown in FIG. 5, since the house is constituted by three floors from the 1st to 3rd floor, room icons 502 representing rooms that constitute the 3rd floor are arranged in row 1, room icons 502 representing rooms that constitute the 2nd floor are arranged in row 2, and room icons 502 representing rooms that constitute the 1st floor are arranged in row 3. Furthermore, floor numbers such as 1F, 2F, and 3F are presented at a left end of each row.

As shown, in the present embodiment, the room icons 502 are depicted by blocks of the same size. Therefore, the floor plan 500 can be commonly applied to a building with a different layout. In addition, for example, the user may move into a building represented by a different floor plan. Even in this case, by adjusting a correspondence between the device 200 to be used and a room in which the device 200 is to be installed, the room icons 502 shown in FIG. 5 can be continuously used without modification.

FIG. 6A is a diagram showing an example of a display screen on the display 101 when a device type icon is selected on the basic screen. When the user selects the device type icon 515 on the basic screen shown in FIG. 5, the touch panel control section 102 detects the selection thereof. As a result, for example, the display control section 103 displays a background of the device icon 501 in the all-types icon 546 in a default color or a default brightness of an area other than the all-types icon 546. In addition, the display control section 103 displays the selected device type icon 515 in a different mode. For example, the different mode may be a different color or a different brightness or may be a same mode as a default setting of the all-types icon 546.

In addition, the display control section 103 respectively displays on the display 101 a room icon 502 representing a room in which a device 200 of a type corresponding to the selected device type icon 515 is installed and a room icon 502 representing a room in which a device 200 of a type corresponding to the selected device type icon 515 is not installed in modes that differ from each other.

For example, in FIG. 6A, a device type icon 515 representing an air conditioner has been selected by the user. Accordingly, the device type icon 515 representing an air conditioner is displayed in a color that differs from a color for the other device type icons 515.

In addition, for example, in FIG. 6A, air conditioners are installed in a living room, a dining room, a main bedroom, a child room, and a bedroom. On the other hand, air conditioners are not installed in a kitchen, an entrance, a toilet, a staircase, a bathroom, and a washroom. In this case, when the touch panel control section 102 detects selection of the device type icon 515 representing an air conditioner by the user, the display control section 103 lowers the brightness of the respective room icons 502 representing the kitchen, the entrance, the toilet, the staircase, the bathroom, and the washroom. Alternatively, the display control section 103 may increase the brightness of the respective room icons 502 representing the living room, the dining room, the main bedroom, the child room, and the bedroom. Further alternatively, the display control section 103 may change the colors of the respective room icons 502 representing the kitchen, the entrance, the toilet, the staircase, the bathroom, and the washroom to, for example, gray.

As described above, in FIG. 6A, the room icons 502 representing rooms in which a device 200 of a type corresponding to the selected device type icon 515 is installed and the room icons 502 representing rooms in which a device 200 of a type corresponding to the selected device type icon 515 is not installed are displayed in modes that differ from each other on the display 101. Accordingly, an erroneous operation in which the user next selects a room icon 502 representing a room in which a device 200 of a type corresponding to the selected device type icon 515 is not installed can be prevented.

FIGS. 6B and 6C are diagrams respectively showing other examples of a display screen on the display 101 when a device type icon is selected on the basic screen.

In FIG. 6B, when the touch panel control section 102 detects selection of the device type icon 515 representing an air conditioner by the user, the display control section 103 hides the respective room icons 502 representing the kitchen, the entrance, the toilet, the staircase, the bathroom, and the washroom where air conditioners are not installed. In other words, the display control section 103 erases the respective room icons 502 representing the kitchen, the entrance, the toilet, the staircase, the bathroom, and the washroom in which air conditioners are not installed from the floor plan 500.

In FIG. 6C, when the touch panel control section 102 detects selection of the device type icon 515 representing an air conditioner by the user, the display control section 103 hides the respective room icons 502 representing the kitchen, the entrance, the toilet, the staircase, the bathroom, and the washroom where air conditioners are not installed in a similar manner to FIG. 6B. In FIG. 6C, the display control section 103 further rearranges display positions of the respective room icons 502 representing the living room, the dining room, the main bedroom, the child room, and the bedroom where air conditioners are installed closely to, for example, a left end where floor numbers are shown. Accordingly, a display area of the floor plan 500 is reduced. Moreover, arranging the display positions of the respective room icons 502 closely to the left end in FIG. 6C is merely an example and the display positions may be arranged closely to the right end.

FIG. 7 is a diagram showing an example of a detail control screen 522 that is displayed on the display 101 of the home controller 100 when a room icon 502 is selected in the display example shown in FIG. 6C. For example, when the user selects the room icon 502 representing the living room on the basic screen shown in FIG. 6C, the touch panel control section 102 detects the selection thereof. As a result, the display control section 103 displays the selected room icon 502 representing the living room in, for example, a different color. In addition, the display control section 103 displays the detail control screen 522 for controlling the air conditioner in the living room in a vacant area of the display 101 which had been created by the reduction in size of the floor plan 500.

Moreover, FIG. 7 shows an example where one air conditioner is installed in the living room. Alternatively, when two or more air conditioners are installed in the living room, the detail control screen 522 shown in FIG. 7 may be configured as an operation screen for collectively controlling setting of the two or more air conditioners. The detail control screen 522 shown in FIG. 7 corresponds to an example of the first operation screen.

As shown in FIG. 7, the detail control screen 522 includes a detail control button 505. The detail control button 505 is a button for controlling a state of the device 200 in detail. In FIG. 7, since the device 200 is an air conditioner, the detail control screen 522 includes a detail control button 505 for setting temperature, a detail control button 505 for setting air flow direction, and a detail control button 505 for setting air volume.

In addition, the display control section 103 controls a display state of the detail control button 505 according to a status of the device 200 that is managed by the device management section 105. FIG. 7 shows that the air conditioner in the living room is set to a temperature of "28° C.", an air flow direction of "downward", and an air volume of "medium". Accordingly, the user can readily learn a detailed current status of an air conditioner.

When the user selects the detail control button 505 in a state where the detail control screen 522 is displayed as shown in FIG. 7, the touch panel control section 102 detects the selection thereof. Accordingly, the device control section 106 generates a control command in accordance with the detail control button 505 selected by the user. In addition, the device control section 106 transmits the generated control command to the air conditioner in the living room via the communication control section 107 and the network. The display control section 103 changes a display state of the detail control button 505 in accordance with the selection of the detail control button 505 by the user.

In FIG. 7, for example, when the user selects an upward arrow button of the detail control button 505 for setting temperature, the touch panel control section 102 detects the selection thereof. As a result, the device control section 106 generates a control command for raising the temperature setting by 1° C. The device control section 106 transmits the generated control command to the air conditioner in the living room via the communication control section 107 and the network. The display control section 103 changes a display temperature of the detail control button 505 for temperature setting to 29° C.

In FIG. 7, for example, when the user selects an "upward" button of the detail control button 505 for setting air flow direction, the touch panel control section 102 detects the selection thereof. As a result, the device control section 106 generates a control command for changing the air flow direction to upward. The device control section 106 transmits the generated control command to the air conditioner in the living room via the communication control section 107 and the network. The display control section 103 restores the "downward" button of the detail control button 505 for setting air flow direction to a default color and changes the color of the "upward" button.

In FIG. 7, for example, when the user selects a "low" button of the detail control button 505 for setting air volume, the touch panel control section 102 detects the selection thereof. As a result, the device control section 106 generates a control command for changing the air volume to low. The device control section 106 transmits the generated control command to the air conditioner in the living room via the communication control section 107 and the network. The display control section 103 restores the "medium" button of the detail control button 505 for setting air volume to a default color and changes the color of the "low" button.

FIG. 8 is a diagram showing an example of a room screen 540 displayed on the display 101 of the home controller 100. For example, when the user selects the room icon 502 on the display screen shown in FIG. 6A, the touch panel control section 102 detects the selection thereof. As a result, the display control section 103 displays a room screen 540 representing a room corresponding to the selected room icon 502 on the display 101 in place of the floor plan 500. FIG. 8 shows an example where the user has selected the room icon 502 representing the living room and two air conditioners are installed in the living room.

The room screen 540 includes a display field 600 for displaying power consumption of the room, a return button 507, and operation screens 541, 542, and 543. A name or an abbreviated name of the room ("living room" in FIG. 8) is described at center in an upper part of the room screen 540. Based on power consumption 1504 that is included in room information 1500 (FIG. 23 to be described later), the display control section 103 displays the power consumption of the room (the living room in FIG. 8) in the display field 600.

The operation screen 543 at the left end in FIG. 8 is an operation screen for controlling settings of all devices 200 (air conditioners in FIG. 8) that are installed in the room. The operation screen 543 includes a description that reads "all air conditioners (collective control)". The operation screen 543 includes a device type collective control button 532 and a collective control setting button 533. The device type collective control button 532 includes an "all on" button and an "all off" button. The collective control setting button 533 will be described later with reference to FIG. 52.

The operation screens 541 and 542 arranged to the right of the operation screen 543 are, respectively, operation screens for controlling settings of the devices 200 (air conditioners in FIG. 8). A name or an abbreviated name of a corresponding device is described at center in an upper part of the operation screens 541 and 542.

In FIG. 8, the operation screen 541 that is adjacent to the right of the operation screen 543 is an operation screen for controlling a first air conditioner 201 installed in the room. The operation screen 541 includes a description that reads "air conditioner 1". The operation screen 542 that is adjacent to the right of the operation screen 541 is an operation screen for controlling a second air conditioner 201 installed in the room. The operation screen 541 includes a description that reads "air conditioner 2".

The operation screen 541 for controlling the first air conditioner 201 and the operation screen 542 for controlling the second air conditioner 201 respectively include a device icon 501, a simple control button 503, and a detail setting button 504. The simple control button 503 is for controlling on/off states of a power supply of the device 200 and includes an "on" button and an "off" button. The operation screens 541, 542, and 543 shown in FIG. 8 correspond to examples of the first operation screen.

The display control section 103 displays the "on" button or the "off" button of the simple control button 503 in a different color in accordance with a status 1709 of a device list 1700 (FIG. 25 to be described later) that is managed by the device management section 105. FIG. 8 shows that the first air conditioner is turned on but the second air conditioner is not. Accordingly, the user can readily learn the status of devices 200 (air conditioners in FIG. 8) that are installed in a room (the living room in FIG. 8).

When the user selects the simple control button 503 of any of the operation screens 541 and 542 in a state where the room screen 540 is displayed as shown in FIG. 8, the touch panel control section 102 detects the selection thereof. As a result, the device control section 106 generates a control command for controlling on/off states of the power supply of the device 200 corresponding to the selected simple control button 503. The device control section 106 transmits the generated control command to the relevant device 200 via the communication control section 107 and the network. In addition, in accordance with a selection of the simple control button 503 by the user, the display control section 103 changes display states of the "on" button and the "off" button.

In FIG. 8, for example, when the user selects the "off" button of the simple control button 503 of the operation screen 541 (an example of the first operation screen) of the first air conditioner, the touch panel control section 102 detects the selection thereof. As a result, the device control section 106 generates a control command for turning off the power supply of the first air conditioner in the living room. The device control section 106 transmits the generated control command to the first air conditioner in the living room via the communication control section 107 and the network. In addition, the display control section 103 restores the "on" button of the simple control button 503 of the operation screen 541 of the first air conditioner to a default color and changes the color of the "off" button.

In FIG. 8, for example, when the user selects the "on" button of the simple control button 503 of the operation screen 542 (an example of the second operation screen) of the second air conditioner, the touch panel control section 102 detects the selection thereof. As a result, the device control section 106 generates a control command for turning on the power supply of the second air conditioner in the living room. The device control section 106 transmits the generated control command to the second air conditioner in the living room via the communication control section 107 and the network. In addition, the display control section 103 restores the "off" button of the simple control button 503 of the operation screen 542 of the second air conditioner to a default color and changes the color of the "on" button.

In FIG. 8, for example, when the user selects the "all off" button of the device type collective control button 532, the touch panel control section 102 detects the selection thereof. As a result, the device control section 106 generates a control command for turning off the power supplies of all of the air conditioners in the room (the living room in FIG. 8). In addition, the device control section 106 transmits the generated control command to all of the air conditioners in the living room via the communication control section 107 and the network. The display control section 103 changes the color of the "off" button of the simple control button 503 of the operation screens 541 and 542 and restores the color of the "on" button to a default color.

In FIG. 8, for example, when the user selects the "all on" button of the device type collective control button 532, the touch panel control section 102 detects the selection thereof. As a result, the device control section 106 generates a control command for turning on the power supplies of all of the air conditioners in the room (the living room in FIG. 8). In addition, the device control section 106 transmits the generated control command to all of the air conditioners in the living room via the communication control section 107 and the network. The display control section 103 changes the color of the "on" button of the simple control button 503 of the operation screens 541 and 542 and restores the color of the "off" button to a default color.

FIG. 9 is a diagram showing another example of the detail control screen 522 displayed on the display 101 of the home controller 100. When the user selects the detail setting button 504 of any of the operation screens 541 and 542 in a state where the room screen 540 including the operation screens 541, 542, and 543 is displayed on the display 101 as shown in FIG. 8, the touch panel control section 102 detects the selection thereof. As a result, the display control section 103 displays the detail control screen 522 of the device 200 corresponding to the selected operation screen 541 or 542 on the display 101 in a lower half of the room screen 540 so as to overlap with the operation screens 541, 542, and 543.

In FIG. 8, for example, when the user selects the detail setting button 504 (an example of the operation button) of the operation screen 541 of the first air conditioner, the touch panel control section 102 detects the selection thereof. As a result, as shown in FIG. 9, the display control section 103 displays the detail control screen 522 (an example of the second operation screen) of the first air conditioner on the display 101.

As shown in FIG. 9, the detail control screen 522 includes the detail control button 505 and a close button 508. The detail control button 505 is the same as the detail control button 505 shown in FIG. 7.

In FIG. 9, for example, when the user selects the close button 508, the touch panel control section 102 detects the selection thereof. As a result, the display control section 103 restores the display state of the display 101 and displays the room screen 540 shown in FIG. 8 on the display 101.

As shown in FIG. 9, the display control section 103 displays the detail control screen 522 and the operation screen 541 of the first air conditioner so as to come into contact with each other. In addition, the display control section 103 displays the detail control screen 522 so as to be separated from the operation screen 543 of all air conditioners and the operation screen 542 of the second air conditioner. According to this display, the user can readily understand that the detail control screen 522 shown in FIG. 9 is the detail control screen 522 of the first air conditioner.

Subsequently, in the display screen shown in FIG. 9, for example, when the user selects an operation screen 542 or 543 other than the operation screen 541 of the first air conditioner, the touch panel control section 102 detects the selection thereof. As a result, the display control section 103 displays the detail control screen 522 of the device 200 corresponding to the selected operation screen on the display 101.

Figure 10:
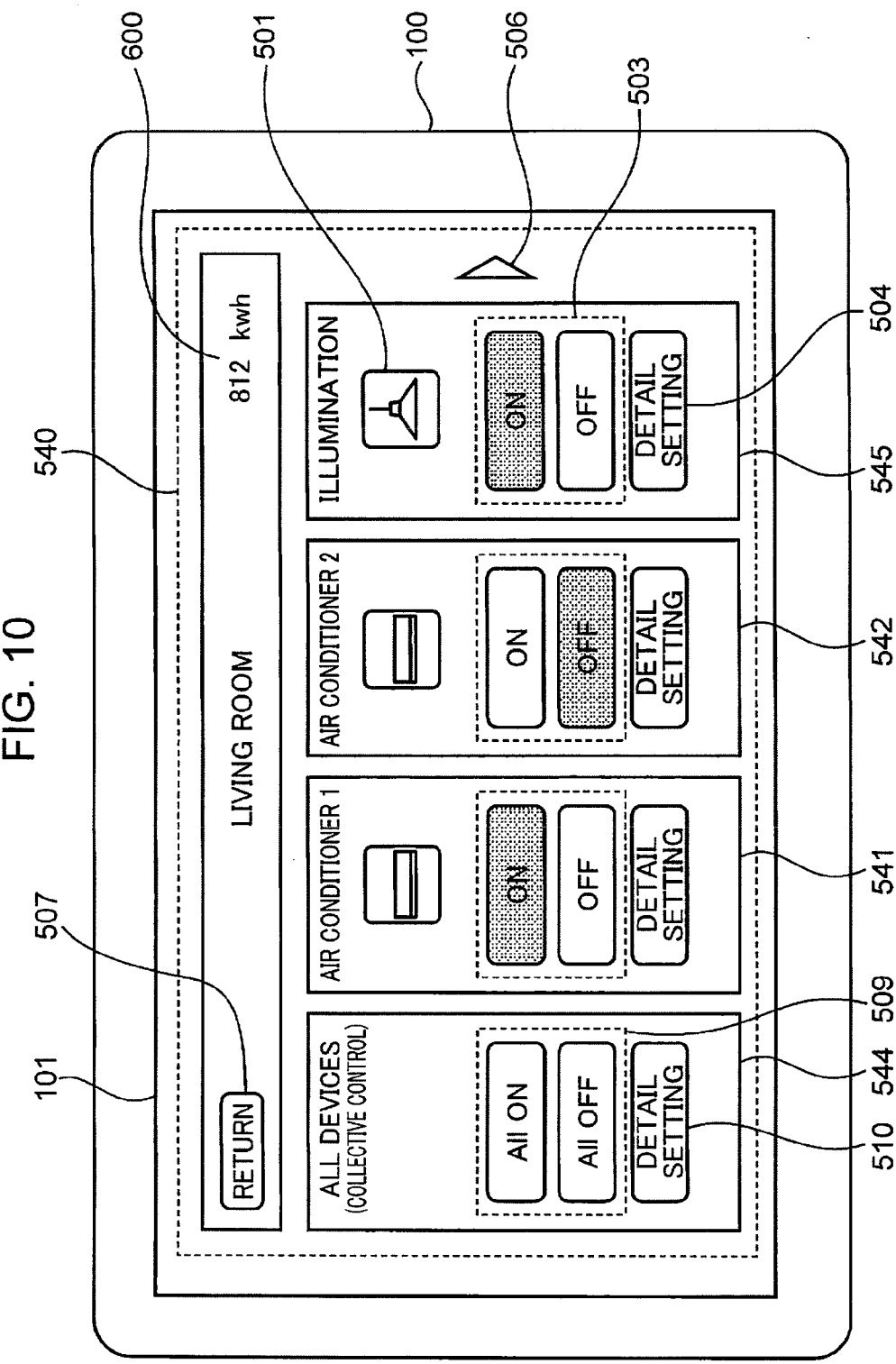
FIG. 10 is a diagram showing another example of a room screen that is displayed on a display of a home controller according to an embodiment of the present disclosure.

FIG. 10 is a diagram showing another example of the room screen 540 displayed on the display 101 of the home controller 100. When the user selects the room icon 502 on the basic screen shown in FIG. 5, the touch panel control section 102 detects the selection thereof. As a result, the display control section 103 displays the room screen 540 representing a room corresponding to the selected room icon 502 on the display 101.

On the basic screen shown in FIG. 5, the all-types icon 546 is selected by default as described earlier. Therefore, the room screen 540 shown in FIG. 10 includes operation screens of all of the devices that are installed in the room corresponding to the selected room icon 502. In other words, the room screen 540 includes the display field 600 for displaying power consumption of the room, the next page button 506, the return button 507, and operation screens 541, 542, 544, and 545.

When the touch panel control section 102 detects the selection of the next page button 506 by the user, the display control section 103 scrolls the operation screens 541, 542, 544, and 545 and displays the operation screen for controlling the other devices 200 installed in the room on the display 101.

The operation screen 544 at the left end in FIG. 10 is an operation screen for controlling settings of all of the devices 200 that are installed in the room. The operation screen 544 includes a description that reads "all devices (collective control)". The operation screen 544 will be described later with reference to FIGS. 18 and 19.

The operation screens 541 and 542 are respectively the same as the operation screens 541 and 542 shown in FIG. 8. The operation screen 545 is an operation screen for controlling the illumination device 202 installed in the room. The operation screen 545 includes a description that reads "illumination". The operation screen 545 also includes the device icon 501, the simple control button 503, and the detail setting button 504 in a similar manner to the operation screens 541 and 542. The operation screens 541 and 542 shown in FIG. 10 correspond to examples of the first operation screen and the operation screen 544 shown in FIG. 10 corresponds to an example of the collective operation screen.

In FIG. 10, for example, when the user selects the "off" button of the simple control button 503 of the operation screen 545, the touch panel control section 102 detects the selection thereof. As a result, the device control section 106 generates a control command for turning off the power supply of the illumination device in the living room. The device control section 106 transmits the generated control command to the illumination device in the living room via the communication control section 107 and the network. In addition, the display control section 103 restores the "on" button of the simple control button 503 of the operation screen 545 of the illumination device to a default color and changes the color of the "off" button.

Figure 11:
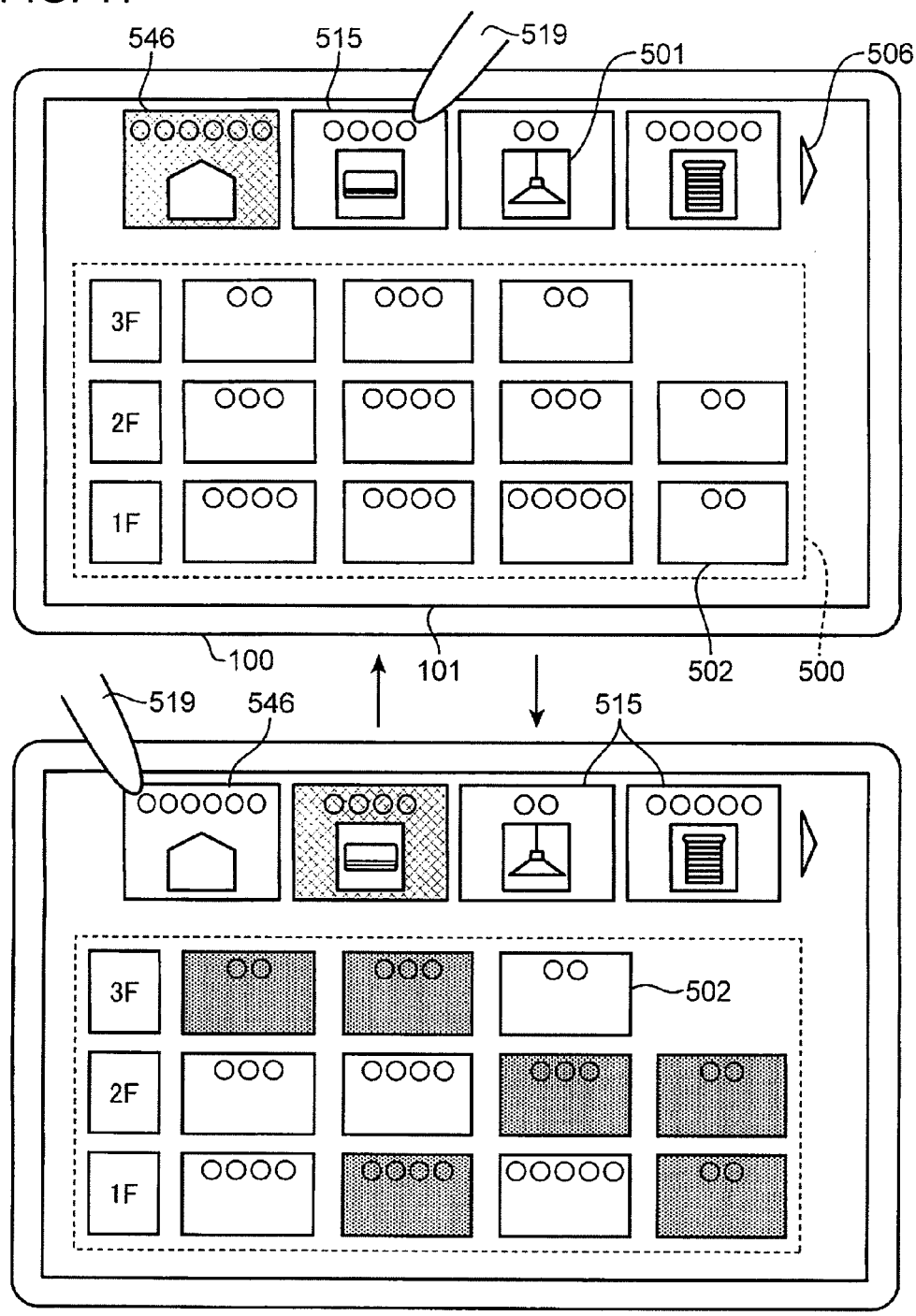
FIG. 11 is a diagram showing an example of transition of a display screen on a display according to an embodiment of the present disclosure.
Figure 12:
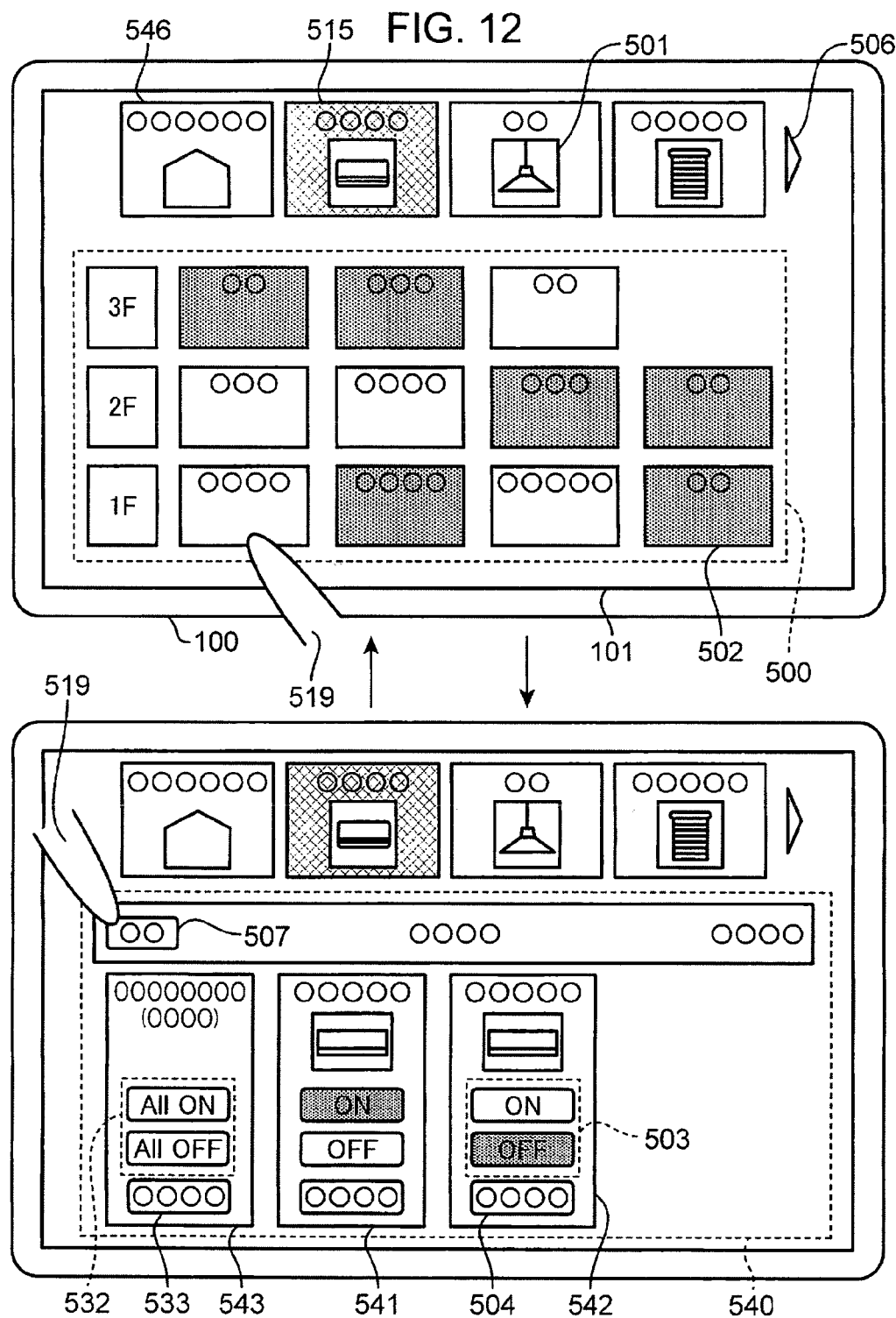
FIG. 12 is a diagram showing an example of transition of a display screen on a display according to an embodiment of the present disclosure.
Figure 13:
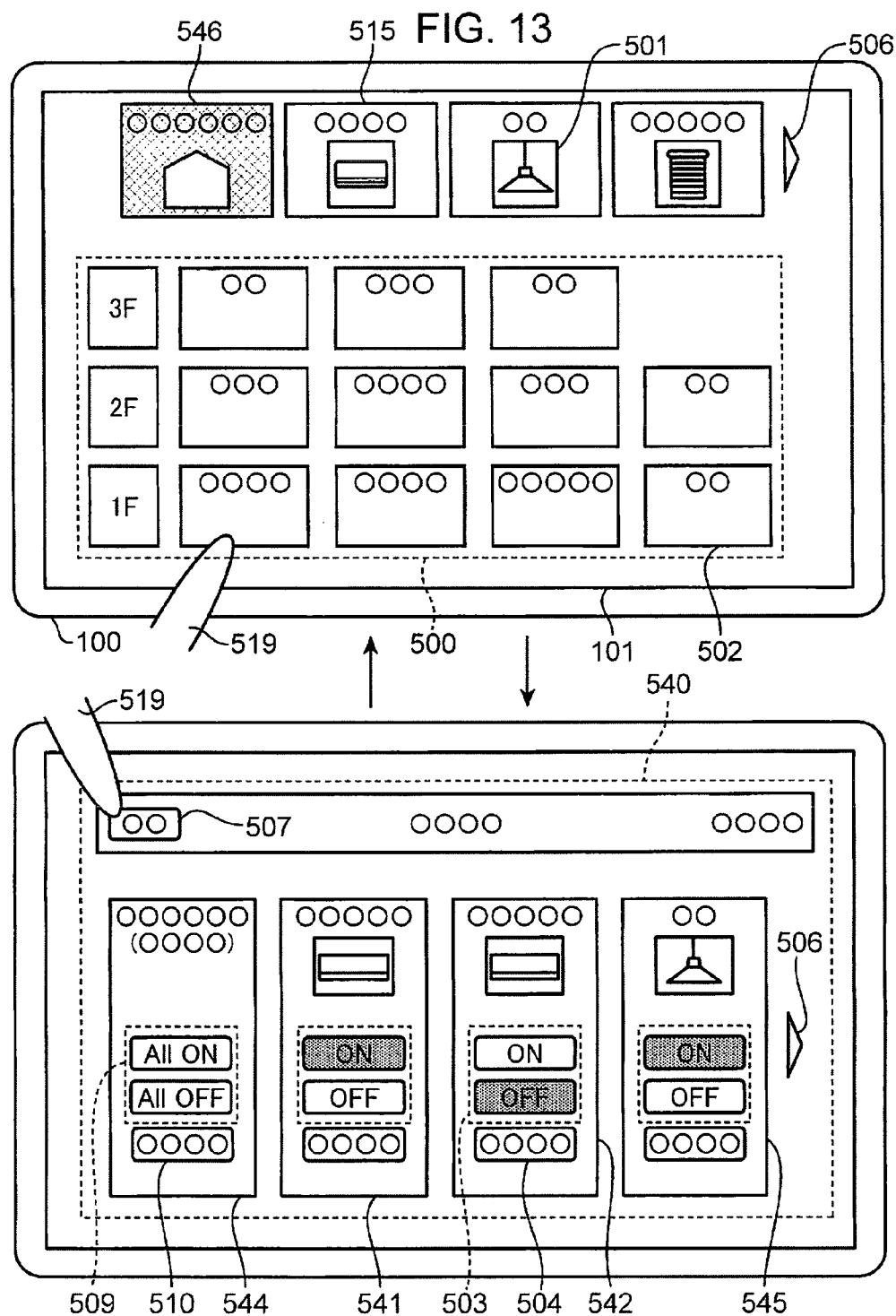
FIG. 13 is a diagram showing an example of transition of a display screen on a display according to an embodiment of the present disclosure.
Figure 14:
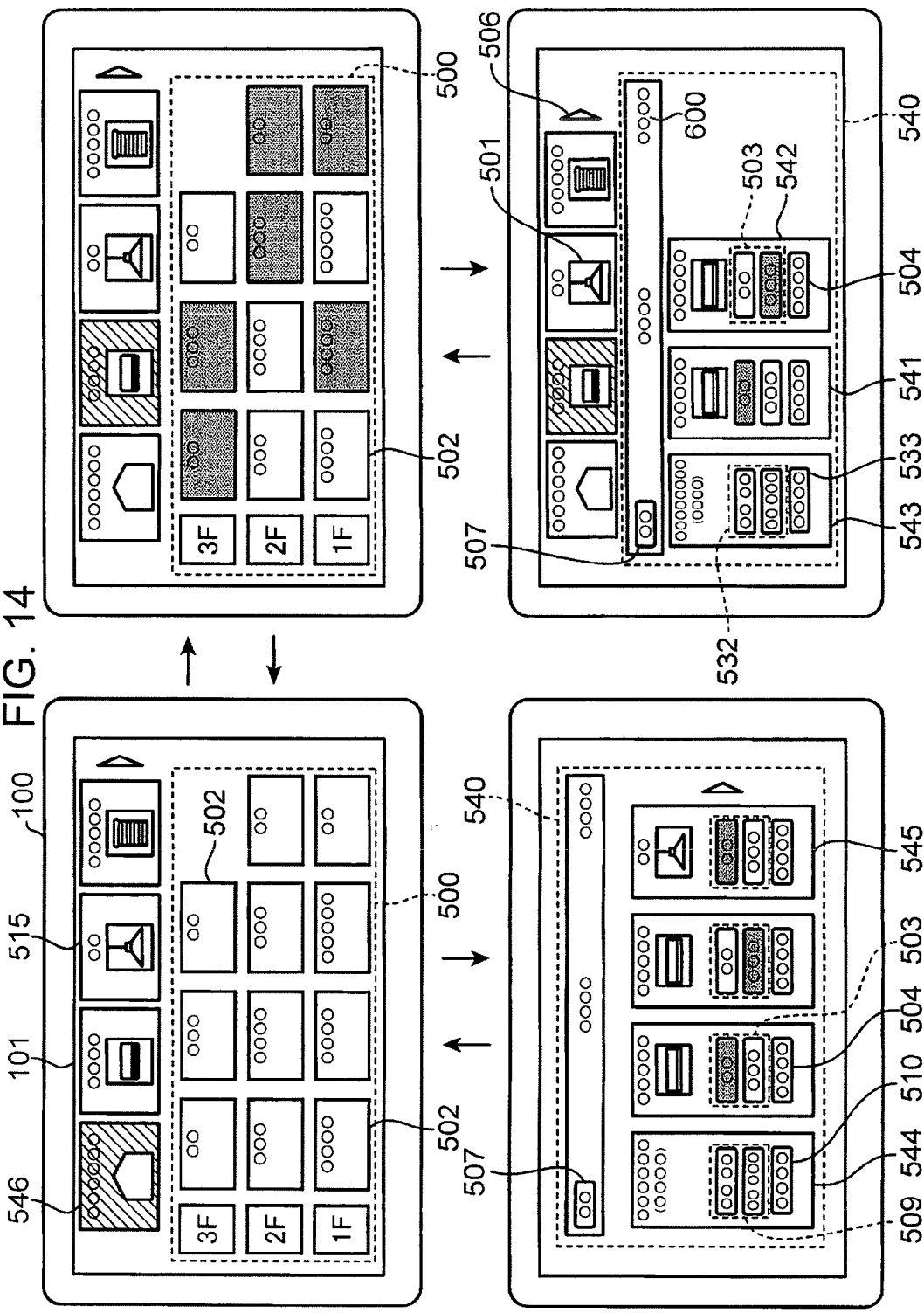
FIG. 14 is a diagram showing an example of transition of a display screen on a display according to an embodiment of the present disclosure.

FIGS. 11 to 14 are diagrams showing examples of transition of a display screen on the display 101 according to the present embodiment. An upper diagram in FIG. 11 shows the basic screen shown in FIG. 5 and a lower diagram in FIG. 11 shows the display screen shown in FIG. 6A. An upper diagram in FIG. 12 shows the display screen shown in FIG. 6A and a lower diagram in FIG. 12 shows the display screen shown in FIG. 8. An upper diagram in FIG. 13 shows the basic screen shown in FIG. 5 and a lower diagram in FIG. 13 shows the display screen shown in FIG. 10. An upper left diagram in FIG. 14 shows the basic screen shown in FIG. 5, an upper right diagram in FIG. 14 shows the display screen shown in FIG. 6A, a lower right diagram in FIG. 14 shows the display screen shown in FIG. 8, and a lower left diagram in FIG. 14 shows the display screen shown in FIG. 10.

On the basic screen shown in the upper diagram in FIG. 11 (the upper left diagram in FIG. 14, FIG. 5), when the user brings a contacting object (for example, a finger of the user) 519 into contact with a device type icon 515 (in this case, the device type icon 515 representing an air conditioner) which represents a type of the device 200 to be controlled, the contact is detected by the touch panel control section 102. As a result, for example, the display control section 103 changes the color of the contacted device type icon 515 as shown in the lower diagram in FIG. 11 (the upper right diagram in FIG. 14, FIG. 6A). In addition, the display control section 103 makes a display mode of the room icon 502 representing the room in which the device 200 corresponding to the device type icon 515 is installed different from a display mode of the room icon 502 representing the room in which the device 200 corresponding to the device type icon 515 is not installed. Accordingly, the display state of the basic screen makes a transition to a display state of the display screen in which the device type icon 515 is selected on the basic screen.

On the other hand, when the user brings the contacting object 519 into contact with the all-types icon 546 on the display screen shown in the lower diagram in FIG. 11 (the upper right diagram in FIG. 14), the contact is detected by the touch panel control section 102. As a result, for example, the display control section 103 displays the all-types icon 546 in a different color and restores the device type icon 515 of air conditioners and all of the room icons 502 to default settings as shown in the upper diagram in FIG. 11 (the upper left diagram in FIG. 14). Accordingly, the display state of the display screen in which the device type icon 515 is selected on the basic screen makes a transition to the display state of the basic screen.

Next, when the user brings the contacting object 519 into contact with the room icon 502 representing the living room in the display state shown in the upper diagram in FIG. 12 (the upper right diagram in FIG. 14, FIG. 6A), the contact is detected by the touch panel control section 102. As a result, as shown in the lower diagram in FIG. 12 (the lower right diagram in FIG. 14, FIG. 8), the display control section 103 displays the room screen 540 corresponding to the living room on the display 101. Accordingly, the display state of the display screen in which the device type icon 515 is selected on the basic screen makes a transition to the display state of the room screen 540.

On the other hand, when the user brings the contacting object 519 into contact with the return button 507 in the display state of the room screen 540 shown in the lower diagram in FIG. 12 (the lower right diagram in FIG. 14), the contact is detected by the touch panel control section 102. As a result, as shown in the upper diagram in FIG. 12 (the upper right diagram in FIG. 14), the display control section 103 displays the original display screen on the display 101. Accordingly, the display state of the room screen 540 makes a transition to a display state of the display screen in which the device type icon 515 is selected on the basic screen.

Next, when the user brings the contacting object 519 into contact with the room icon 502 representing a room (in this case, the living room) in which the device 200 to be controlled is installed on the basic screen shown in the upper diagram in FIG. 13 (the upper left diagram in FIG. 14, FIG. 5), the contact is detected by the touch panel control section 102. As a result, as shown in the lower diagram in FIG. 13 (the lower left diagram in FIG. 14, FIG. 10), the display control section 103 displays the room screen 540 including operation screens of all of the devices installed in the room on the display 101. Accordingly, the display state of the basic screen makes a transition to the display state of the room screen 540.

On the other hand, when the user brings the contacting object 519 into contact with the return button 507 in the display state of the room screen 540 shown in the lower diagram in FIG. 13 (the lower left diagram in FIG. 14), the contact is detected by the touch panel control section 102. As a result, as shown in the upper diagram in FIG. 13 (the upper left diagram in FIG. 14), the display control section 103 displays the basic screen on the display 101. Accordingly, the display state of the room screen 540 makes a transition to the display state of the basic screen.

Figure 15:
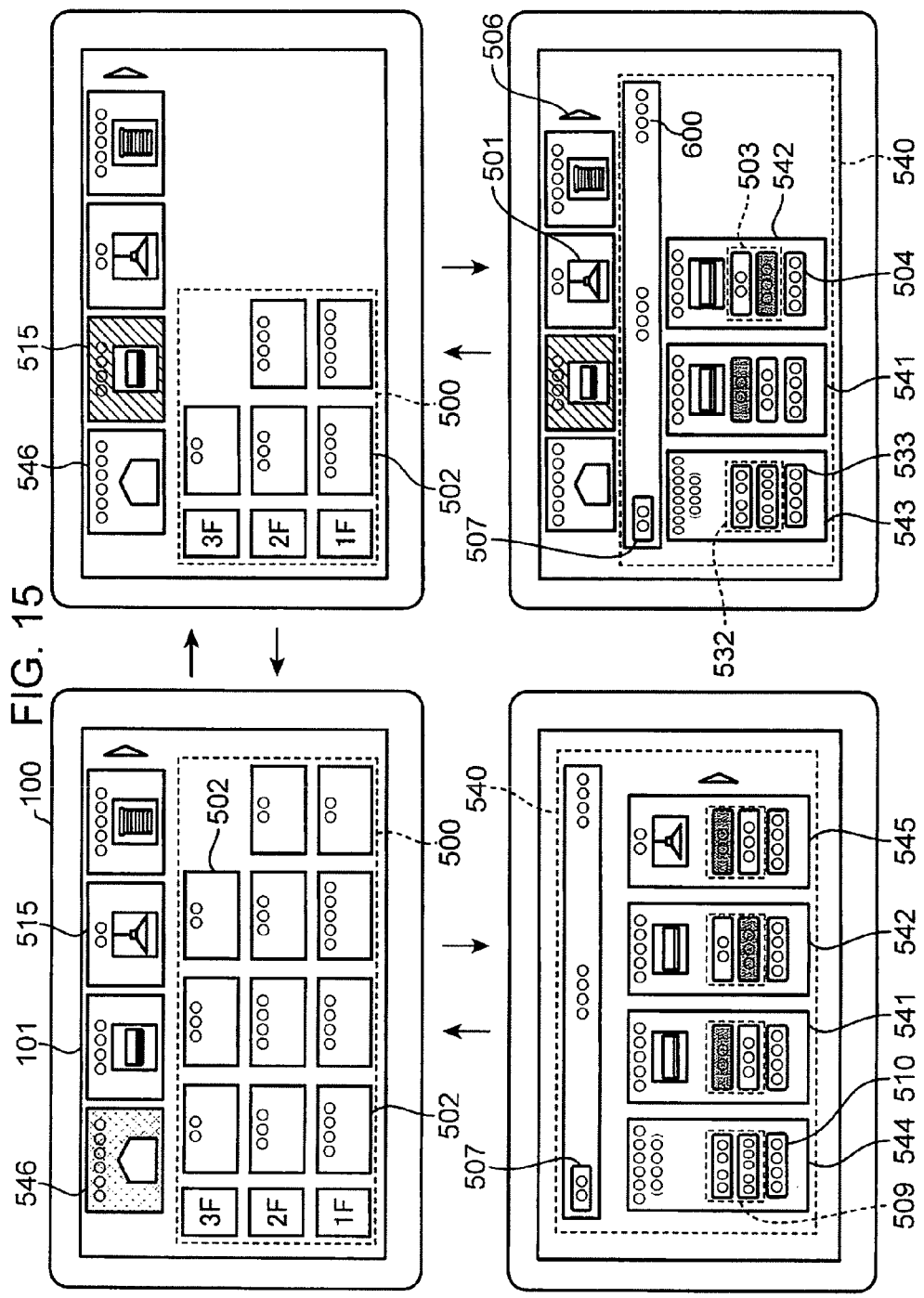
FIG. 15 is a diagram showing another example of transition of a display screen on a display according to an embodiment of the present disclosure.

FIG. 15 is a diagram showing another example of transition of a display screen on the display 101 according to the present embodiment. An upper left diagram, a lower right diagram, and a lower left diagram in FIG. 15 are respectively the same as the upper left diagram, the lower right diagram, and the lower left diagram in FIG. 14. The upper left diagram in FIG. 15 shows the basic screen shown in FIG. 5. The upper right diagram in FIG. 15 shows the basic screen shown in FIG. 6C. FIG. 15 differs from FIG. 14 solely in the display screen in the upper right diagram and is otherwise exactly the same as FIG. 14. In FIG. 15, the display screen makes a transition in exactly the same manner as in FIG. 14.

Figure 16:
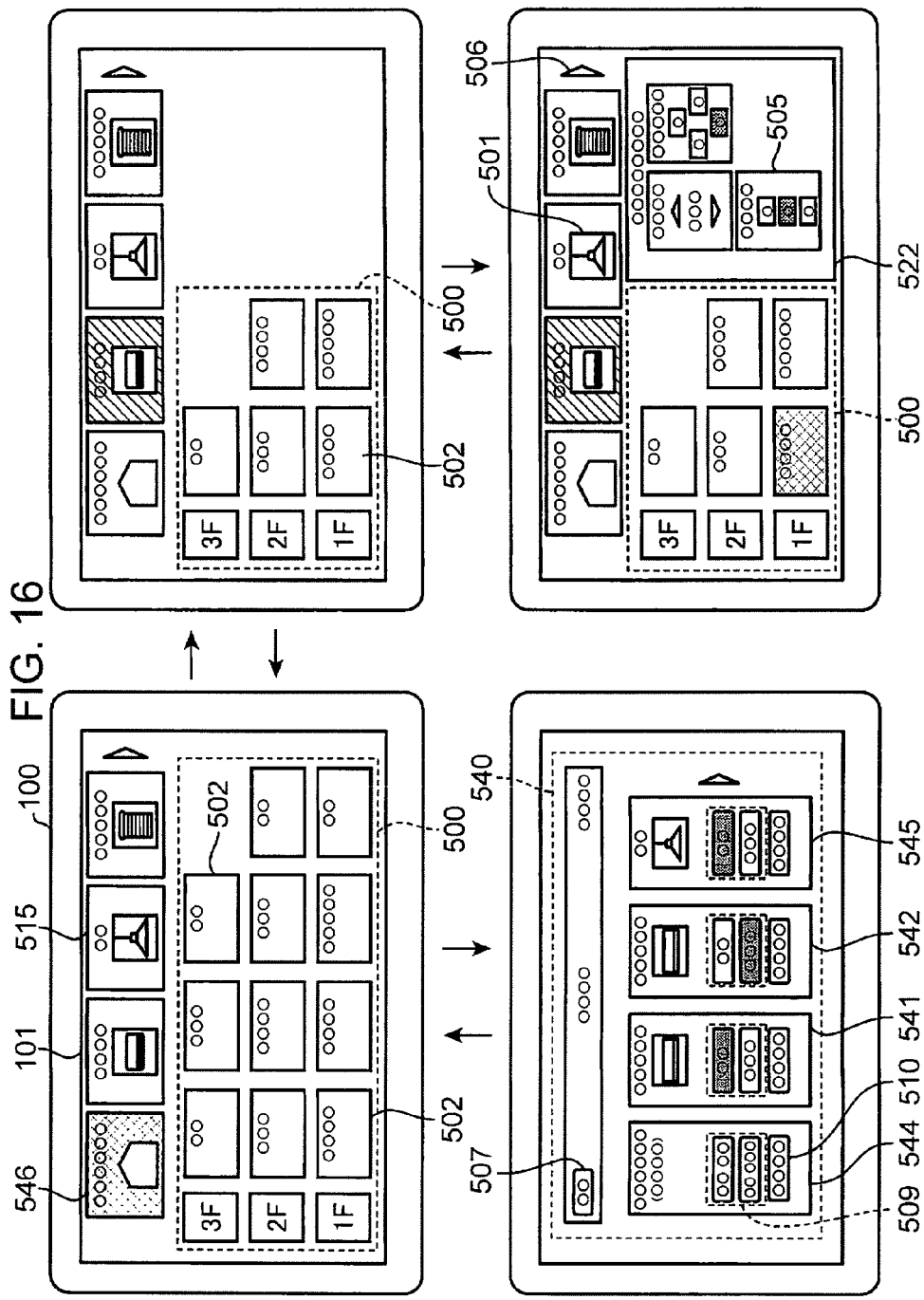
FIG. 16 is a diagram showing yet another example of transition of a display screen on a display according to an embodiment of the present disclosure.

FIG. 16 is a diagram showing yet another example of transition of a display screen on the display 101 according to the present embodiment. An upper left diagram in FIG. 16 shows the basic screen shown in FIG. 5, an upper right diagram in FIG. 16 shows the display screen shown in FIG. 6C, a lower right diagram in FIG. 16 shows the display screen shown in FIG. 7, and a lower left diagram in FIG. 16 shows the display screen shown in FIG. 10.

The upper left diagram in FIG. 16 (FIG. 5) shows the same basic screen as the upper left diagram in FIG. 14 (FIG. 5). The upper right diagram in FIG. 16 differs from the upper right diagram in FIG. 14 solely in the display mode of the room icon 502. The transition of display screens between the upper left diagram and the upper right diagram in FIG. 16 is performed in a similar manner to the transition of display screens between the upper left diagram and the upper right diagram in FIG. 14.

Next, in the upper right diagram in FIG. 16, when the user brings the contacting object into contact with the room icon 502 representing a room (in this case, the living room) in which the device 200 to be controlled is installed, the contact is detected by the touch panel control section 102. As a result, as shown in the lower right diagram in FIG. 16, the display control section 103 displays the room icon 502 representing the living room in, for example, a different color. In addition, the display control section 103 displays the detail control screen 522 for controlling the air conditioner in the living room in a vacant area of the display 101 which had been created by the reduction in size of the floor plan 500. Accordingly, the display state of the display screen in which the device type icon 515 is selected on the basic screen makes a transition to the display state of the detail control screen 522.

Meanwhile, in the display state of the detail control screen 522 shown in the lower right diagram in FIG. 16, when the user brings the contacting object into contact with the room icon 502 representing the living room, the contact is detected by the touch panel control section 102. As a result, the display control section 103 restores an original display state as shown in the upper right diagram in FIG. 16. Accordingly, the display state of the detail control screen 522 makes a transition to a display state of the display screen in which the device type icon 515 is selected on the basic screen.

The upper left diagram and the lower left diagram in FIG. 16 are respectively the same as the upper left diagram and the lower left diagram in FIG. 14, and a transition of display screens between the upper left diagram and the lower left diagram in FIG. 16 is performed in a similar manner to the transition of display screens between the upper left diagram and the lower left diagram in FIG. 14.

Figure 17:
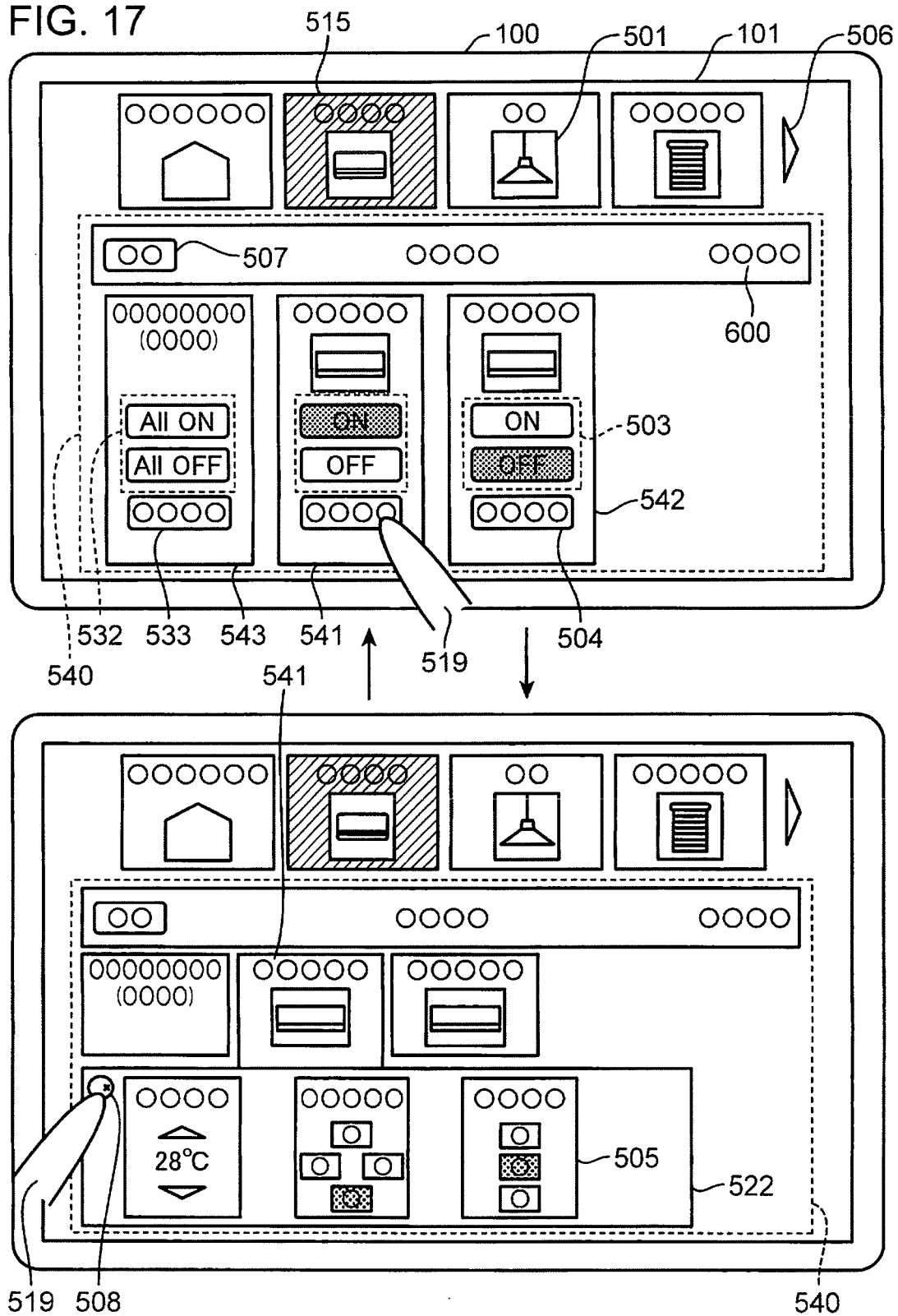
FIG. 17 is a diagram showing still another example of transition of a display screen on a display according to an embodiment of the present disclosure.

FIG. 17 is a diagram showing still another example of transition of a display screen on the display 101 according to the present embodiment. An upper diagram in FIG. 17 shows the display screen shown in FIG. 8 and a lower diagram in FIG. 17 shows the display screen shown in FIG. 9.

In the display state of the operation screens 541, 542, and 543 shown in the upper diagram in FIG. 17 (FIG. 8), when the user brings the contacting object 519 into contact with the detail setting button 504 included in the operation screen 541 of the first air conditioner, the contact is detected by the touch panel control section 102. As a result, as shown in the lower diagram in FIG. 17 (FIG. 9), the display control section 103 displays the detail control screen 522 of the first air conditioner on the display 101. Accordingly, the display state of the room screen 540 including the operation screens 541, 542, and 543 makes a transition to the display state of the room screen 540 including the detail control screen 522.

On the other hand, when the user brings the contacting object 519 into contact with the close button 508 in the display state of the detail control screen 522 shown in the lower diagram in FIG. 17 (FIG. 9), the contact is detected by the touch panel control section 102. As a result, as shown in the upper diagram in FIG. 17 (FIG. 8), the display control section 103 displays the operation screens 541, 542, and 543 on the display 101. Accordingly, the display state of the room screen 540 including the detail control screen 522 makes a transition to the display state of the room screen 540 which includes the operation screens 541, 542, and 543 but does not include the detail control screen 522.

Figure 18:
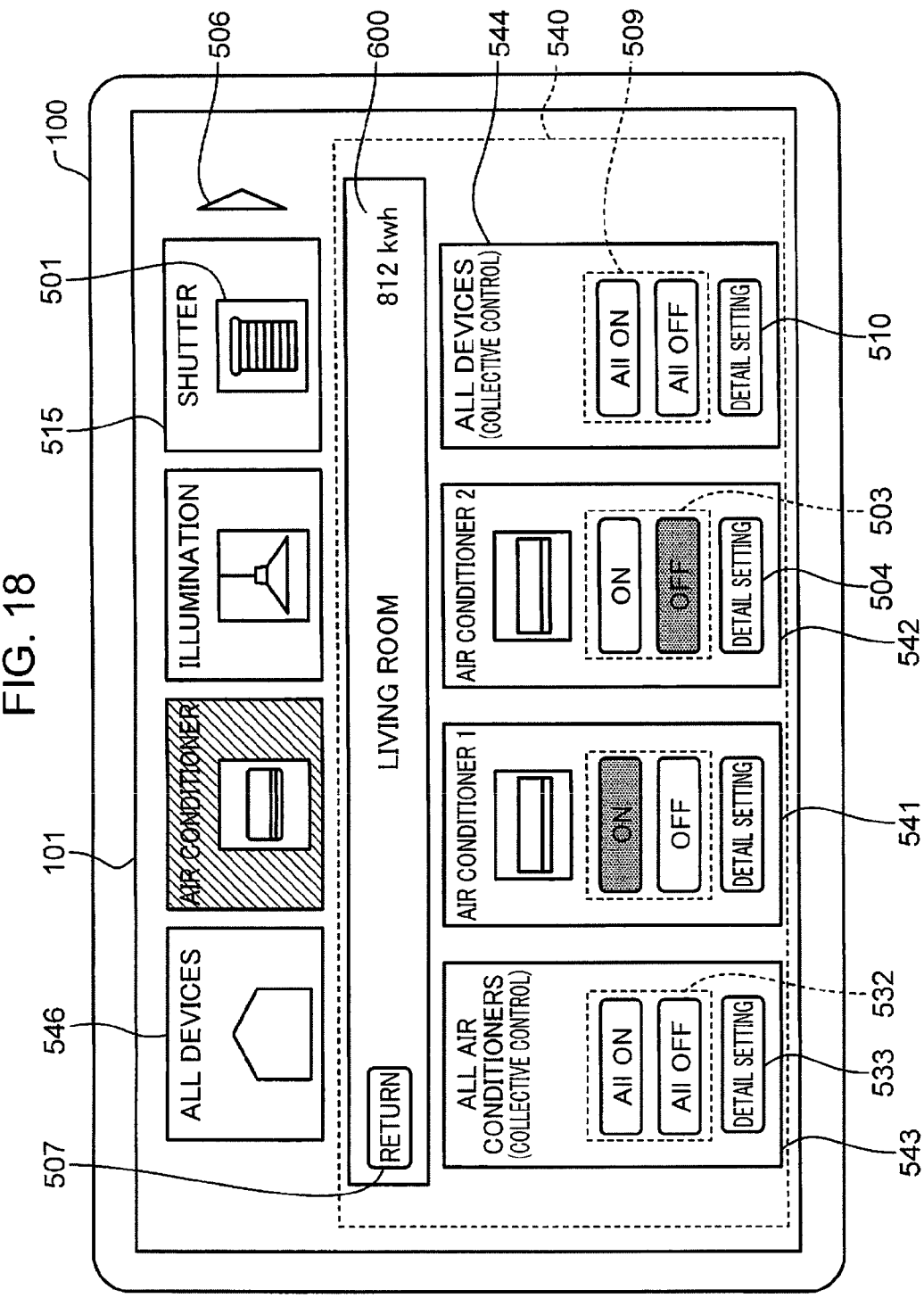
FIG. 18 is a diagram showing yet another example of a room screen that is displayed on a display of a home controller according to an embodiment of the present disclosure.

FIG. 18 is a diagram showing yet another example of the room screen 540 displayed on the display 101 of the home controller 100. When the user selects the room icon 502 in the display state of the display screen in which the device type icon 515 has been selected on the basic screen as shown in FIG. 6A, the touch panel control section 102 detects the selection thereof. As a result, the display control section 103 displays the room screen 540 representing a room corresponding to the selected room icon 502 on the display 101.

The room screen 540 shown in FIG. 18 includes the operation screen 544 for controlling settings of all of the devices 200 installed in the room in addition to the display field 600 for displaying power consumption of the room, the return button 507, and the operation screens 541, 542, and 543 of devices (in FIG. 18, air conditioners) that correspond to the selected device type icon 515. The operation screen 544 is the same as the operation screen 544 shown in FIG. 10.

The operation screen 544 for controlling all of the devices 200 installed in the room includes a collective control button 509 and a collective control setting button 510. The collective control button 509 includes an "all off" button and an "all on" button.

When the user selects the "all off" button of the collective control button 509 in a state where the room screen 540 is displayed on the display 101 as shown in FIG. 18, the touch panel control section 102 detects the selection thereof. As a result, the device control section 106 generates a control command for turning off the power supplies of all of the devices 200 in the room (the living room in FIG. 18). In addition, the device control section 106 transmits the generated control command to all of the devices 200 in the living room via the communication control section 107 and the network. The display control section 103 changes the color of the "off" button of the simple control button 503 of the operation screens 541 and 542 and changes the color of the "on" button to a default color.

When the user selects the "all on" button of the collective control button 509 in a state where the room screen 540 is displayed on the display 101 as shown in FIG. 18, the touch panel control section 102 detects the selection thereof. As a result, the device control section 106 generates a control command for turning on the power supplies of all of the devices 200 in the room (the living room in FIG. 18). In addition, the device control section 106 transmits the generated control command to all of the devices 200 in the living room via the communication control section 107 and the network. The display control section 103 changes the color of the "on" button of the simple control button 503 of the operation screens 541 and 542 and changes the color of the "off" button to a default color.

When the user selects the collective control setting button 510 in a state where the room screen 540 is displayed on the display 101 as shown in FIG. 18, the touch panel control section 102 detects the selection thereof. As a result, the display control section 103 displays a collective control setting screen 525 shown in FIG. 19 in the room screen 540 so as to overlap with lower half portions of the operation screens 541 to 544.

Figure 19:
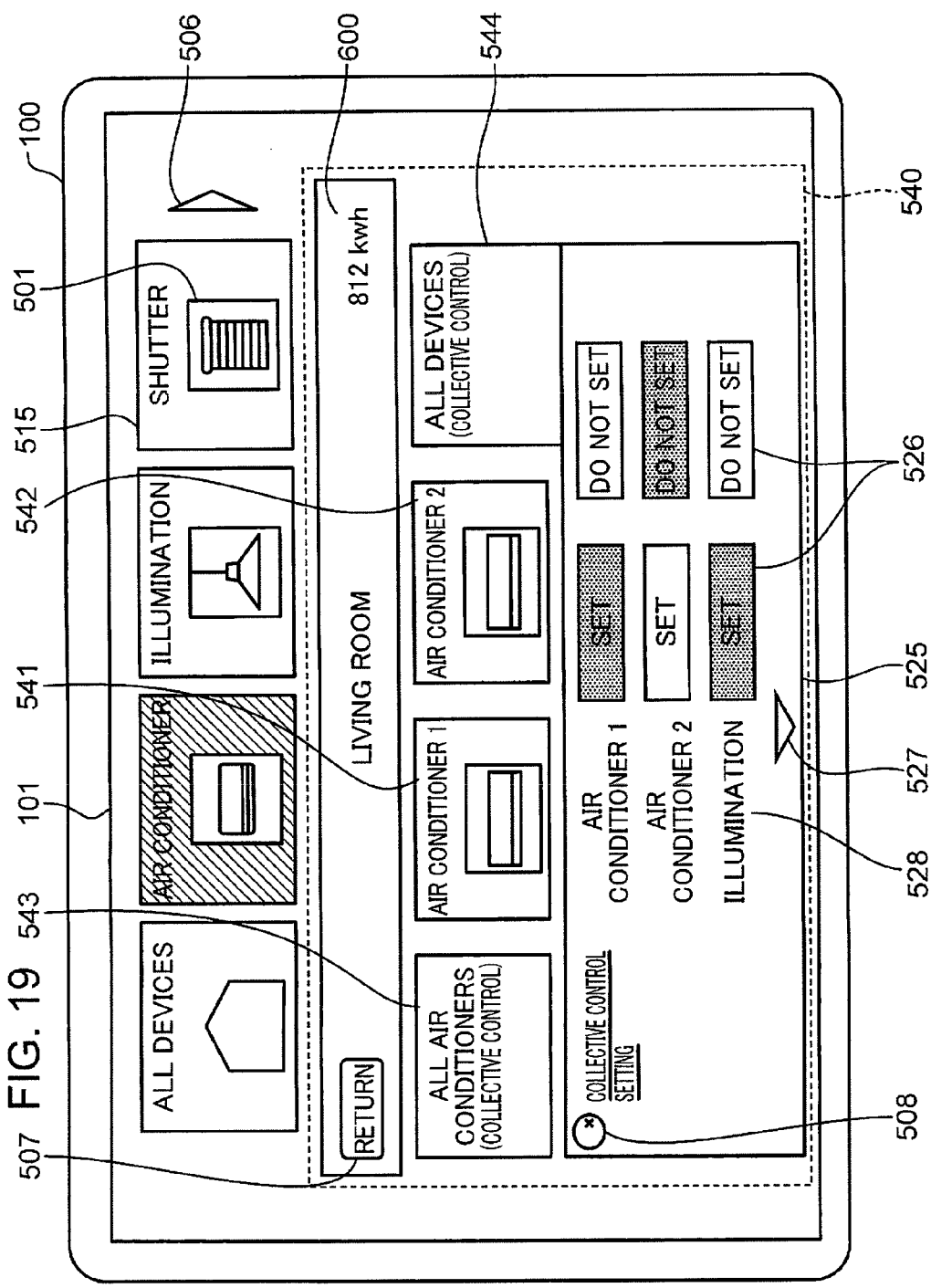
FIG. 19 is a diagram showing an example of a collective control setting screen that is displayed on a display of a home controller according to an embodiment of the present disclosure.

FIG. 19 is a diagram showing an example of the collective control setting screen 525 displayed on the display 101 of the home controller 100. The collective control setting screen 525 includes a close button 508, a setting button 526, a next page button 527, and a device name 528. The setting button 526 includes a "set" button and a "do not set" button. The collective control setting screen 525 includes a description that reads "collective control setting" at a left end thereof and is configured so as to be clearly recognizable as the collective control setting screen 525.

The device name 528 is described to the right of where the description reading "collective control setting" is located. As the device name 528, in the example shown in FIG. 19, "air conditioner 1" that represents the first air conditioner is described in a first row, "air conditioner 2" that represents the second air conditioner is described in a second row, and "illumination" that represents an illumination device is described in a third row. The setting button 526 is arranged in correspondence with each of the device names 528.

As shown in FIG. 19, the display control section 103 displays the collective control setting screen 525 and the operation screen 544 of all devices so as to come into contact with each other. In addition, the display control section 103 displays the collective control setting screen 525 and the respective operation screens 541, 542, and 543 so as to be separated from one another. Due to this display state, the user can readily understand that the collective control setting screen 525 shown in FIG. 19 is a screen that corresponds to the operation screen 544 of all devices.

When the user selects, for example, the "do not set" button of the setting button 526 corresponding to the second air conditioner in a state where the collective control setting screen 525 is displayed, the touch panel control section 102 detects the selection thereof. As a result, the display control section 103 changes the color of the "do not set" button of the setting button 526 corresponding to the second air conditioner as shown in FIG. 19. In addition, the device control section 106 removes the second air conditioner from control targets of the collective control button 509 shown in FIG. 18.

Once the second air conditioner is removed from the control targets of the collective control button 509, even if the touch panel control section 102 detects selection of the "all off" button of the collective control button 509 by the user, the device control section 106 does not generate a control command for turning off the power supply of the second air conditioner. In a similar manner, even if the touch panel control section 102 detects selection of the "all on" button of the collective control button 509 by the user, the device control section 106 does not generate a control command for turning on the power supply of the second air conditioner.

When the touch panel control section 102 detects selection of the next page button 527 by the user in a state where the collective control setting screen 525 shown in FIG. 19 is displayed, the display control section 103 scrolls the device name 528 and the setting button 526 and displays a screen for controlling setting of other devices 200 that are installed in the room on the display 101.

As described above, by providing the collective control setting screen 525, a device 200 whose operation is disrupted if a power supply thereof is turned off such as the refrigerator 205 can be excluded from the control targets of the collective control button 509.

Figure 20:
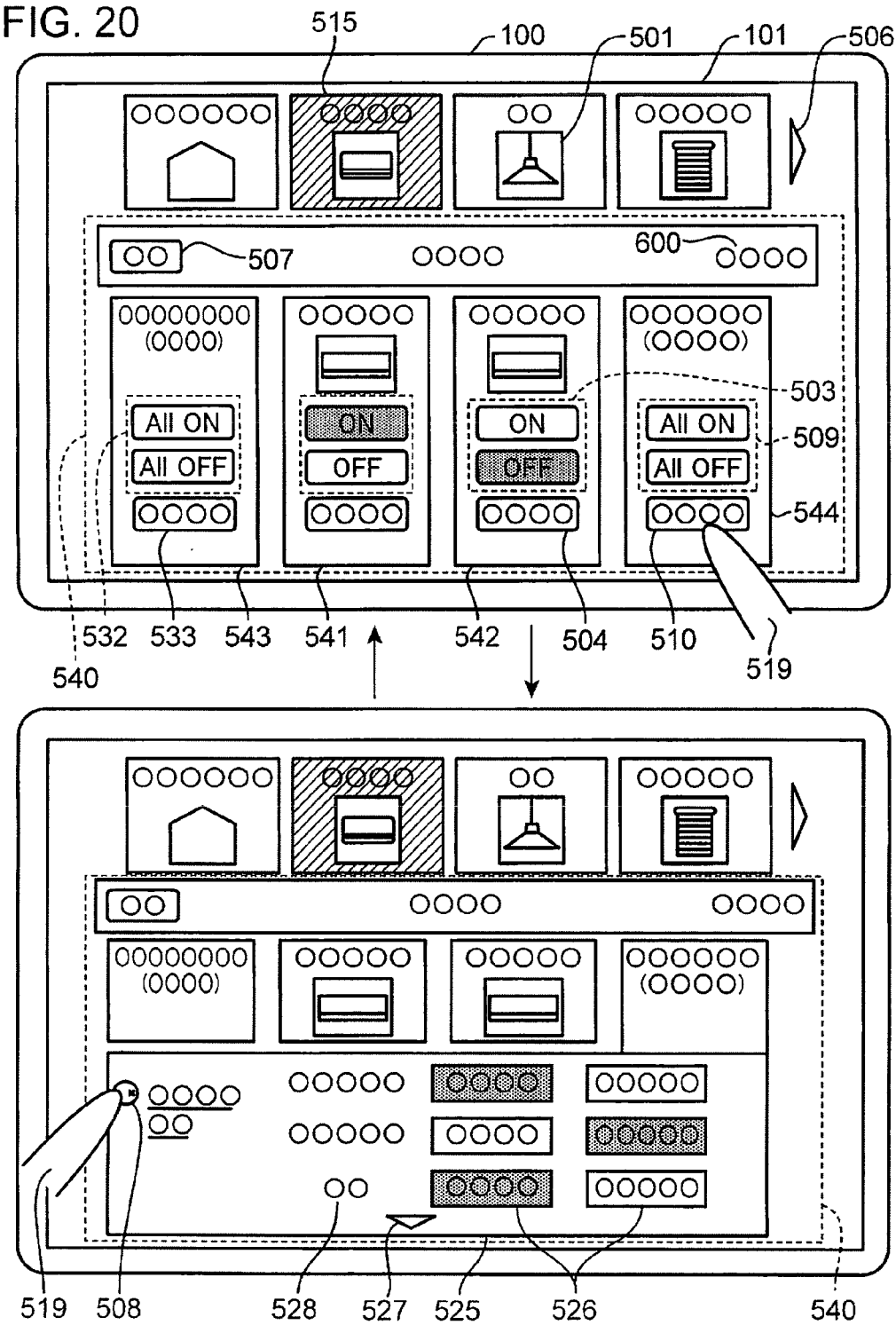
FIG. 20 is a diagram showing an example of transition of a display screen including a collective control setting screen according to an embodiment of the present disclosure.

FIG. 20 is a diagram showing an example of transition of a display screen including the collective control setting screen 525 according to the present embodiment. An upper diagram in FIG. 20 shows the display screen shown in FIG. 18 and a lower diagram in FIG. 20 shows the display screen shown in FIG. 19.

In the display state of the operation screens 541 to 544 shown in the upper diagram of FIG. 20 (FIG. 18), when the user brings the contacting object 519 into contact with the collective control setting button 510 of the operation screen 544 for all devices, the touch panel control section 102 detects the contact thereof. As a result, as shown in the lower diagram in FIG. 20 (FIG. 19), the display control section 103 displays the collective control setting screen 525 on the display 101. Accordingly, the display state of the room screen 540 including the operation screens 541 to 544 makes a transition to the display state of the room screen 540 including the collective control setting screen 525.

On the other hand, when the user brings the contacting object 519 into contact with the close button 508 in the display state of the collective control setting screen 525 shown in the lower diagram in FIG. 20 (FIG. 19), the contact is detected by the touch panel control section 102. As a result, as shown in the upper diagram in FIG. 20 (FIG. 18), the display control section 103 displays the operation screens 541 to 544 on the display 101. Accordingly, the display state of the room screen 540 including the collective control setting screen 525 makes a transition to the display state of the room screen 540 which includes the operation screens 541 to 544 but does not include the collective control setting screen 525.

Figure 21:
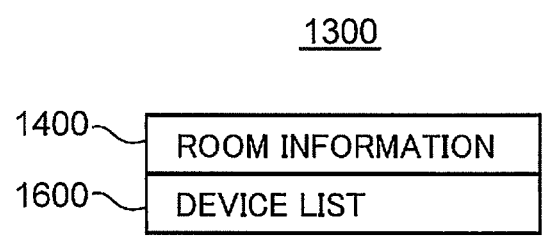
FIG. 21 is a diagram showing a configuration of home information according to an embodiment of the present disclosure.

FIG. 21 is a diagram showing a configuration of the home information 1300. The home information 1300 is managed per home by the server 300. Based on the home information 1300 acquired from the server 300, the home controller 100 controls display of the basic screen, the room icon 502, or the like. As shown in FIG. 21, the home information 1300 includes room information 1400 and a device list 1600 that is managed by the server 300.

FIG. 22 is a diagram showing a configuration of the room information 1400 that is managed by the server 300. As shown in FIG. 22, the room information 1400 includes a room ID 1401, a room type 1401 a story 1403, and power consumption 1404. The room ID 1401 is an identifier for identifying a room. The room type 1402 represents a type of a room. The story 1403 indicates which floor a room is on. The power consumption 1404 represents total power consumption by devices 200 installed in a room. For example, FIG. 22 shows that the total power consumption of all of the devices 200 including the air conditioner 201 and the illumination device 202 which are installed in the living room is 812 kwh.

Figure 23:
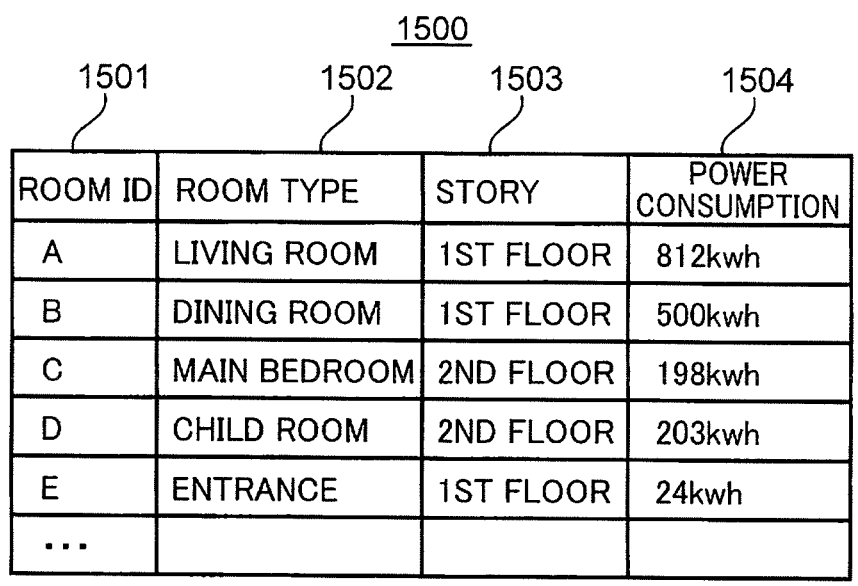
FIG. 23 is a diagram showing a configuration of room information that is managed by a home controller according to an embodiment of the present disclosure.

FIG. 23 is a diagram showing a configuration of the room information 1500 that is managed by the home controller 100. As shown in FIG. 23, the room information 1500 includes a room ID 1501, a room type 1502, a story 1503, and power consumption 1504 in a similar manner to the room information 1400. The home controller 100 acquires the room information 1400 from the server 300 and manages the acquired room information 1400 as the room information 1500. Moreover, the home controller 100 may acquire power consumption of each room from a distribution panel. Alternatively, the home controller 100 may obtain power consumption of each room by integrating power consumption of each device.

FIG. 24 is a diagram showing a configuration of the device list 1600 that is managed by the server 300. As shown in FIG. 24, the device list 1600 includes a device ID 1601, a device type 1602, a model 1603, an arrangement 1604, capability information 1605, a control command transmission destination 1606, power consumption 1607, and a status 1608.

The device ID 1601 is an identifier of the device 200. The device type 1602 represents a type of the device 200. The model 1603 represents a model of the device 200. The arrangement 1604 represents a room in which the device 200 is installed.

The capability information 1605 represents contents by which the device 200 can be controlled or a state that can be acquired from the device 200. For example, with respect to an air conditioner whose device ID is A, temperature, air flow direction, and air volume can be controlled. The control command transmission destination 1606 represents a transmission destination of a control command for controlling the device 200. For example, with the air conditioner whose device ID is A, since the control command transmission destination 1606 is a device, the control command is directly transmitted from the home controller 100 to the device 200. A control command is a command for operating the device 200 or checking the state of the device 200.

The power consumption 1607 represents power consumption by the device 200. For example, FIG. 24 shows that the power consumption corresponding to the device ID A is 204 kwh. The status 1608 represents a current status of the device 200. For example, FIG. 24 shows that a setting temperature of the air conditioner whose device ID is A is 27° C. and that an electric shutter apparatus whose device ID is E is closed.

Moreover, the device list 1600 that is managed by the server may be omitted from the home information 1300. In this case, the home controller 100 may acquire information corresponding to the device type 1602, the model 1603, and capability information 1605 which are described in the device list 1600 that is managed by the server directly from the device 200.

FIG. 25 is a diagram showing a configuration of the device list 1700 that is managed by the home controller 100. Based on information in this device list 1700, the home controller 100 arranges device type icons 515 on the basic screen and controls devices 200.

The device list 1700 includes a device ID 1701, a device type 1702, a model 1703, an arrangement 1704, capability information 1705, a control command transmission destination 1706, an IP address 1707, a power consumption 1708, and a status 1709. The device ID 1701 to the control command transmission destination 1706, the power consumption 1708, and the status 1709 share the same contents as items with the same names in FIG. 24.

In the device list 1700, contents of the device type 1702, the model 1703, the arrangement 1704, the capability information 1705, the control command transmission destination 1706, the power consumption 1708, and the status 1709 can be acquired by the device management section 105 by having the server 300 transmit the device list 1600. The IP address 1707 is acquired by the device management section 105 from the device 200. However, when the device type 1702, the model 1703, the capability information 1705, the control command transmission destination 1706, the power consumption 1708, and the status 1709 can be directly acquired from the device 200, the device management section 105 may prioritize such contents.

Moreover, as for the control command transmission destination 1706, contents determined in advance by the home controller system may be adopted instead of acquiring the control command transmission destination 1706 from the server 300 or the device 200, the control command transmission destination 1706 may be automatically determined based on a state of the network to which the home controller 100 is connected or the like, or the control command transmission destination 1706 may be set by the user. In addition, the home controller 100 may acquire power consumption of each device from a distribution panel. Alternatively, the home controller 100 may acquire the power consumption of each device directly from the device 200.

As shown in FIGS. 22 and 23, in the present embodiment, the room information is managed by both the home controller 100 and the server 300. Alternatively, the room information may be managed by only one of the home controller 100 and the server 300 (for example, the server 300), and the other of the home controller 100 and the server 300 (for example, the home controller 100) may acquire room information from the server 300 as needed.

In a similar manner, as shown in FIGS. 24 and 25, in the present embodiment, device lists are managed by both the home controller 100 and the server 300. Alternatively, a device list may be managed by only one of the home controller 100 and the server 300 (for example, the server 300), and the other of the home controller 100 and the server 300 (for example, the home controller 100) may acquire the device list from the server 300 as needed. In this case, the IP address 1707 in the device list 1700 that is managed by the home controller 100 may also be managed by the server 300.

Next, a flow of control of the device 200 by the home controller 100 will be described with reference to the drawings.

Figure 26:
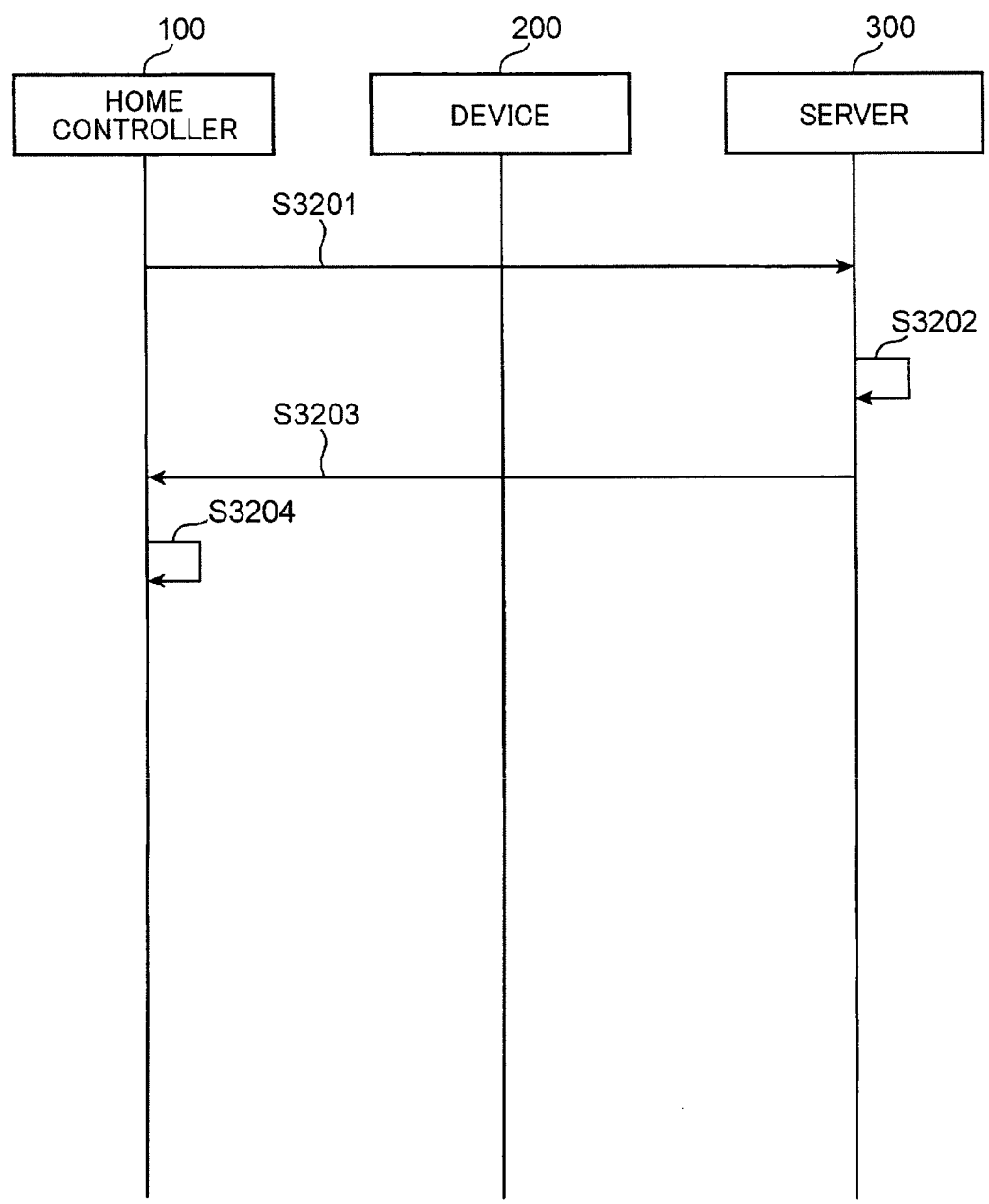
FIG. 26 is a sequence diagram showing a flow of processes by which a home controller acquires home information from a server according to an embodiment of the present disclosure.

FIG. 26 is a sequence diagram showing a flow of processes by which the home controller 100 acquires the home information 1300 from the server 300. The home controller 100 acquires the home information 1300 from the server 300 at an arbitrary timing such as upon initial use or upon activation. Based on the acquired home information 1300, the home controller 100 updates a display content on the display 101 by generating the basic screen shown in FIG. 5 or the like.

First, the device management section 105 of the home controller 100 transmits a home information request to the server 300 (S3201). In this case, the home information request at least includes a home controller ID that indicates a user of the home controller 100 or a home in which the home controller 100 is to be used. The home information management section 301 of the server 300 having received the home information request searches for home information 1300 corresponding to the home controller ID from the storage section 304 (S3202) and transmits the home information 1300 to the home controller 100 (S3203). The device management section 105 of the home controller 100 stores the home information 1300 received from the server 300 in the storage section 104 and, based on the home information 1300, the display control section 103 generates a basic screen and updates the display screen on the display 101 by displaying the generated basic screen on the display 101 or the like (S3204).

For example, the update of the display screen on the display 101 includes updates of all kinds of information such as an update of the room icon 502 as a result of a change made to the layout due to renovation or the like, an update of power consumption, registration of a newly installed device 200 and an update of the room icon 502, and an update of a status of the device 200. This description is also applicable to the update of a display screen in other sequence diagrams to be described later.

Figure 27:
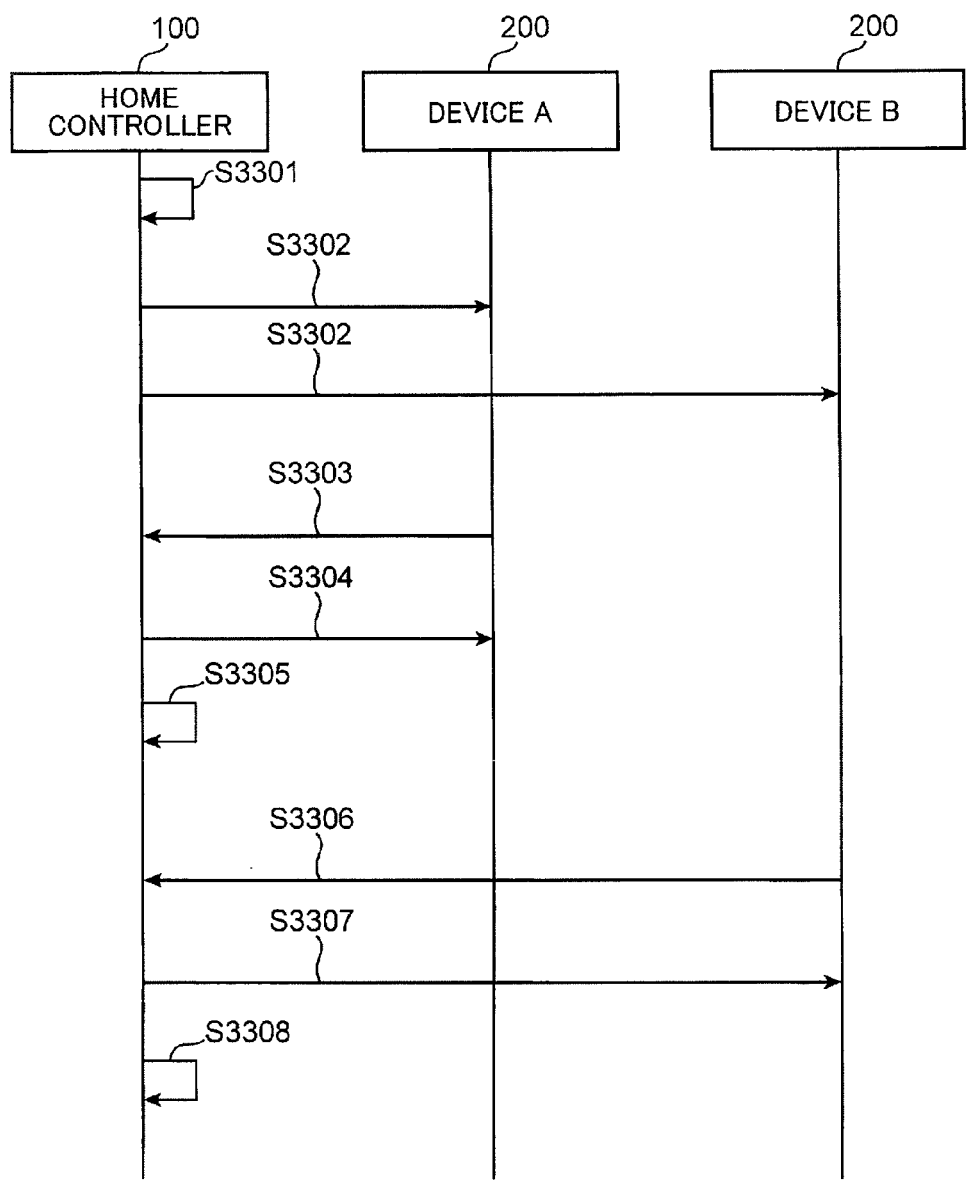
FIG. 27 is a sequence diagram showing a flow of processes by which a home controller detects a device on a network upon connecting to the network according to an embodiment of the present disclosure.

FIG. 27 is a sequence diagram of a flow of processes by which the home controller 100 detects a device 200 on a network after the home controller 100 connects to the network. FIG. 27 will be described on the assumption that a device A 200 whose device ID is A and a device B 200 whose device ID is B shown in FIG. 25 are connected to the network.

When the home controller 100 connects to the network upon initial use or activation of the home controller 100 (S3301), the device management section 105 of the home controller 100 broadcasts a device search request to all of the devices 200 on the network (S3302). The device A 200 having received the device search request sends a device search response to the home controller 100 (S3303). The home controller 100 having received the device search response acquires device information from the device A 200 (S3304) and updates the display screen (S3305).

In a similar manner, the device B 200 having received the device search request sends a device search response to the home controller 100 (S3306). The home controller 100 having received the device search response acquires device information from the device B 200 (S3307) and updates the display screen (S3308). In this case, device information refers to information indicating a device type, a model, capability information, and the like of the device 200. Based on the device information, the device management section 105 of the home controller 100 generates the device list 1700 (refer to FIG. 25).

Figure 28:
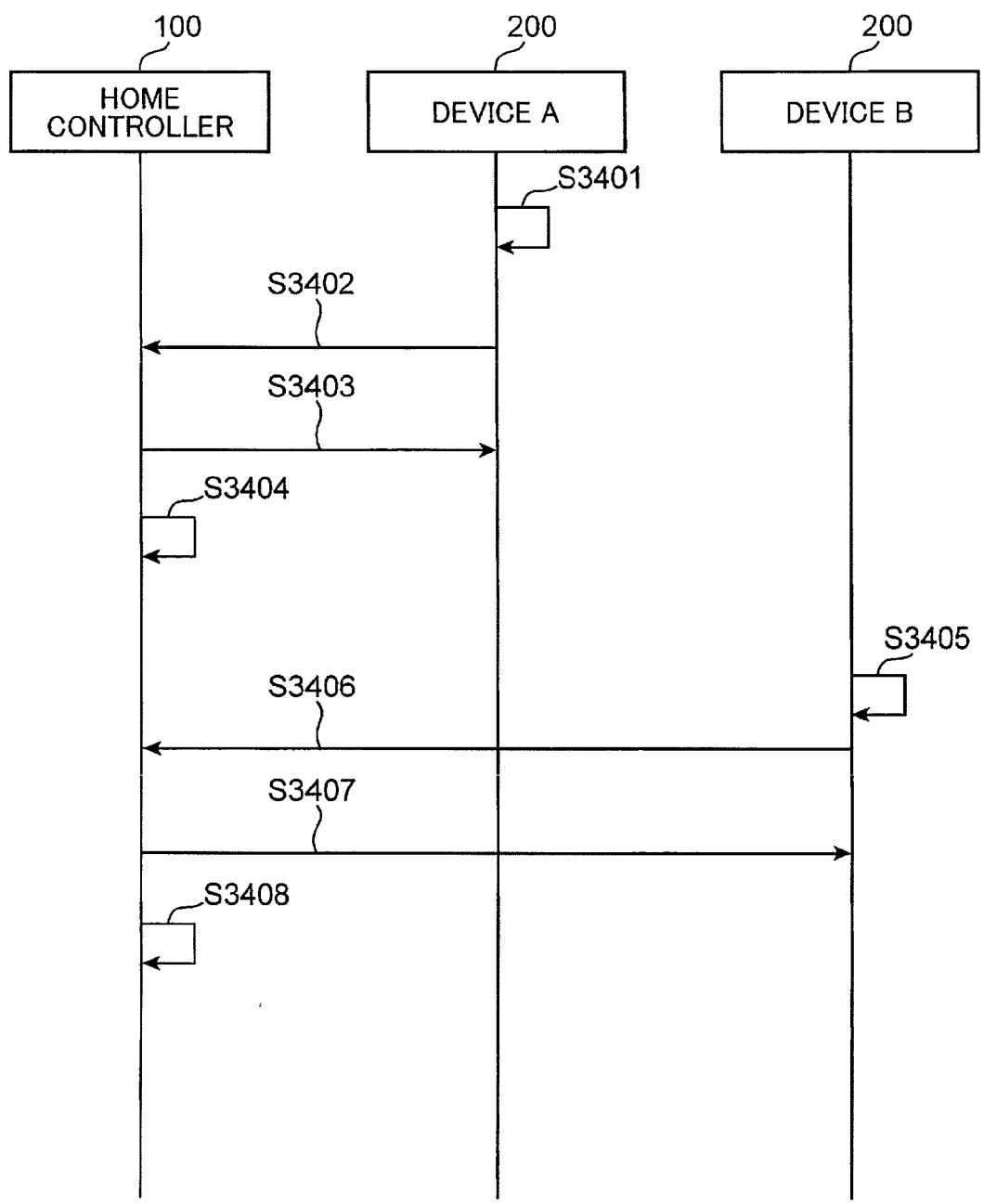
FIG. 28 is a sequence diagram showing a flow of processes by which a home controller detects a device on a network when the device connects to the network according to an embodiment of the present disclosure.

FIG. 28 is a sequence diagram of a flow of processes by which the home controller 100 detects a device 200 on a network when the device 200 connects to the network. When the device A 200 connects to the network upon initial use or activation (S3401), the device A 200 broadcasts a network connection notification to all of the home controllers 100 on the network (S3402). In the home controller 100 having received the network connection notification, the device management section 105 acquires device information from the device A 200 (S3403) and the display control section 103 updates the display screen (S3404). A process that is performed upon connection of the device B 200 to the network is similar to that of the device A 200 (S3405 to S3408).

Figure 29:
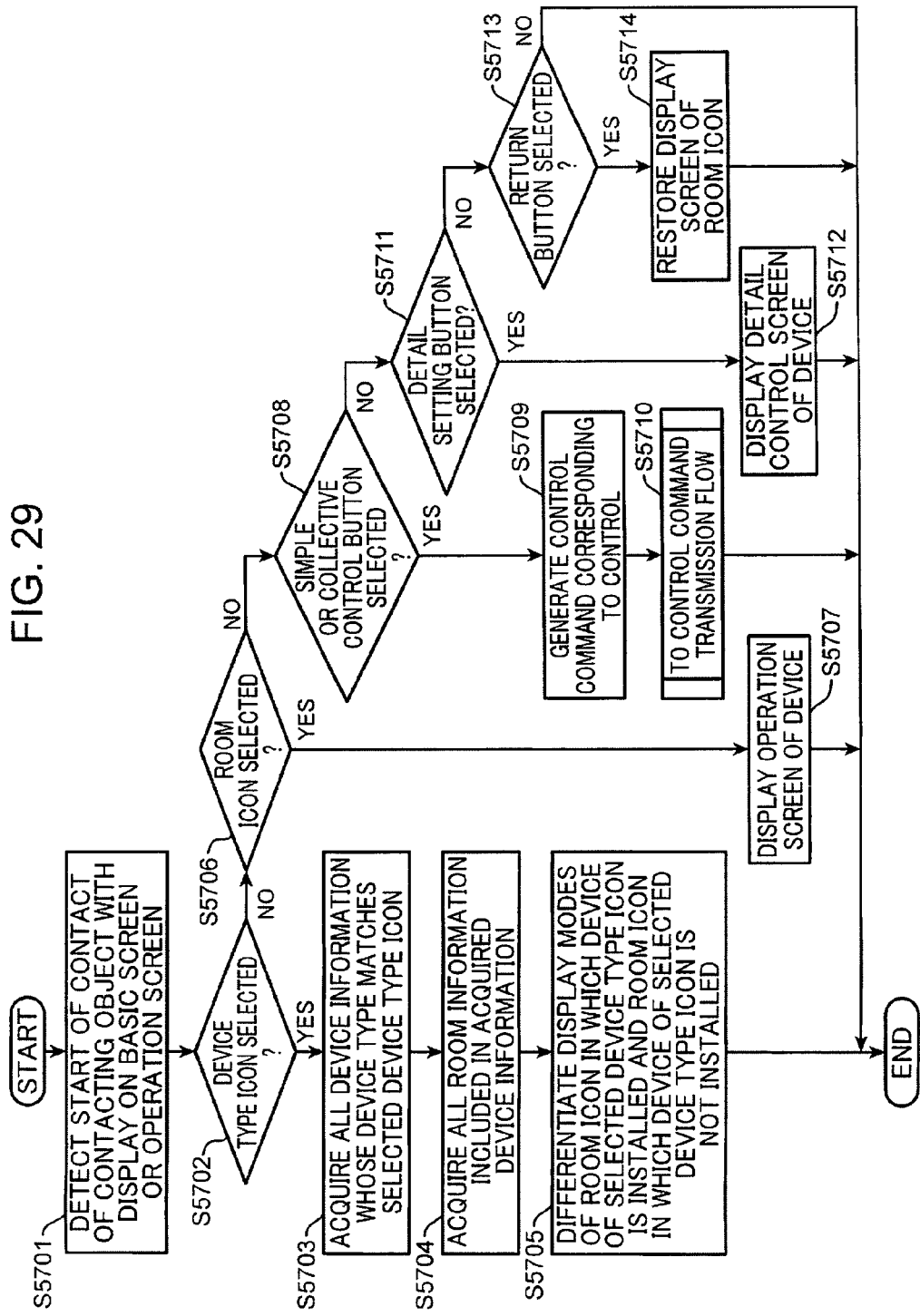
FIG. 29 is a flow chart showing a flow of processes by which a home controller controls a device when a basic screen or a room screen including an operation screen is displayed on a display according to an embodiment of the present disclosure.

FIG. 29 is a flow chart showing a flow of processes by which the home controller 100 controls the device 200 when a basic screen (FIG. 5) or the room screen 540 (FIG. 8) including the operation screens 541 to 543 is displayed on the display 101 according to an embodiment of the present disclosure.

First, on the basic screen or the operation screens 541 to 543, the touch panel control section 102 detects a start of contact of a contacting object with the display 101 by the user (S5701). Next, the touch panel control section 102 determines whether or not the user has selected the device type icon 515 (S5702).

When the user has selected the device type icon 515 (YES in S5702), the display control section 103 acquires all device information of devices 200 whose device type matches that of the selected device type icon 515 (S5703). Specifically, for example, when the user has selected the device type icon 515 of an air conditioner, the display control section 103 acquires all information in which the device type 1702 is an air conditioner from the device list 1700 (FIG. 25) as device information.

Next, the display control section 103 acquires all room information included in the acquired device information (S6104). Specifically, for example, the display control section 103 acquires all arrangements 1704 with respect to the device type 1702 of air conditioner from the device list 1700 (FIG. 25) as room information.

Next, the display control section 103 differentiates display modes of the room icons 502 that represent rooms in which the device 200 represented by the selected device type icon 515 is installed and the room icons 502 that represent rooms in which the device 200 represented by the selected device type icon 515 is not installed (S5705). Subsequently, the process ends. Due to S5705, a display screen (for example, FIG. 6A) in which the device type icon 515 is selected on the basic screen is displayed on the display 101.

On the other hand, in S5702, when the user has not selected the device type icon 515 (NO in S5702), the touch panel control section 102 determines whether or not the user has selected a room icon 502 (S5706). When the user has selected a room icon 502 (YES in S5706), the display control section 103 displays the operation screens 541 to 543 of the devices 200 which are installed in rooms corresponding to the selected room icon 502 and which correspond to the device type icon 515 selected in S5702 in the room screen 540 (S5707). Subsequently, the process ends.

On the other hand, when the user has not selected a room icon 502 in S5706 (NO in S5706), the touch panel control section 102 determines whether or not the user has selected the simple control button 503 of the operation screens 541 and 542 or the device type collective control button 532 of the operation screen 543 (S5708). When the user has selected the simple control button 503 or the device type collective control button 532 (YES in S5708), the device control section 106 generates a control command corresponding to control of the selected simple control button 503 or device type collective control button 532 (S5709). Next, the device control section 106 executes a control command transmission flow (S5710) to be described later with reference to FIG. 31. Subsequently, the process ends.

On the other hand, when the user has selected neither the simple control button 503 nor the device type collective control button 532 in S5708 (NO in S5708), the touch panel control section 102 determines whether or not the user has selected the detail setting button 504 of the operation screens 541 and 542 (S5711). When the user has selected the detail setting button 504 (YES in S5711), the display control section 103 displays the detail control screen 522 in the room screen 540 on the display 101 (S5712). Subsequently, the process ends.

On the other hand, in S5711, when the user has not selected the detail setting button 504 of the operation screens 541 and 542 (NO in S5711), the touch panel control section 102 determines whether or not the user has selected the return button 507 of the room screen 540 (S5713). When the user has selected the return button 507 (YES in S5713), the display control section 103 restores the display screen of the room icon 502 by displaying a display screen (for example, FIG. 6A) in which the device type icon 515 is selected on the basic screen on the display 101 (S5714). Subsequently, the process ends. On the other hand, in S5713, if the user has not selected the return button 507 on the room screen 540 (NO in S5713), the process ends.

Figure 30:
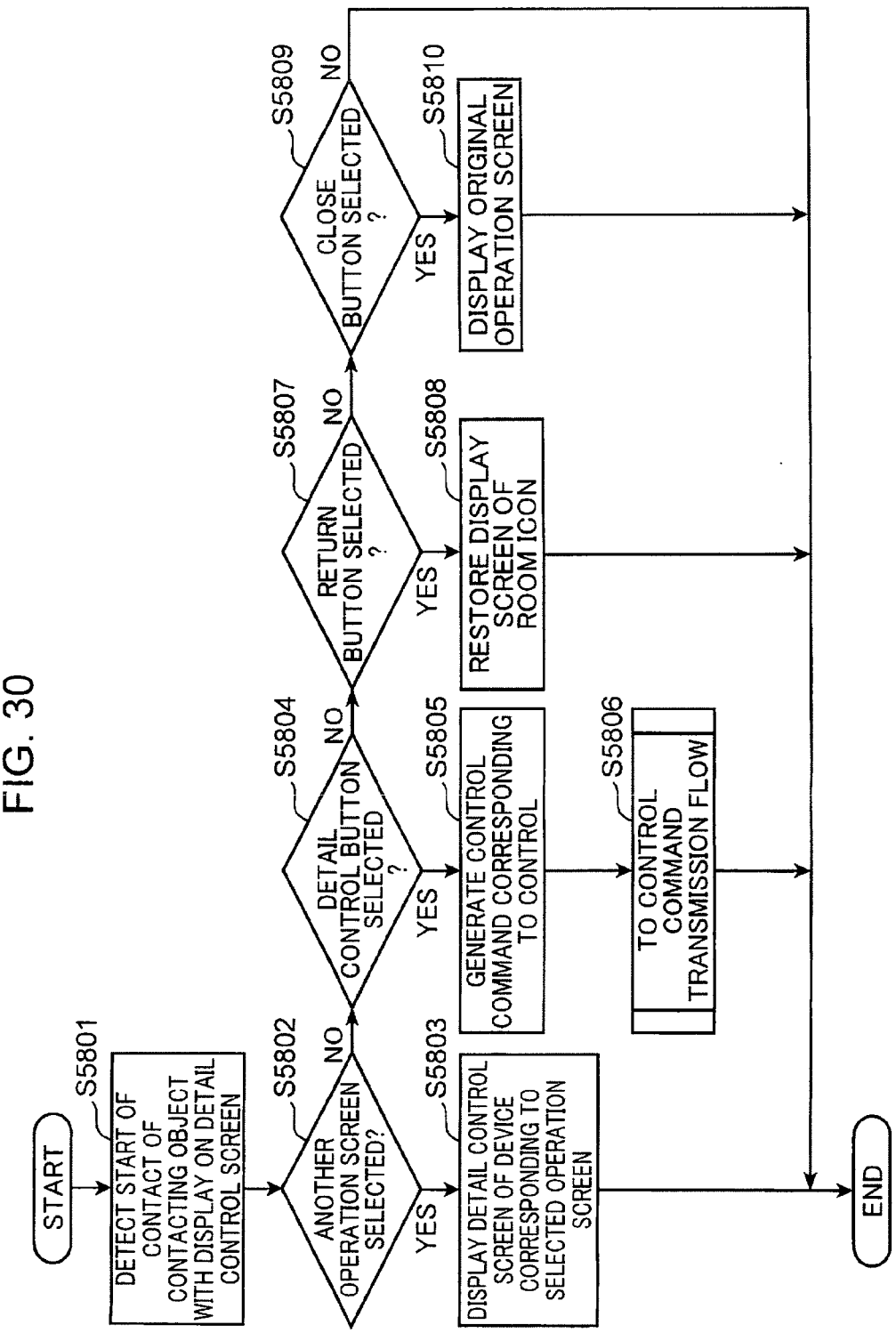
FIG. 30 is a flow chart showing a flow of processes by which a home controller controls a device when a room screen including a detail control screen is displayed on a display according to an embodiment of the present disclosure.

FIG. 30 is a flow chart showing a flow of processes by which the home controller 100 controls the device 200 when the room screen 540 (FIG. 9) including the detail control screen 522 is displayed on the display 101 according to an embodiment of the present disclosure.

First, on the detail control screen 522, the touch panel control section 102 detects a start of contact of the contacting object 519 with the display 101 by the user (S5801). Next, the touch panel control section 102 determines whether or not the user has selected another operation screen (an operation screen other than an operation screen corresponding to the displayed detail control screen 522 among the operation screens 541, 542, and 543) (S5802). When the user has selected another operation screen (YES in S5802), the display control section 103 displays the detail control screen 522 of the device 200 corresponding to the selected operation screen on the display 101 in place of the detail control screen 522 being displayed (S5803). Subsequently, the process ends. In S5803, for example, when the user selects the operation screen 542 in FIG. 9, the display control section 103 displays the detail control screen 522 of the second air conditioner on the display 101 in place of the detail control screen 522 of the first air conditioner.

On the other hand, in S5802, when the user has not selected another operation screen (NO in S5802), the touch panel control section 102 determines whether or not the user has selected the detail control button 505 (S5804). When the user has selected the detail control button 505 (YES in S5804), the device control section 106 generates a control command corresponding to control of the selected detail control button 505 (S5805). Next, the device control section 106 executes a control command transmission flow (S5806) to be described later with reference to FIG. 31. Subsequently, the process ends.

On the other hand, in S5804, when the user has not selected the detail control button 505 (NO in S5804), the touch panel control section 102 determines whether or not the user has selected the return button 507 of the room screen 540 (S5807). When the user has selected the return button 507 (YES in S5807), the display control section 103 restores the display screen of the room icon 502 by displaying a display screen (for example, FIG. 6A) in which the device type icon 515 is selected on the basic screen on the display 101 (S5808). Subsequently, the process ends.

On the other hand, in S5807, when the user has not selected the return button 507 on the room screen 540 (NO in S5807), the touch panel control section 102 determines whether or not the user has selected the close button 508 on the detail control screen 522 (S5809). When the user has selected the close button 508 (YES in S5809), the display control section 103 displays the original operation screens 541 to 543 in the room screen 540 (FIG. 8) on the display 101 (S5810). Subsequently, the process ends. On the other hand, in S5809, if the user has not selected the close button 508 (NO in S5809), the process ends.

Figure 31:
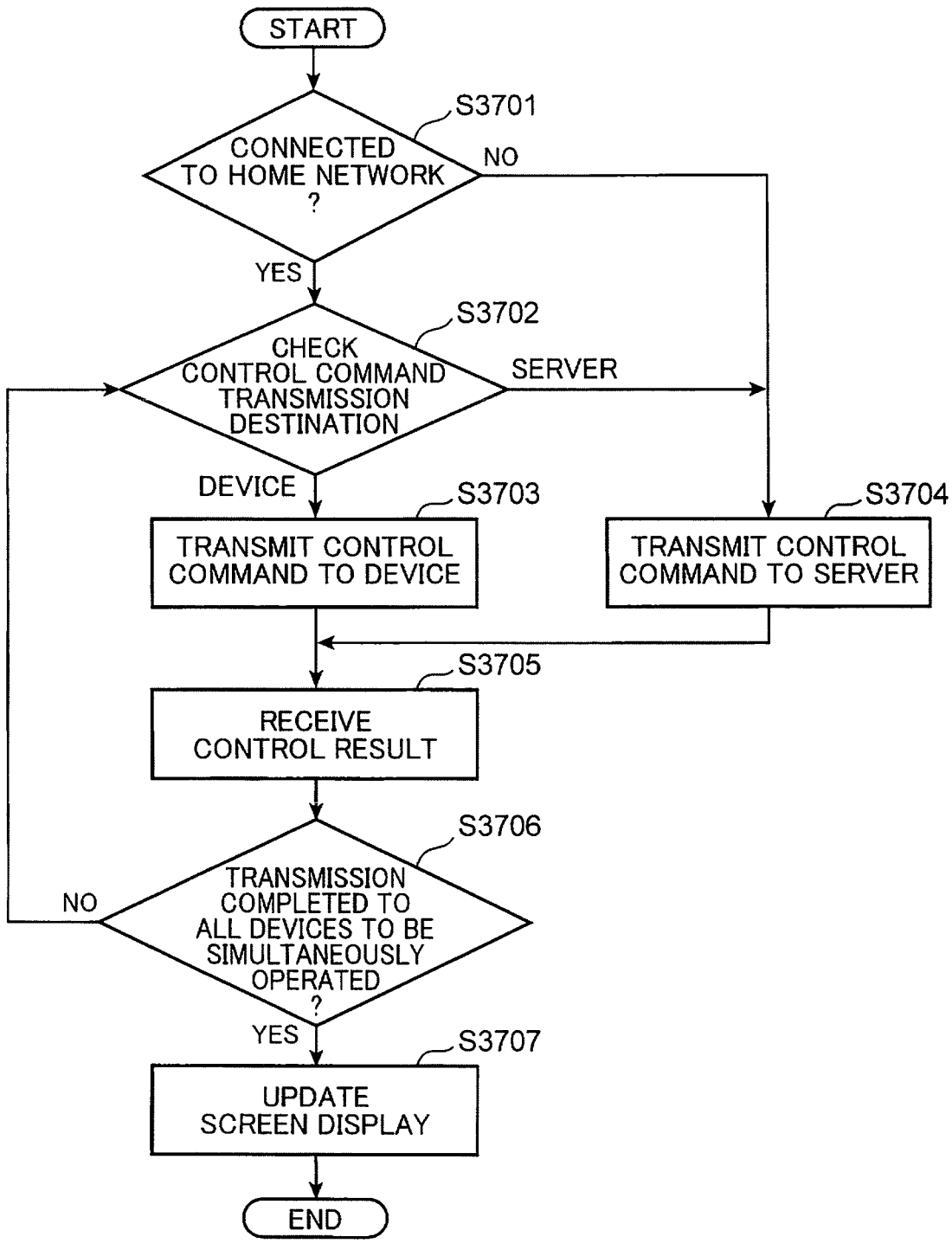
FIG. 31 is a flow chart showing a flow of processes by which a home controller transmits a control command according to an embodiment of the present disclosure.

FIG. 31 is a flow chart showing details of the control command transmission flow that is executed in S5710 in FIG. 29 and in S5806 in FIG. 30. First, the device control section 106 determines whether or not the home controller 100 is connected to a home network (S3701), and if the home controller 100 is connected to the home network (YES in S3701), the device control section 106 checks a transmission destination of a control command according to contents of the control command transmission destination 1706 in the device list 1700 (S3702). In this case, a home network refers to a network in the home of the user. Therefore, if the user is operating a home controller 100 from outside of the home, a determination of NO is made in S3701, and if the user is operating a home controller 100 from inside the home, a determination of YES is made in S3701.

In S3702, if the transmission destination of the control command is a "device", the device control section 106 transmits the control command to the relevant device 200 (S3703). On the other hand, in S3702, if the transmission destination of the control command is a "server", the device control section 106 transmits the control command to the server 300 (S3704).

For example, in the device list 1700, since the control command transmission destination 1706 for an air conditioner is "device", the device control section 106 transmits the control command to the air conditioner. In addition, even when it is determined in S3701 that the home controller 100 is not connected to the home network (NO in S3701), the process of S3704 is performed.

In S3705, the device control section 106 receives a control result from the device 200. Next, when transmission of the control command has been completed to all of the devices 200 to be simultaneously operated (YES in S3706), the device control section 106 advances the process to S3707. On the other hand, when transmission of the control command has not been completed to all of the devices 200 to be simultaneously operated (NO in S3706), the device control section 106 returns to the process of S3702 and repeats the processes of S3702 and thereafter.

For example, when two illumination devices are installed in a same room and the two illumination devices are set in advance to be simultaneously operated, the device control section 106 transmits the control command to each of the two illumination devices. Moreover, a determination of NO is not made in S3706 for a device 200 that is not operated at the same time as other devices 200.

Next, the display control section 103 updates the screen displayed on the display 101 (S3707). For example, when a temperature setting of an air conditioner has been changed, the temperature is displayed so as to flicker until the temperature setting of the air conditioner is changed by a control command. In addition, the detail control screen 522 is updated so that the flickering of the temperature display ends once the temperature setting of the air conditioner has been changed by the control command. Furthermore, for example, when an air conditioner in the bedroom has been turned off, the display control section 103 restores the "on" button of the simple control button 503 of the room icon 502 representing the bedroom shown in FIG. 6A to a default color and changes the color of the "off" button.

Figure 32:
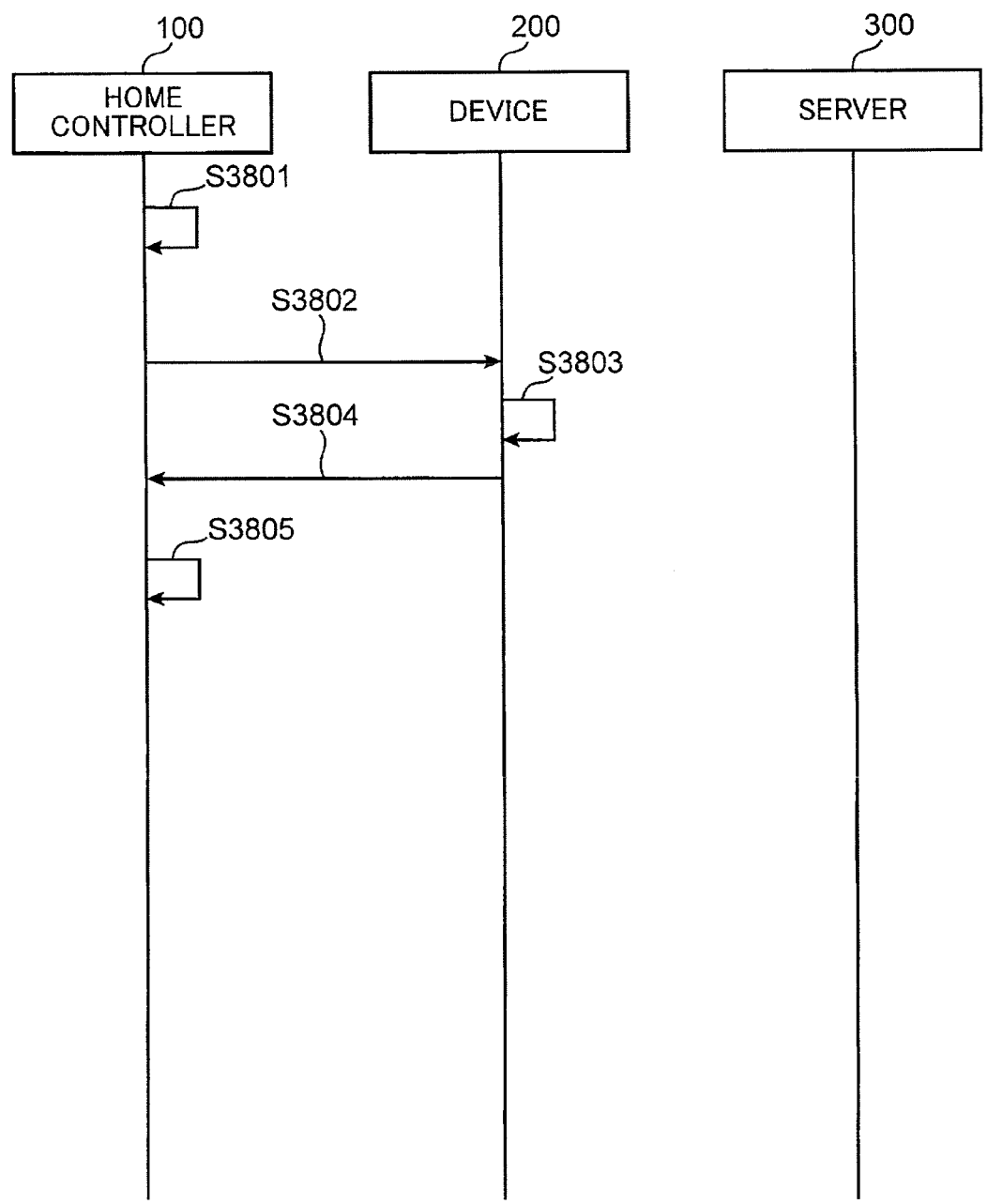
FIG. 32 is a sequence diagram showing a flow of processes by which a home controller directly controls a device according to an embodiment of the present disclosure.

FIG. 32 is a sequence diagram showing a flow of processes by which the home controller 100 directly controls the device 200. First, the touch panel control section 102 of the home controller 100 detects an operation of the simple control button 503 or the detail control screen 522 by the user (S3801). Next, the device control section 106 of the home controller 100 generates a control command corresponding to the operation by the user and transmits the control command to the device 200 (S3802).

The device 200 having received the control command executes the control command (S3803) and transmits a control result to the home controller 100 (S3804). The display control section 103 of the home controller 100 having received the control result updates the display screen according to the control result (S3805).

Figure 33:
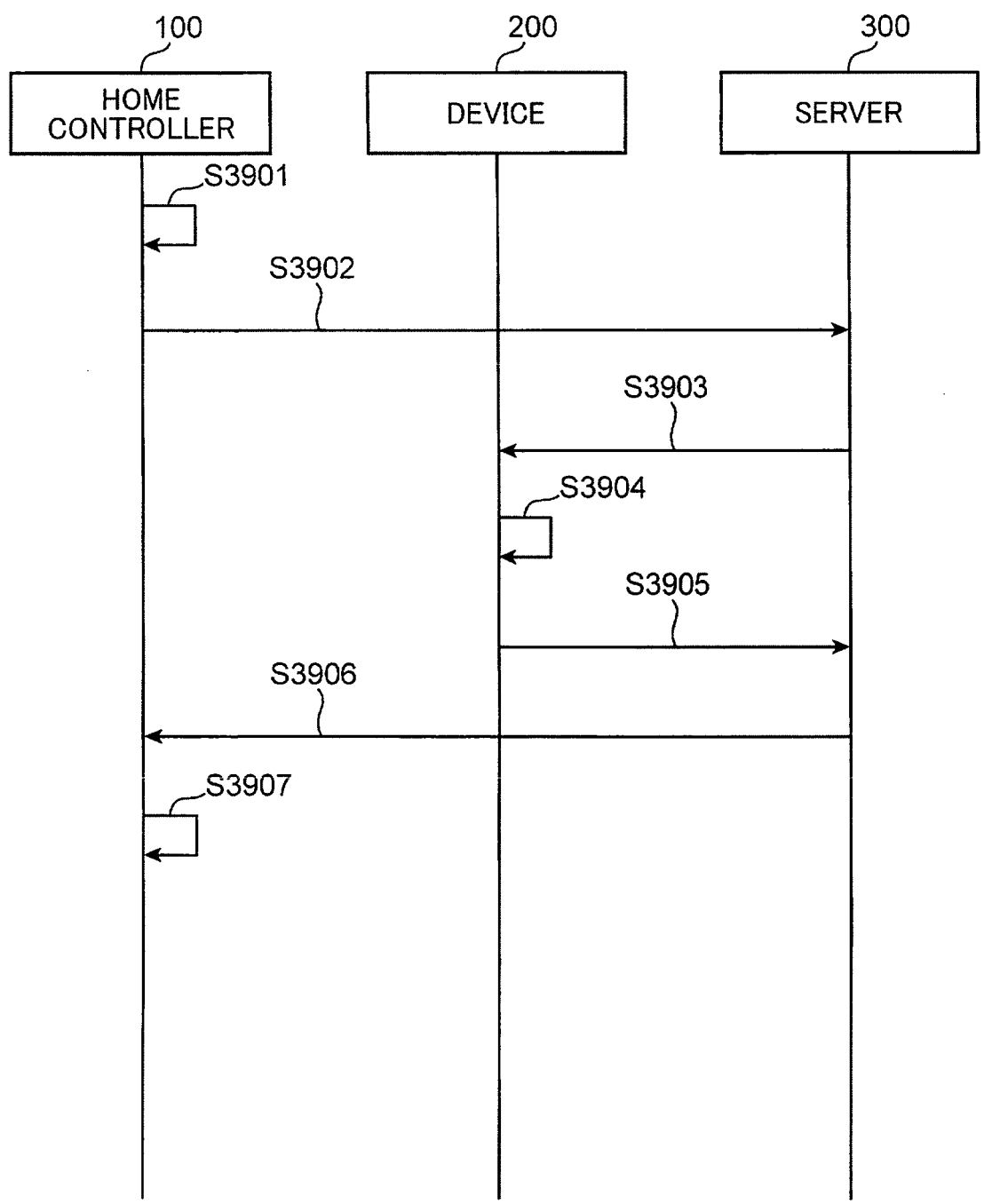
FIG. 33 is a sequence diagram showing a flow of processes by which a home controller controls a device via a server according to an embodiment of the present disclosure.

FIG. 33 is a sequence diagram showing a flow of processes by which the home controller 100 controls the device 200 via the server 300. First, the touch panel control section 102 of the home controller 100 detects an operation of the simple control button 503 or the detail control screen 522 by the user (S3901). Next, the device control section 106 of the home controller 100 generates a control command corresponding to the operation by the user and transmits the control command to the server 300 (S3902).

The server 300 having received the control command transmits the relevant control command to the device 200 (S3903). The device 200 having received the control command executes the control command (S3904) and transmits a control result to the server 300 (S3905). The server 300 having received the control result transmits the control result to the home controller 100 (S3906). The display control section 103 of the home controller 100 having received the control result updates the display screen according to the control result (S3907).

Figure 34:
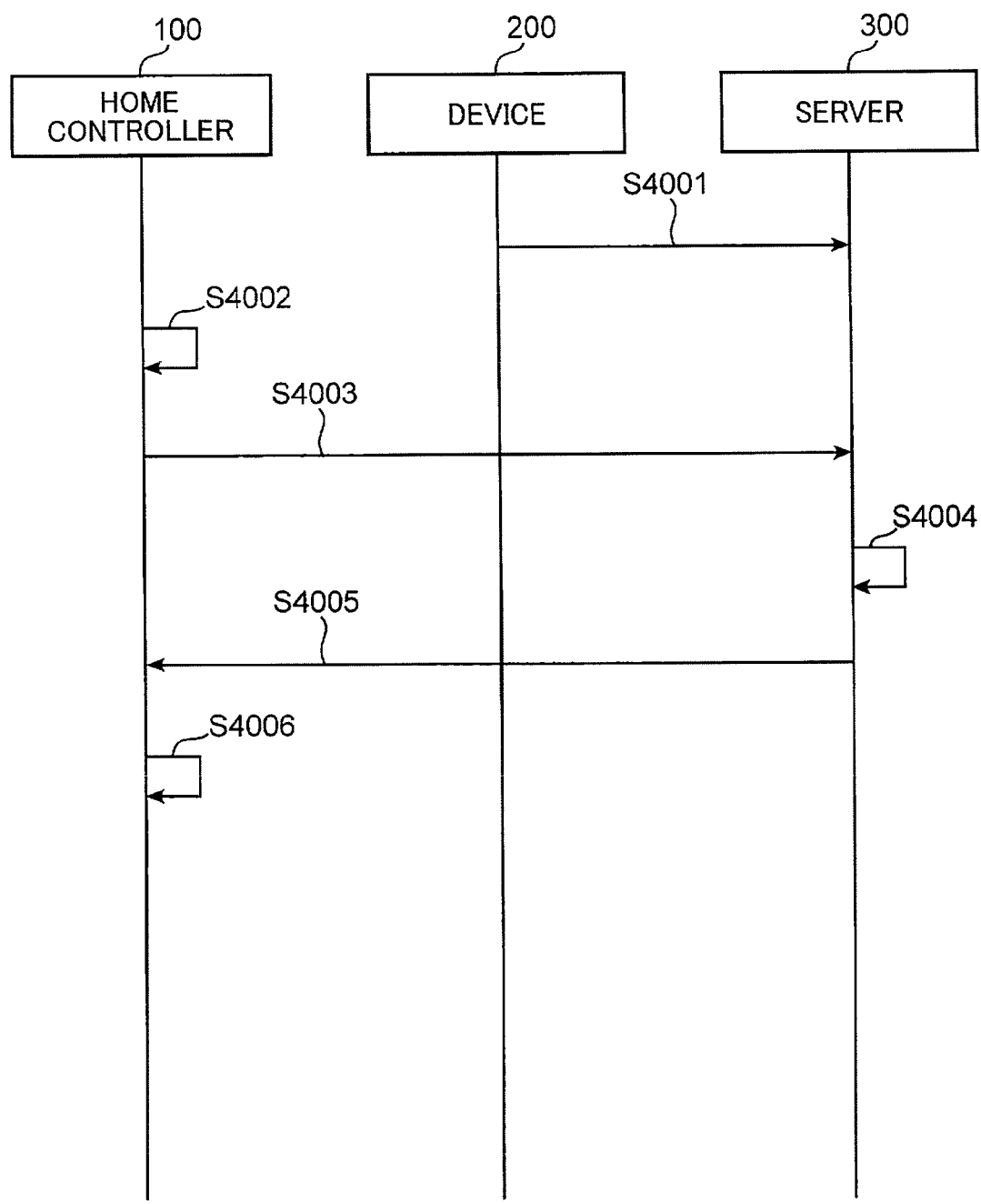
FIG. 34 is a sequence diagram showing a flow of processes by which a home controller acquires a state of a device from a server according to an embodiment of the present disclosure.

FIG. 34 is a sequence diagram showing a flow of processes by which the home controller 100 checks a device state of the device 200 via the server 300. First, the device 200 transmits a current device state to the server 300 (S4001). In this case, the device 200 transmits a device state to the server 300 when turned on, when turned off, when the device state changes, or periodically, and causes the server 300 to store device states. Moreover, the process of S4001 may be asynchronously executed with respect to processes of S4002 to S4006.

Next, the touch panel control section 102 of the home controller 100 detects an operation of the simple control button 503 or the detail control screen 522 by the user (S4002). The device control section 106 of the home controller 100 then generates a control command corresponding to the operation by the user and transmits the control command to the server 300 (S4003). In this case, a control command for checking the device state of the device 200 is generated.

The server 300 having received the control command searches for a current device state of the relevant device 200 (S4004) and transmits the device state of the relevant device 200 as a control result to the home controller 100 (S4005). The display control section 103 of the home controller 100 having received the control result updates the display screen according to the control result (S4006). For example, when an operation screen 516 of the room icon 502 is displayed on the display 101, display contents of the simple control button 503 of the operation screen 516 are updated according to the control result.

Figure 35:
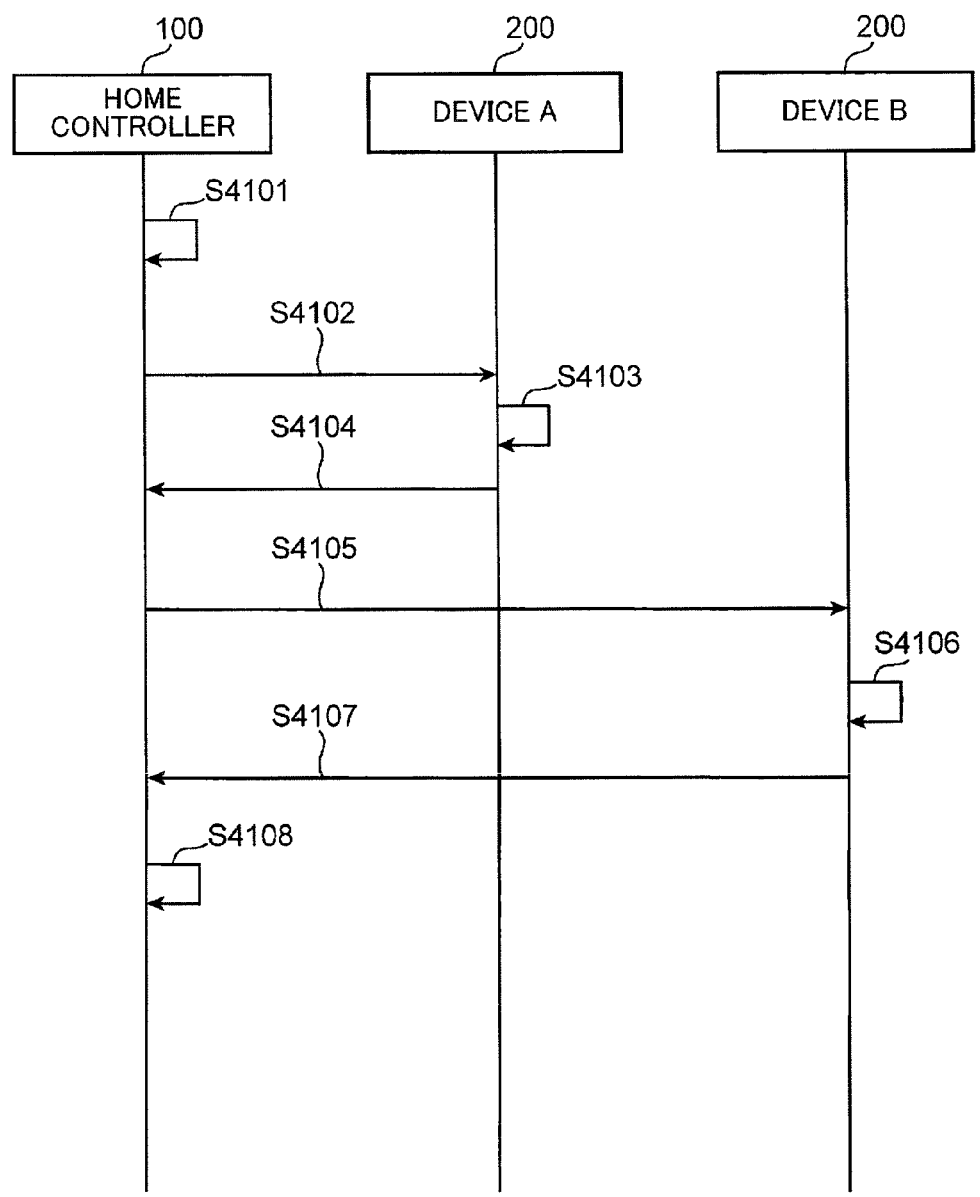
FIG. 35 is a sequence diagram showing a flow of processes by which a home controller directly controls a device in a case where the home controller controls a plurality of devices by a single operation according to an embodiment of the present disclosure.

FIG. 35 is a sequence diagram showing a flow of processes by which the home controller 100 directly controls the device 200 in a case where the home controller 100 controls a plurality of devices 200 by a single operation. A description will now be given using a case where the home controller 100 controls a device A 200 and a device B 200. In addition, it is assumed that the device A 200 and the device B 200 are devices of a same type which are installed in one room and which are controlled by an operation made on the device type collective control button 532 in the operation screen 543 on the room screen 540 (FIG. 8).

First, the touch panel control section 102 of the home controller 100 detects an operation of the simple control button 503 of the operation screen 516 by the user (S4101). Next, the device control section 106 of the home controller 100 generates a control command corresponding to the operation by the user and transmits the control command to the device A 200 (S4102).

The device A 200 having received the control command executes the control command (S4103) and transmits a control result to the home controller 100 (S4104).

Next, the device control section 106 of the home controller 100 transmits, to the device B 200, a same control command as the control command transmitted to the device A 200 (S4105). The device B 200 having received the control command executes the control command (S4106) and transmits a control result to the home controller 100 (S4107).

The display control section 103 of the home controller 100 having received the control result updates the display screen according to the control result (S4108). In this case, for example, if the operation screen 516 of the room icon 502 of the device A 200 and the device B 200 is displayed on the display 101, display contents of the simple control button 503 of the operation screen 516 of the device A 200 and the device B 200 are updated according to the control result.

Figure 36:
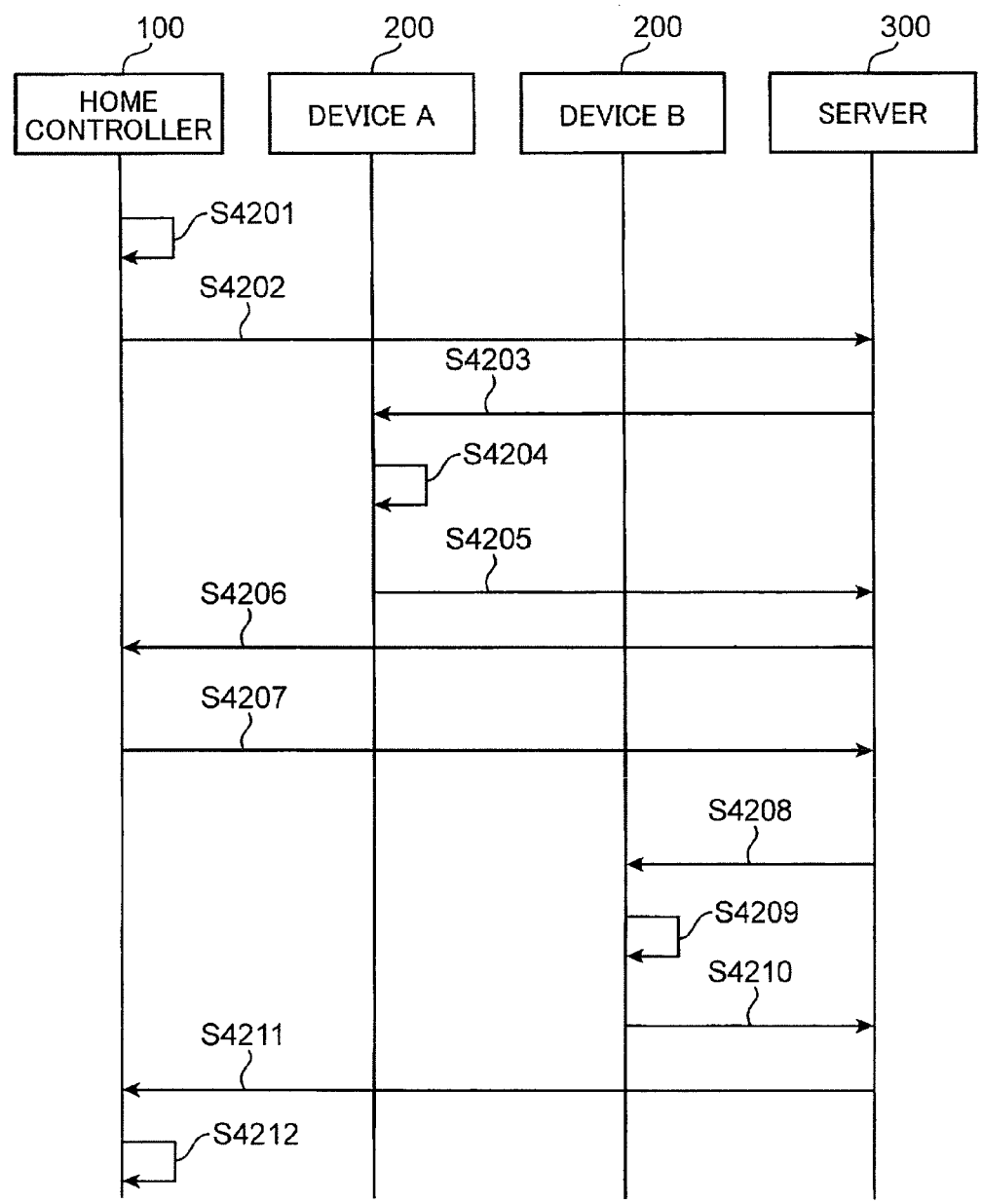
FIG. 36 is a sequence diagram showing a flow of processes by which a home controller controls a device via a server in a case where the home controller controls a plurality of devices by a single operation according to an embodiment of the present disclosure.

FIG. 36 is a sequence diagram showing a flow of processes by which the home controller 100 controls the device 200 via the server 300 in a case where the home controller 100 controls a plurality of devices 200 by a single operation. A description will now be given using a case where the home controller 100 controls a device A 200 and a device B 200. In addition, it is assumed that the device A 200 and the device B 200 are devices of a same type which are installed in one room and which are controlled by an operation made on the device type collective control button 532 in the operation screen 543 on the room screen 540 (FIG. 8).

First, the touch panel control section 102 of the home controller 100 detects an operation of the device type collective control button 532 of the operation screen 543 by the user (S4201).

Next, the device control section 106 of the home controller 100 generates a control command for the device A 200 which corresponds to the operation by the user and transmits the control command to the server 300 (S4202).

The server 300 having received the control command for the device A 200 transmits the control command to the device A 200 (S4203). The device A 200 having received the control command executes the control command (S4204) and transmits a control result to the server 300 (S4205). The server 300 having received the control result transmits the control result to the home controller 100 (S4206).

In a similar manner, the device control section 106 of the home controller 100 generates a control command for the device B 200 which corresponds to the operation by the user and transmits the control command to the server 300 (S4207).

The server 300 having received the control command transmits the control command to the device B 200 (S4208). The device B 200 having received the control command executes the control command (S4209) and transmits a control result to the server 300 (S4210). The server 300 having received the control result transmits the control result to the home controller 100 (S4211).

Subsequently, the display control section 103 of the home controller 100 updates the display screen according to the control result (S4212).

Figure 37:
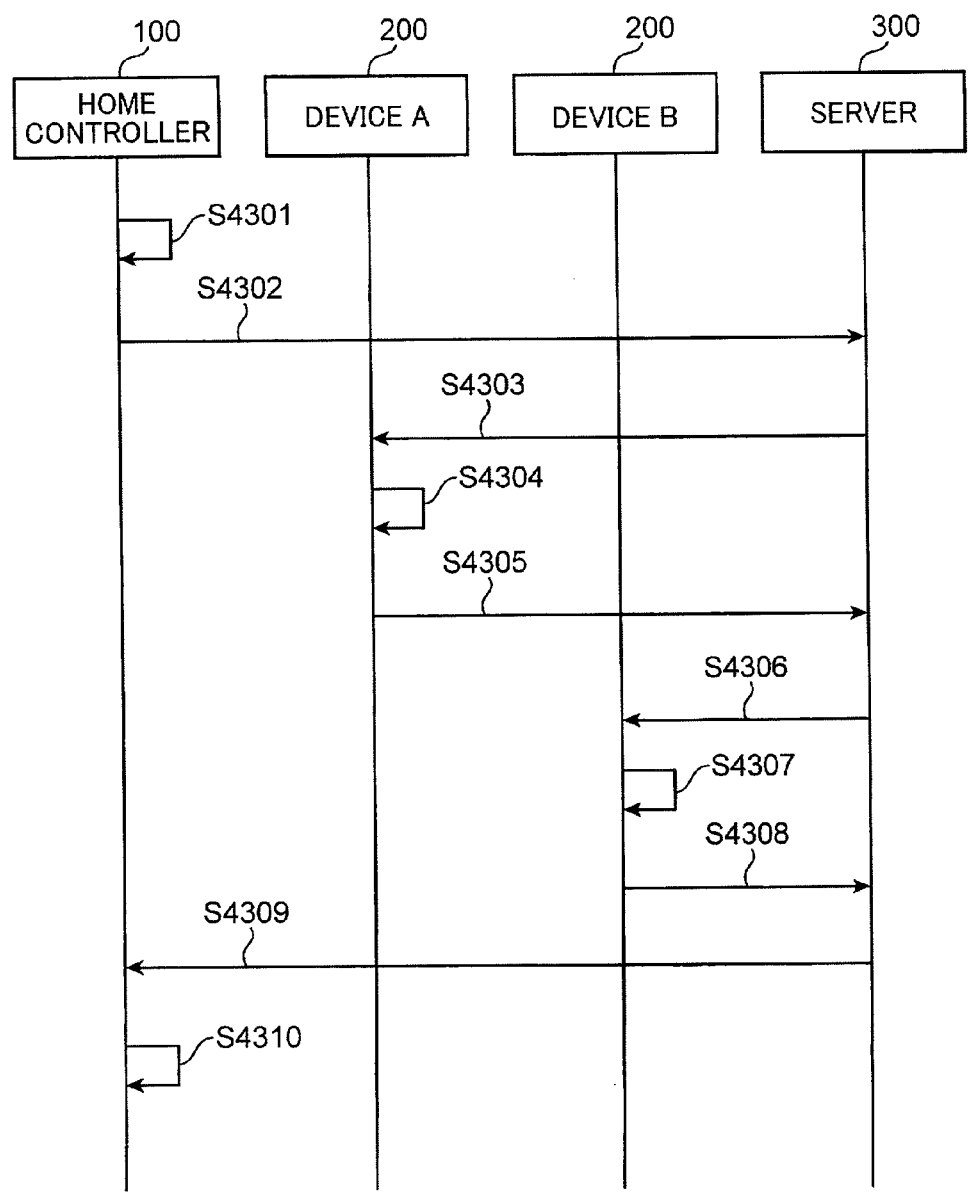
FIG. 37 is a sequence diagram showing a flow of processes by which a home controller controls a device via a server in a case where the home controller controls a plurality of devices by a single operation according to an embodiment of the present disclosure.

FIG. 37 is a sequence diagram showing a flow of processes by which the home controller 100 controls the device 200 via the server 300 in a case where the home controller 100 controls a plurality of devices 200 by a single operation. A description will now be given using a case where the home controller 100 controls a device A 200 and a device B 200. In addition, it is assumed that the device A 200 and the device B 200 are devices of a same type which are installed in one room and which are controlled by an operation made on the device type collective control button 532 in the operation screen 543 on the room screen 540 (FIG. 8).

First, the touch panel control section 102 of the home controller 100 detects an operation of the device type collective control button 532 of the operation screen 543 by the user (S4301).

Next, the device control section 106 of the home controller 100 generates a control command for the device A 200 and the device B 200 in accordance with the operation by the user and transmits the control command to the server 300 (S4302).

The server 300 having received the control command transmits the control command to the device A 200 (S4303). The device A 200 having received the control command executes the control command (S4304) and transmits a control result to the server 300 (S4305).

In a similar manner, the server 300 transmits the control command to the device B 200 (S4306). The device B 200 having received the control command executes the control command (S4307) and transmits a control result to the server 300 (S4308). The server 300 having received the control results of the device A 200 and the device B 200 transmits the control results to the home controller 100 (S4309).

Subsequently, the display control section 103 of the home controller 100 updates the display screen according to the control results (S4310).

Figure 38:
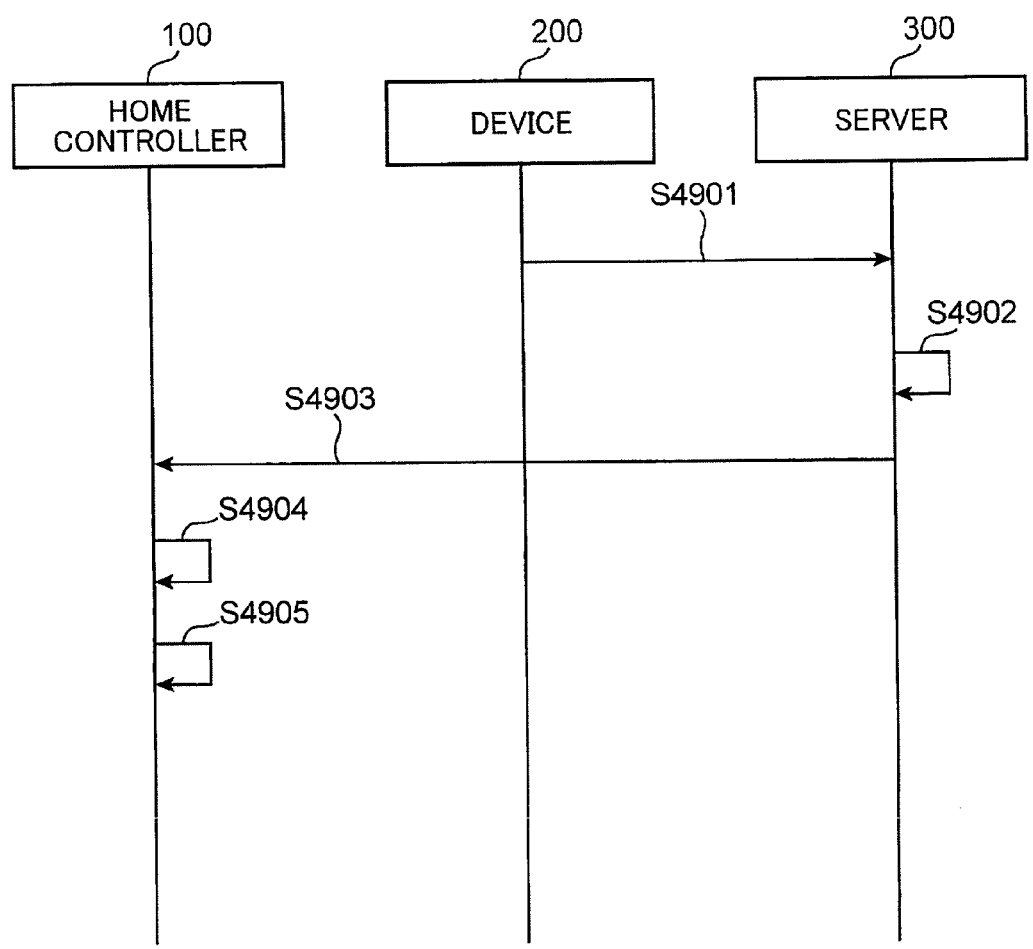
FIG. 38 is a sequence diagram showing a flow of processes by which device lists of a home controller and a server are updated according to an embodiment of the present disclosure.

FIG. 38 is a sequence diagram showing an example of processes by which device lists of the home controller 100 and the server 300 are updated. The device 200 transmits a device state indicating a current state of the device itself to the server 300 (S4901). In this case, the device 200 may periodically transmit a device state or may transmit a device state when a change occurs in the state. The server 300 updates the device list 1600 according to contents of the received device state (S4902). At this point, if information on the device 200 does not exist in the device list 1600, the server 300 adds the information on the device 200 as a new device. In addition, the server 300 transmits a device list update notification to the home controller 100 (S4903).

The device management section 105 of the home controller 100 updates the device list 1700 according to contents of the received device list update notification (S4904). At this point, if the information on the device 200 does not exist in the device list 1700, the device management section 105 adds the information on the device 200 as a new device. Subsequently, the display control section 103 of the home controller 100 updates the display screen (S4905). For example, when information on the new device 200 is added, the update of the display screen includes an update of the room icon 502 representing a room in which the new device 200 is installed, an update of a status display by the simple control button 503 of an operation screen, and the like.

As shown, when the state of the device 200 changes, the state change is notified to the server 300. Therefore, the server 300 is able to monitor the state change of the device 200. In addition, the server 300 to which a device state is transmitted from the device 200 notifies the state change to the home controller 100. Therefore, the home controller 100 is able to recognize the current state of the device 200. Furthermore, when the new device 200 is connected to the home network, the server 300 and the home controller 100 can add information on the new device. Therefore, an occurrence of a deviation between an actual state of the device 200 and a state of the device 200 as recognized by the home controller 100 can be prevented.

Figure 39:
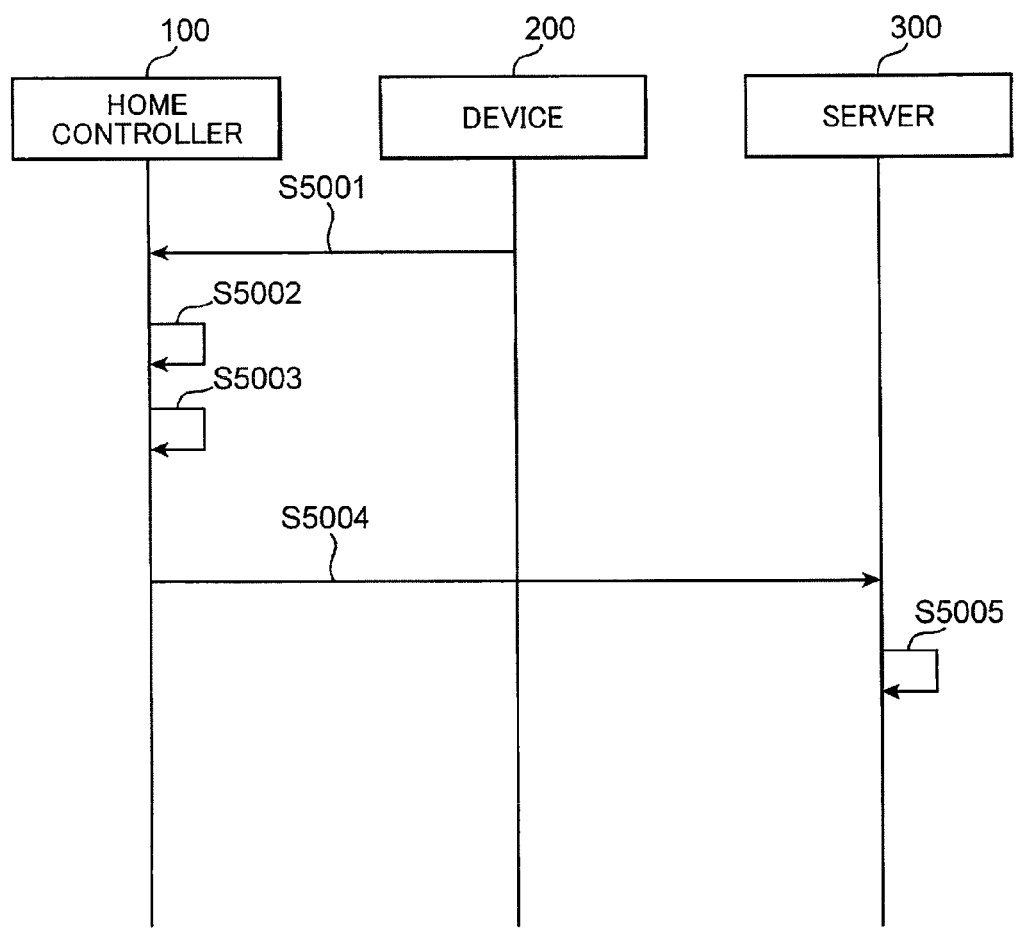
FIG. 39 is a sequence diagram showing a flow of processes by which device lists of a home controller and a server are updated according to an embodiment of the present disclosure.

FIG. 39 is a sequence diagram showing another example of processes by which device lists of the home controller 100 and the server 300 are updated. The device 200 transmits a device state to the home controller 100 (S5001). In this case, the device 200 may periodically transmit a device state or may transmit a device state when a change occurs in the state.

The device management section 105 of the home controller 100 updates the device list 1700 according to contents of the received device state (S5002). At this point, if the information on the device 200 does not exist in the device list 1700, the device management section 105 adds the information on the device 200 as a new device. Subsequently, the display control section 103 updates the display screen (S5003).

Next, the device management section 105 of the home controller 100 transmits a device list update notification to the server 300 (S5004). The server 300 updates the device list 1600 according to the received device list update notification (S5005). At this point, if information on the device 200 does not exist in the device list 1600, the server 300 adds the information on the device 200 as a new device.

Figure 40:
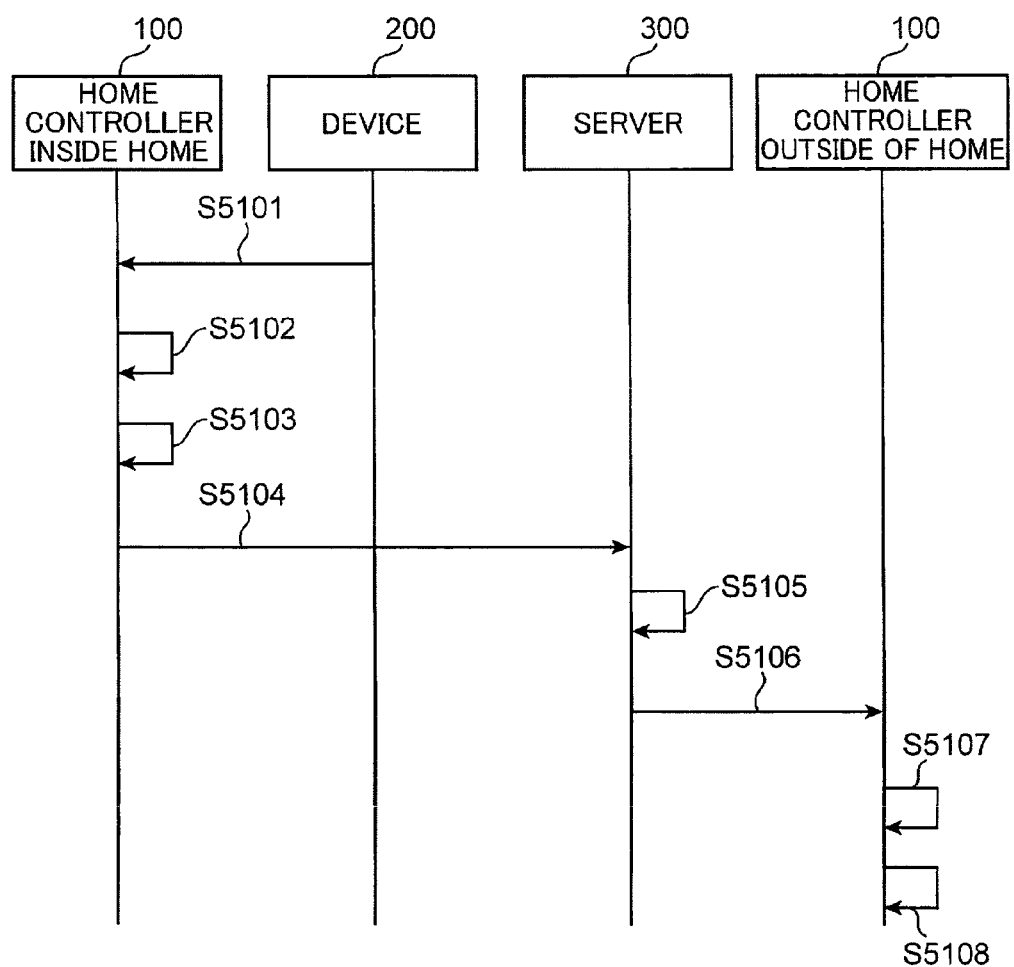
FIG. 40 is a sequence diagram showing a flow of processes by which device lists of a home controller and a server are updated according to an embodiment of the present disclosure.

FIG. 40 is a sequence diagram showing yet another example of processes by which the home controller 100 and the server 300 update device lists. In FIG. 40, a description will be given using a case where the owner possesses two home controllers 100 including a home controller 100 inside the home and a home controller 100 outside of the home. In this case, the home controller 100 outside of the home is a home controller 100 that has been carried outside of the home by the user and the home controller 100 inside the home is a home controller 100 that has been left inside the home by the user.

The device 200 transmits a device state to the home controller 100 inside the home (S5101). The home controller 100 inside the home updates the device list 1700 according to contents of the received device state (S5102). At this point, if the information on the device 200 does not exist in the device list 1700, the device management section 105 adds the information on the device 200 as a new device. Subsequently, the display control section 103 of the home controller 100 inside the home updates the display screen (S5103). In addition, the home controller 100 inside the home transmits a device list update notification to the server 300 (S5104).

The server 300 updates the device list 1600 according to contents of the received device list update notification (S5105). At this point, if information on the device 200 does not exist in the device list 1600, the server 300 adds the information on the device 200 as a new device. Subsequently, the server 300 transmits a device list update notification to the home controller 100 outside of the home (S5106).

The home controller 100 outside of the home updates the device list 1700 according to contents of the received device list update notification (S5107). At this point, if the information on the device 200 does not exist in the device list 1700, the device management section 105 of the home controller 100 outside of the home adds the information on the device 200 as a new device. Subsequently, the display control section 103 of the home controller 100 outside of the home updates the display screen (S5108).

According to this example, even when one of the home controllers 100 is located outside of the home and the other home controller 100 is located inside the home, an occurrence of a deviation between states of the device 200 as recognized by both home controllers 100 can be prevented.

It should be noted that the sequences and process flows described above are merely examples, and sequences of steps may be rearranged or a part of the steps may be omitted as long as desired processes can be realized. For example, transmissions of control commands to the device A 200 and the device B 200 may be realized in an asynchronous manner.

Figure 41:
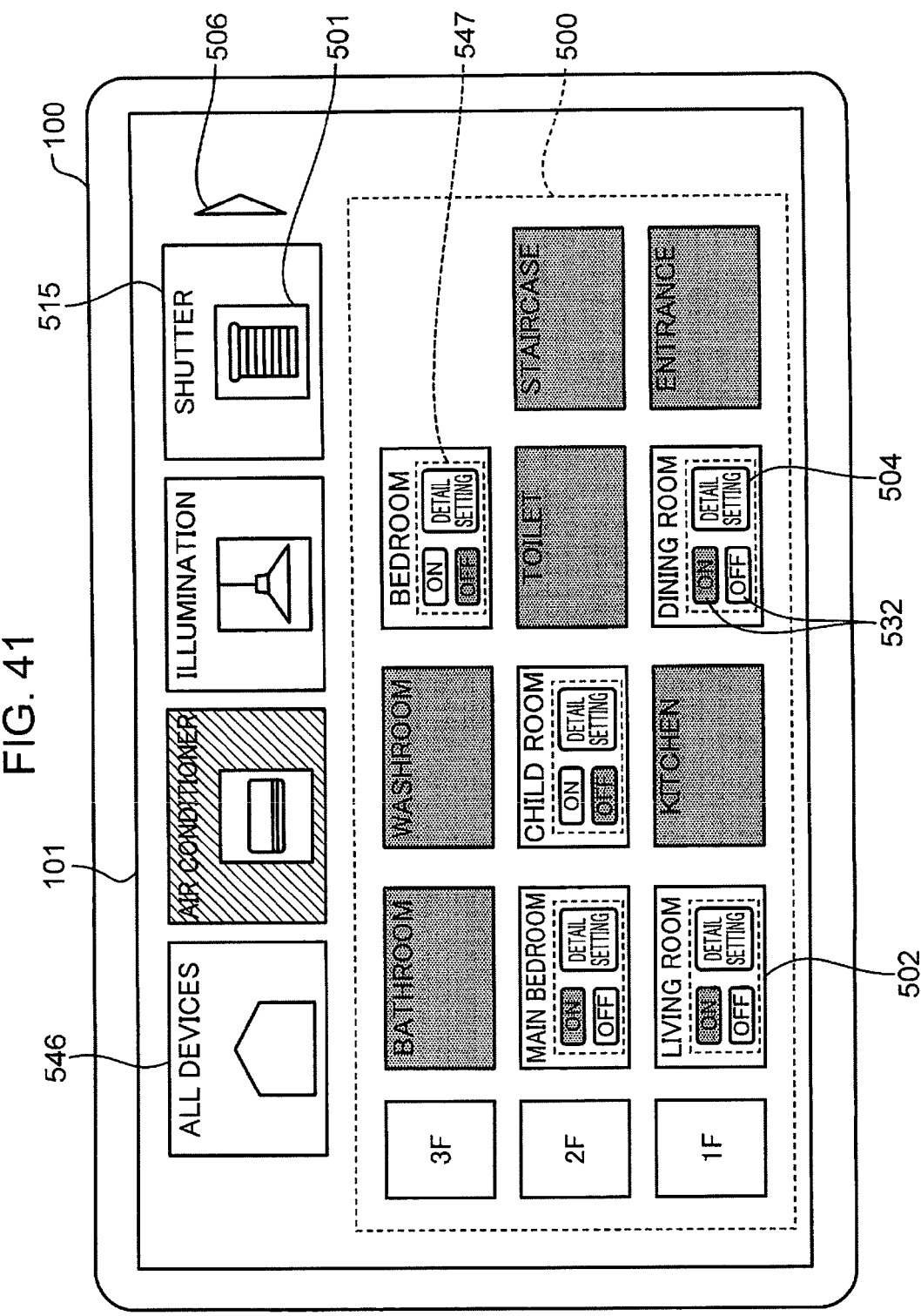
FIG. 41 is a diagram showing another example of a display screen (FIG. 6A) on a display when a device type icon is selected on a basic screen according to an embodiment of the present disclosure.
Figure 42:
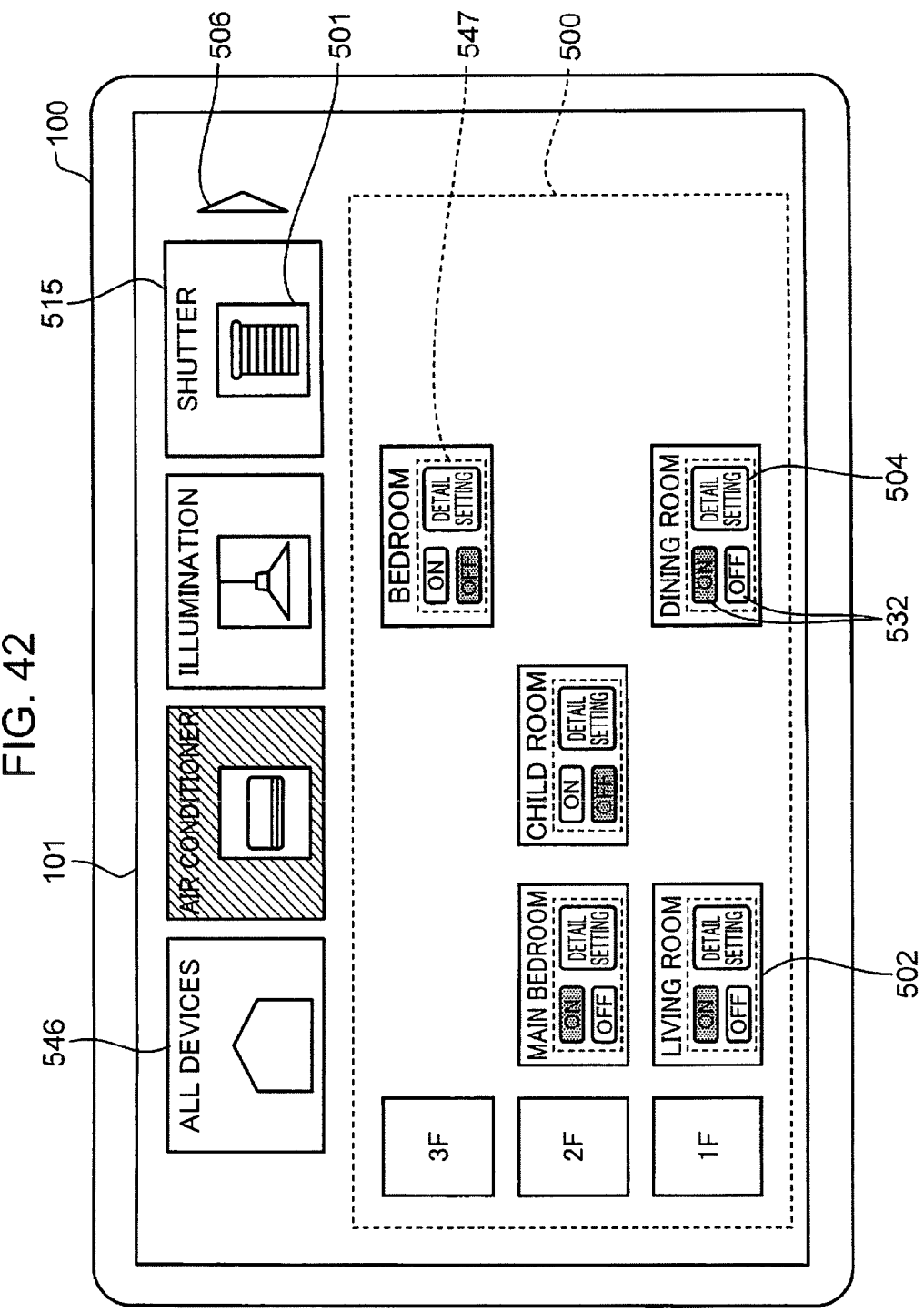
FIG. 42 is a diagram showing another example of a display screen (FIG. 6B) on a display when a device type icon is selected on a basic screen according to an embodiment of the present disclosure.
Figure 43:
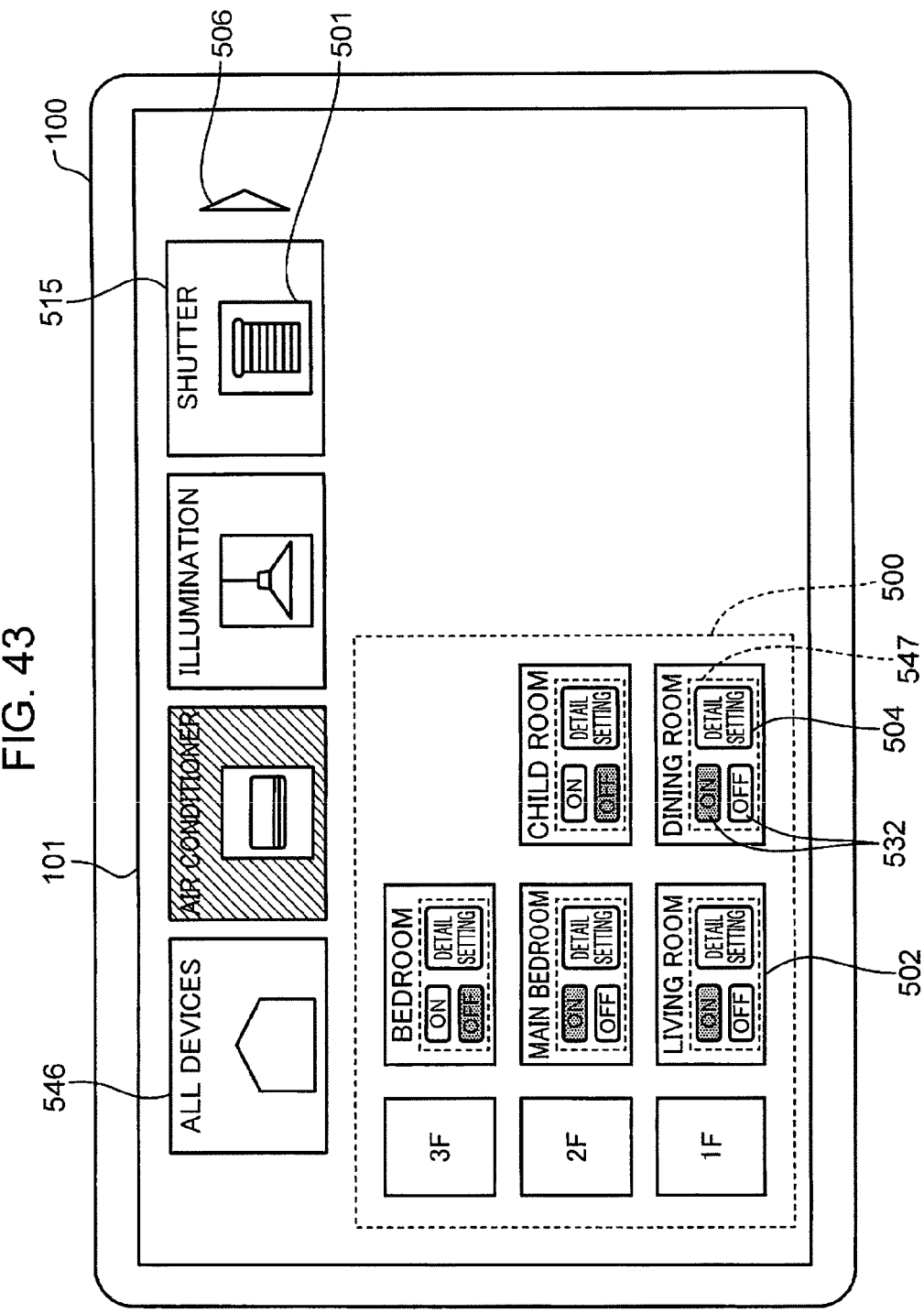
FIG. 43 is a diagram showing another example of a display screen (FIG. 6C) on a display when a device type icon is selected on a basic screen according to an embodiment of the present disclosure.

FIG. 41 is a diagram showing another example of a display screen (FIG. 6A) on the display 101 when the device type icon 515 is selected on the basic screen. FIG. 42 is a diagram showing another example of a display screen (FIG. 6B) on the display 101 when the device type icon 515 is selected on the basic screen. FIG. 43 is a diagram showing another example of a display screen (FIG. 6C) on the display 101 when the device type icon 515 is selected on the basic screen.

When the user selects the device type icon 515 on the basic screen (FIG. 5), the touch panel control section 102 detects the selection thereof. As a result, as shown in FIGS. 41 to 43, the display control section 103 displays an operation screen 547 (an example of the first operation screen) in the room icon 502 representing a room in which the device 200 (in this case, an air conditioner) of a type corresponding to the selected device type icon 515 is installed. The operation screen 547 includes the device type collective control button 532 (an example of a power supply button) and the detail setting button 504. The device type collective control button 532 includes an "on" button and an "off" button. The device type collective control button 532 is the same as the device type collective control button 532 included in the operation screen 543 (FIG. 8).

In a state where the operation screen 547 is displayed in the room icon 502 on the display 101 as shown in FIGS. 41 to 43, for example, when the user selects the "off" button of the device type collective control button 532 included in the room icon 502 representing the living room, the touch panel control section 102 detects the selection thereof.

As a result, the device control section 106 generates a control command (an example of the first control command) for turning off the power supplies of all of the air conditioners in the room (the living room in FIG. 41). In addition, the device control section 106 transmits the generated control command to all of the air conditioners in the living room via the communication control section 107 and the network. The display control section 103 restores the color of the "on" button of the device type collective control button 532 of the operation screen 547 included in the room icon 502 representing the living room to a default color and changes the color of the "off" button.

In a state where the operation screen 547 is displayed in the room icon 502 on the display 101 as shown in FIGS. 41 to 43, when the user selects the detail setting button 504 (an example of the operation button), the touch panel control section 102 detects the selection thereof. As a result, the display control section 103 displays the room screen 540 including the detail control screen 522 (an example of the second operation screen) on the display 101 (to be described later with reference to FIG. 45).

Figure 44:
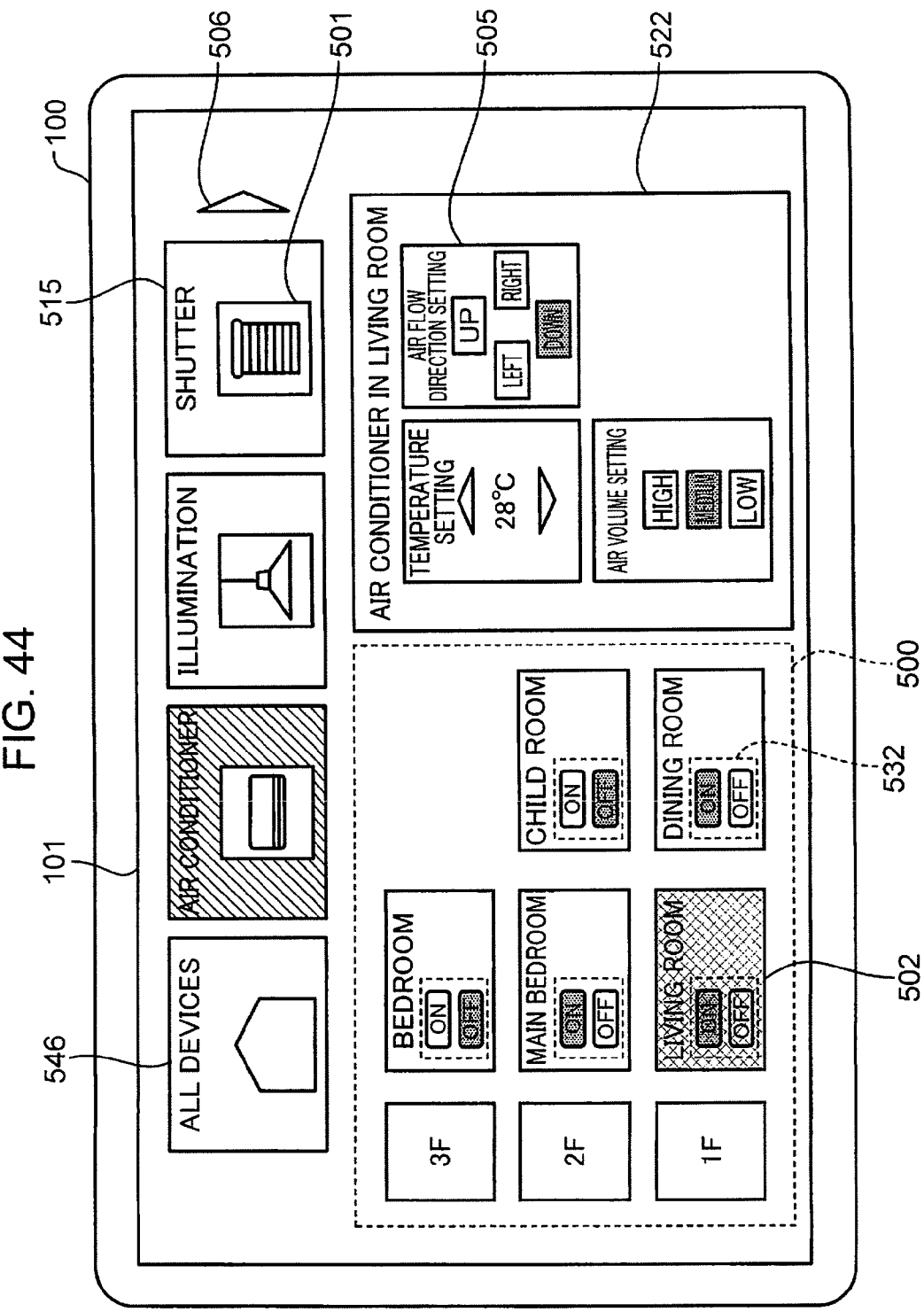
FIG. 44 is a diagram showing another example of a display screen shown in FIG. 7 according to an embodiment of the present disclosure.

FIG. 44 is a diagram showing another example of the display screen shown in FIG. 7. In FIG. 44, the room icon 502 representing a room in which the device 200 corresponding to the selected device type icon 515 is installed includes the device type collective control button 532. Therefore, when collectively controlling power supplies of devices 200 of the same type which are installed in the room, the device type collective control button 532 may be selected. In addition, when controlling detailed settings of the device 200, the detail control screen 522 may be operated.

Figure 45:
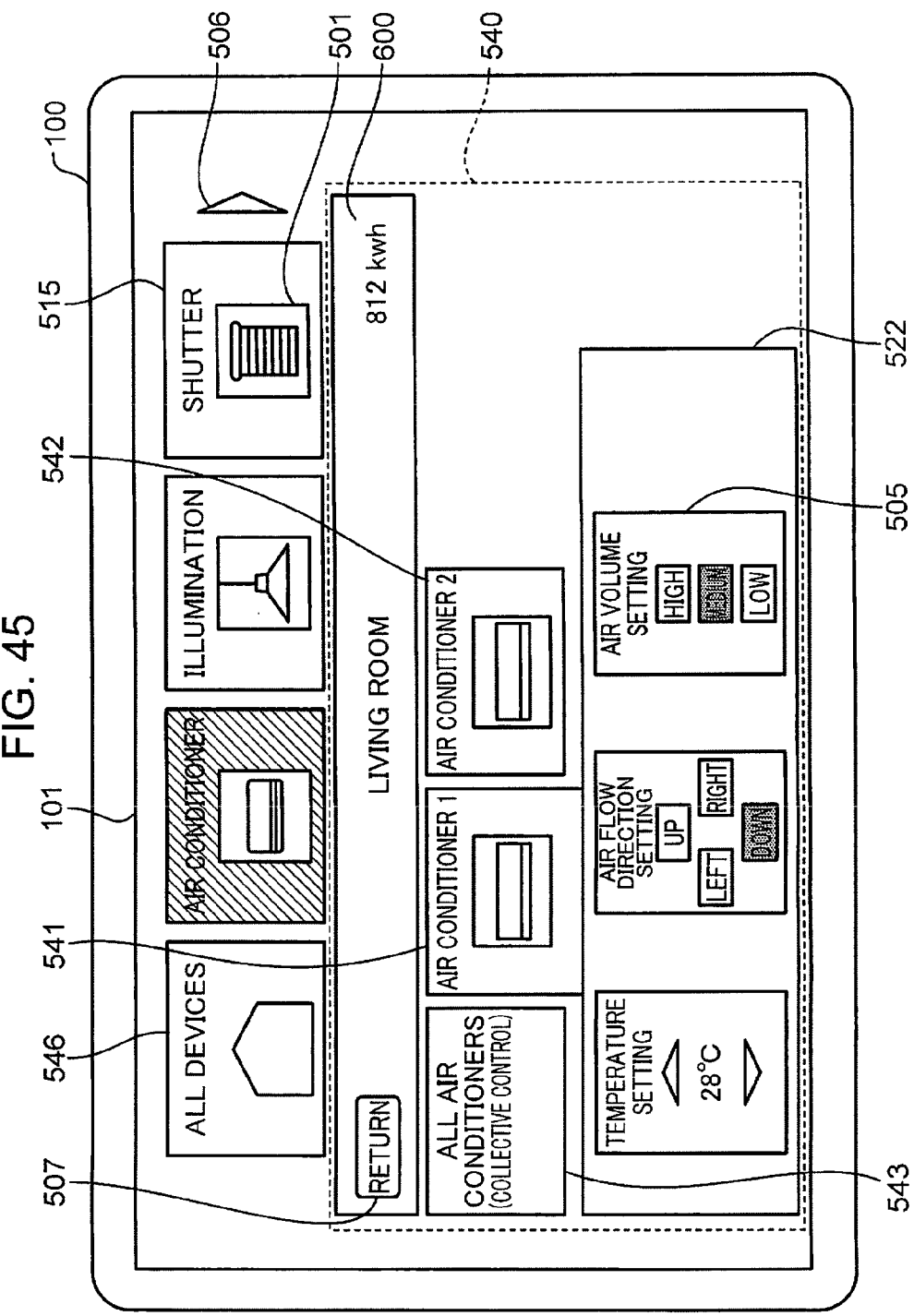
FIG. 45 is a diagram showing a room screen that is displayed on a display when a detail setting button of an operation screen is selected in FIGS. 41 to 43 according to an embodiment of the present disclosure.

FIG. 45 is a diagram showing the room screen 540 that is displayed on the display 101 when the detail setting button 504 of the operation screen 547 is selected in FIGS. 41 to 43. In a similar manner to the room screen 540 shown in FIG. 9, the room screen 540 shown in FIG. 45 includes the display field 600, the return button 507, the operation screens 541, 542, and 543, and the detail control screen 522. The detail control screen 522 shown in FIG. 45 includes the detail control button 505. Unlike the detail control screen 522 shown in FIG. 9, the detail control screen 522 shown in FIG. 45 does not include a close button.

In FIG. 45, for example, when the user selects an upward arrow button of the detail control button 505 for setting temperature, the touch panel control section 102 detects the selection thereof. As a result, the device control section 106 generates a control command (an example of the second control command) for raising the temperature setting by 1° C. The device control section 106 transmits the generated control command to the first air conditioner in the living room via the communication control section 107 and the network. The display control section 103 changes a display temperature of the detail control button 505 for temperature setting to 29° C.

Figure 46:
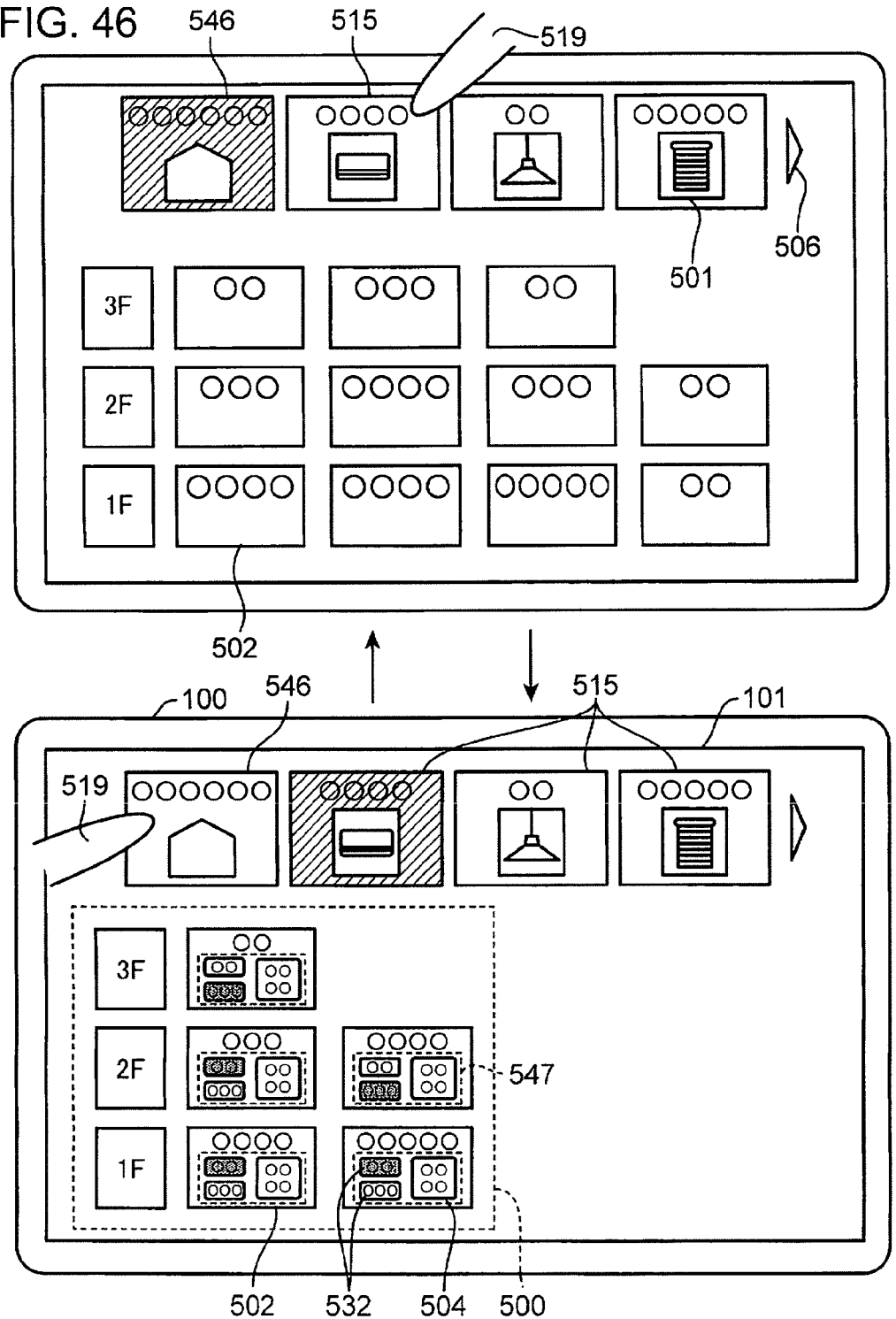
FIG. 46 is a diagram showing an example of transition of display screens on a display including the display screens shown in FIGS. 43 and 45 according to an embodiment of the present disclosure.
Figure 47:
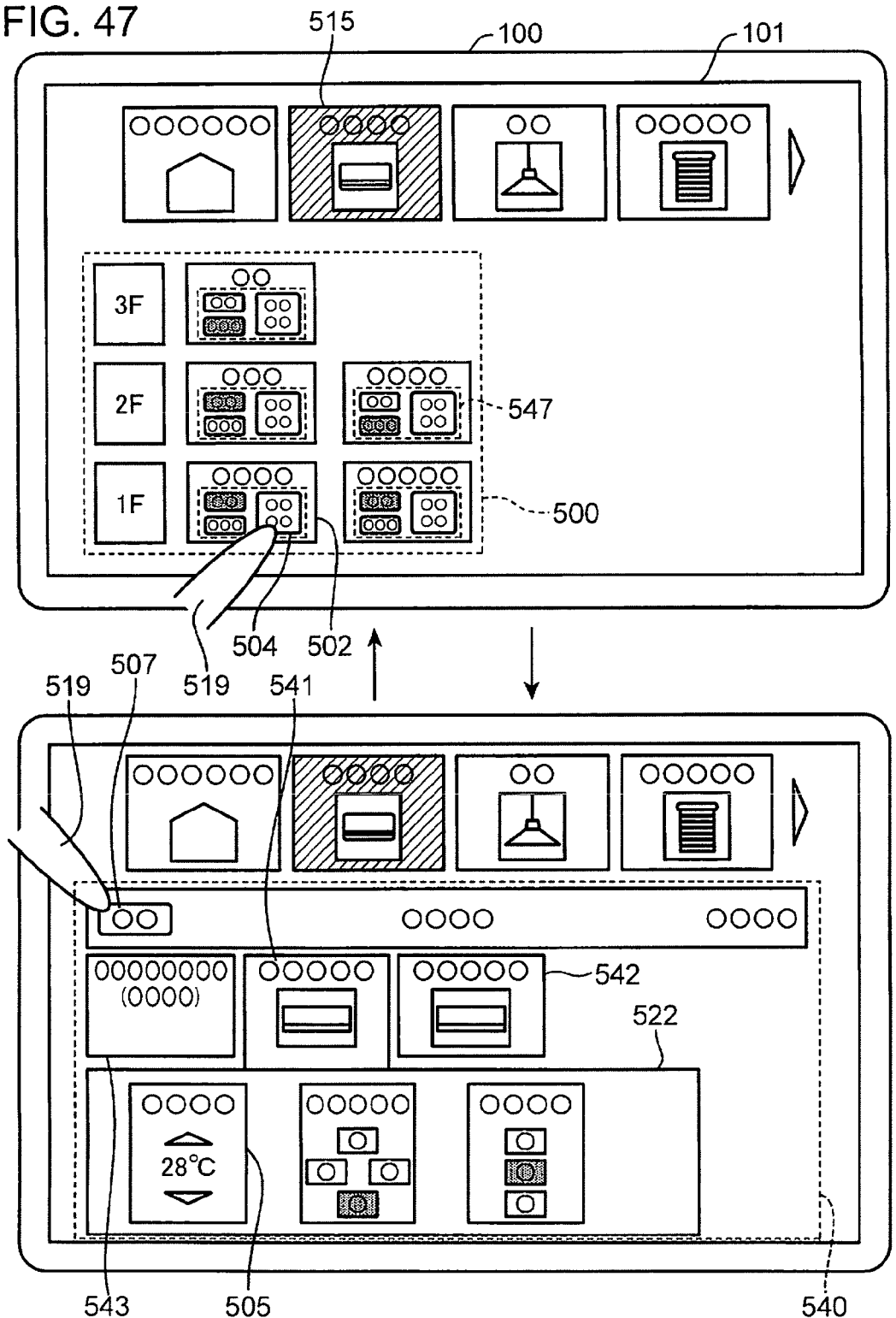
FIG. 47 is a diagram showing an example of transition of display screens on a display including the display screens shown in FIGS. 43 and 45 according to an embodiment of the present disclosure.

FIGS. 46 to 48 are diagrams showing examples of transition of a display screen on the display 101 including the display screens shown in FIGS. 43 and 45. An upper diagram in FIG. 46 shows the basic screen shown in FIG. 5 and a lower diagram in FIG. 46 shows the display screen shown in FIG. 43. An upper diagram in FIG. 47 shows the display screen shown in FIG. 43 and a lower diagram in FIG. 47 shows the display screen shown in FIG. 45.

An upper left diagram in FIG. 48 shows the basic screen shown in FIG. 5, an upper right diagram in FIG. 48 shows the display screen shown in FIG. 43, a lower right diagram in FIG. 48 shows the display screen shown in FIG. 45, and a lower left diagram in FIG. 48 shows the display screen shown in the lower left diagram in FIG. 14 (FIG. 10). The transition of display screens between the upper left diagram and the lower left diagram in FIG. 48 is performed in a similar manner to the transition of display screens between the upper left diagram in FIG. 14 (FIG. 5) and the lower left diagram in FIG. 14 (FIG. 10).

On the basic screen shown in the upper diagram in FIG. 46 (the upper left diagram in FIG. 48, FIG. 5), when the user brings the contacting object 519 into contact with the device type icon 515 (in this case, the device type icon 515 representing an air conditioner) which represents a type of the device 200 to be controlled, the contact is detected by the touch panel control section 102. As a result, for example, the display control section 103 changes the color of the contacted device type icon 515 as shown in the lower diagram in FIG. 46 (the upper right diagram in FIG. 48, FIG. 43).

The display control section 103 erases the room icon 502 representing a room in which the device 200 corresponding to the contacted device type icon 515 is not installed from the display 101. The display control section 103 reduces the floor plan 500 by rearranging the room icons 502 representing rooms in which the device 200 corresponding to the contacted device type icon 515 are installed so as to reduce spacing between the room icons 502. The display control section 103 displays the operation screen 547 in the room icon 502. Accordingly, the display state of the basic screen makes a transition to a display state at the time of selection of the device type icon 515 on the basic screen.

On the other hand, when the user brings the contacting object 519 into contact with the all-types icon 546 in the display state shown in the lower diagram in FIG. 46 (the upper right diagram in FIG. 48), the contact is detected by the touch panel control section 102. As a result, for example, the display control section 103 displays the all-types icon 546 in a different color and restores the color of the device type icon 515 of air conditioners to a default color as shown in the upper diagram in FIG. 46 (the upper left diagram in FIG. 48). The display control section 103 restores the display state of the room icon 502 to the original state. Accordingly, the display state at the time of selection of the device type icon 515 on the basic screen makes a transition to a display state of the basic screen.

Next, when the user brings the contacting object 519 into contact with the detail setting button 504 of the room icon 502 representing the living room in the display state shown in the upper diagram in FIG. 47 (the upper right diagram in FIG. 48, FIG. 43), the contact is detected by the touch panel control section 102. As a result, as shown in the lower diagram in FIG. 47 (the lower right diagram in FIG. 48, FIG. 45), the display control section 103 displays the room screen 540 including the operation screens 541, 542, and 543 of all air conditioners installed in the living room and the detail control screen 522 of the first air conditioner on the display 101. Accordingly, the display state at the time of selection of the device type icon 515 on the basic screen makes a transition to a display state of the room screen 540.

On the other hand, when the user brings the contacting object 519 into contact with the return button 507 of the room screen 540 in the display state of the room screen 540 shown in the lower diagram in FIG. 47 (the lower right diagram in FIG. 48), the contact is detected by the touch panel control section 102. As a result, as shown in the upper diagram in FIG. 47 (the upper right diagram in FIG. 48), the display control section 103 displays the display state at the time of selection of the device type icon 515 on the basic screen on the display 101. Accordingly, the display state of the room screen 540 makes a transition to a display state at the time of selection of the device type icon 515 on the basic screen.

Figure 49:
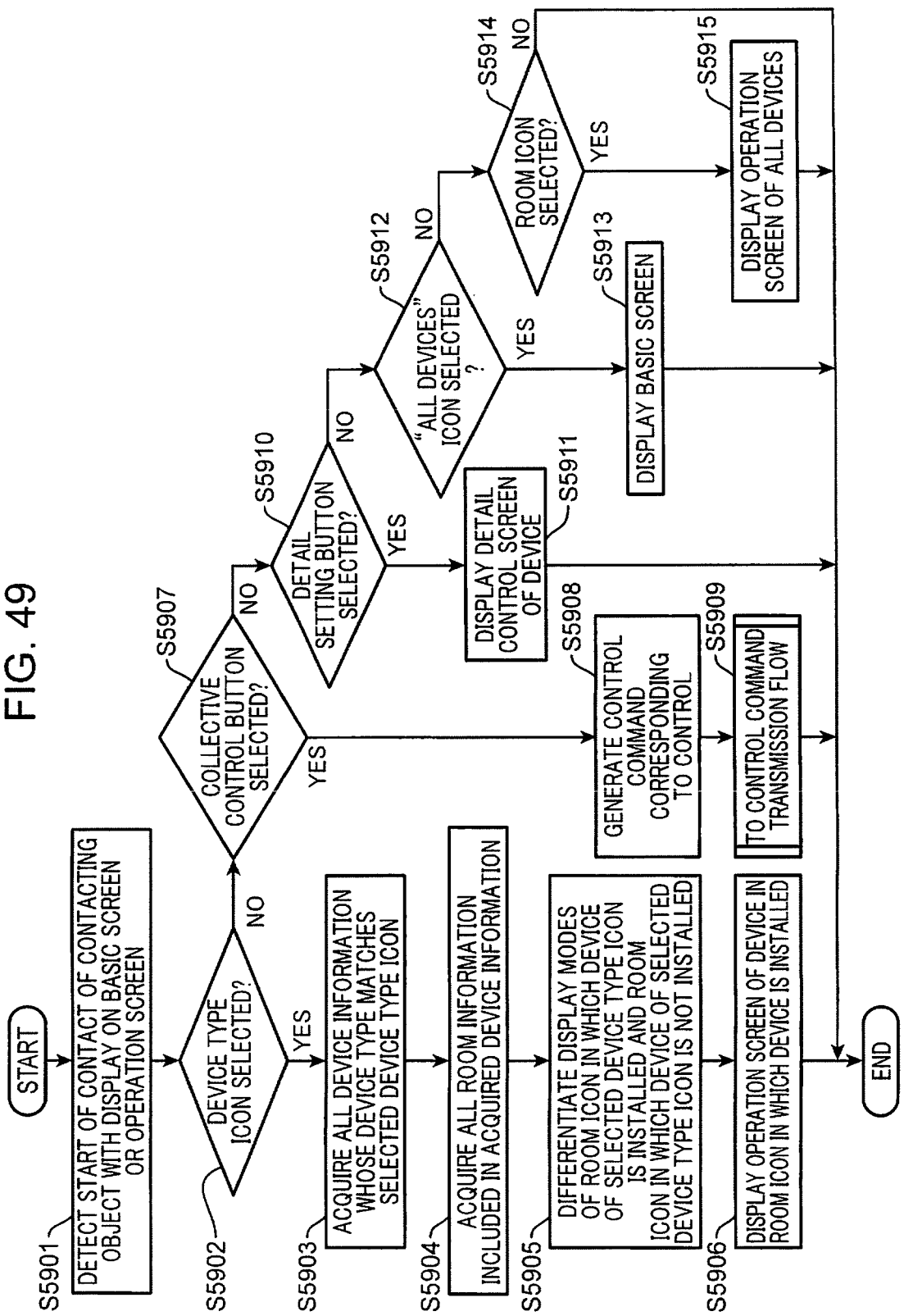
FIG. 49 is a flow chart showing a flow of processes by which a home controller controls a device when a basic screen (FIG. 5) or a room icon (FIG. 41, 42, or 43) including an operation screen is displayed on a display according to an embodiment of the present disclosure.

FIG. 49 is a flow chart showing a flow of processes by which the home controller 100 controls the device 200 when the basic screen (FIG. 5) or the room icon 502 (FIG. 41, 42, or 43) including the operation screen 547 is displayed on the display 101 according to an embodiment of the present disclosure.

First, on the basic screen or the operation screen 547, the touch panel control section 102 detects a start of contact of a contacting object with the display 101 by the user (S5901). S5902 to S5905 subsequent thereto are the same as S5702 to S5705 in FIG. 29. Following S5905, the display control section 103 displays the operation screen 547 of the device 200 in the room icon 502 representing a room in which the device 200 corresponding to the device type icon 515 selected in S5902 (S5906). Subsequently, the process ends.

On the other hand, in S5902, when the user has not selected the device type icon 515 (NO in S5902), the touch panel control section 102 determines whether or not the user has selected the device type collective control button 532 of the operation screen 547 (S5907). When the user has selected the device type collective control button 532 (YES in S5907), the device control section 106 generates a control command corresponding to control of the selected device type collective control button 532 (S5908). Next, the device control section 106 executes the control command transmission flow (S5909) described earlier with reference to FIG. 31. Subsequently, the process ends.

On the other hand, in S5907, when the user has not selected the device type collective control button 532 of the operation screen 547 (NO in S5907), the touch panel control section 102 determines whether or not the user has selected the detail setting button 504 of the operation screen 547 (S5910). When the user has selected the detail setting button 504 (YES in S5910), the display control section 103 displays the detail control screen 522 in the room screen 540 on the display 101 (S5911). Subsequently, the process ends.

On the other hand, in S5910, when the user has not selected the detail setting button 504 of the operation screen 547 (NO in S5910), the touch panel control section 102 determines whether or not the user has selected the all-types icon 546 (S5912). When the user has selected the all-types icon 546 (YES in S5912), the display control section 103 displays the basic screen (FIG. 5) on the display 101 (S5913). Subsequently, the process ends.

On the other hand, in S5912, when the user has not selected the all-types icon 546 (NO in S5912), the touch panel control section 102 determines whether or not the user has selected the room icon 502 (S5914). When the user has selected the room icon 502 (YES in S5914), the display control section 103 displays on the display 101 operation screens of all devices that are installed in a room corresponding to the selected room icon 502 (S5915). Subsequently, the process ends. On the other hand, in S5914, when the user has not selected the room icon 502 (NO in S5914), the process ends. Due to S5915, for example, operation screens 541, 542, 544, and 545 (FIG. 10) are displayed on the display 101.

Figure 50:
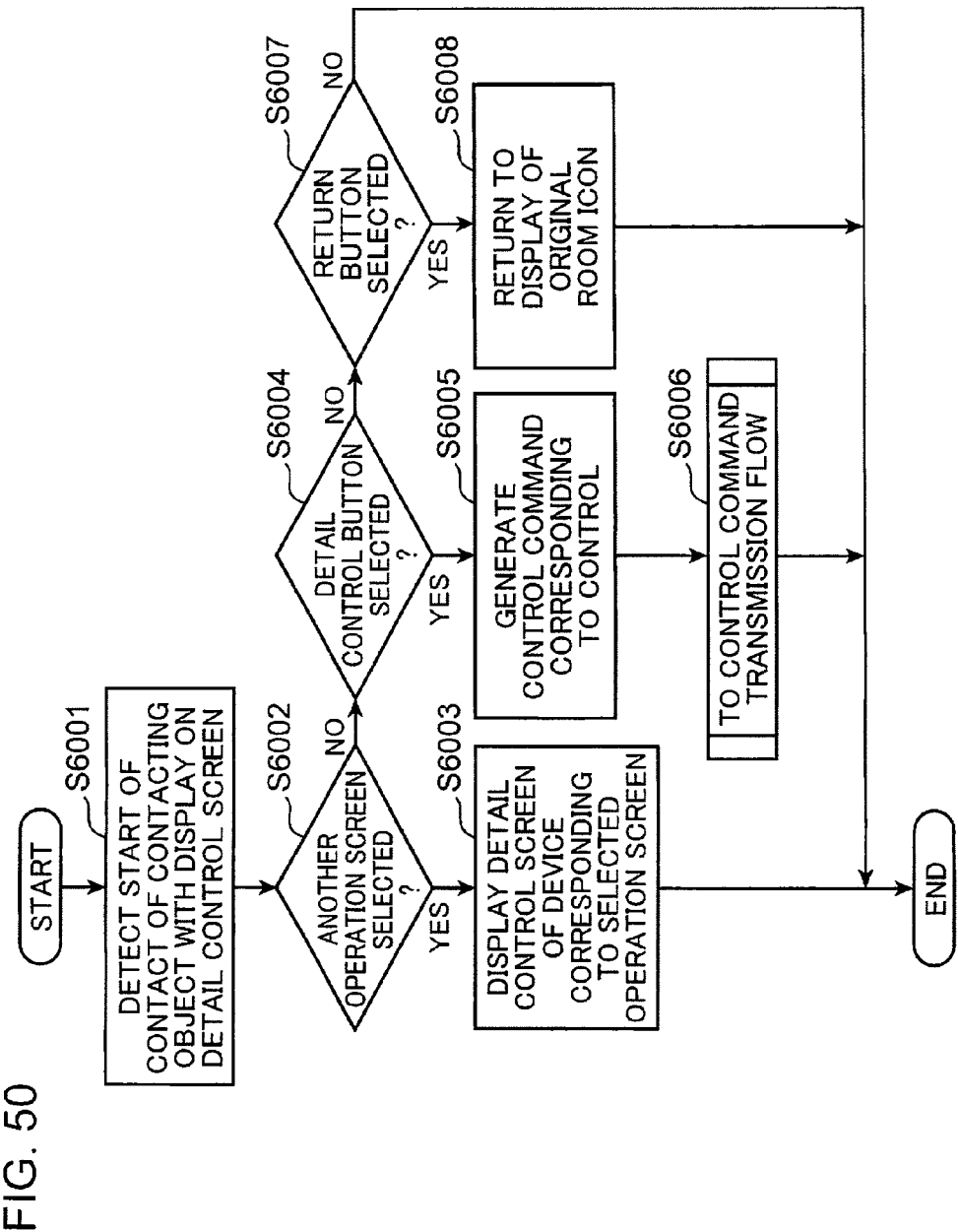
FIG. 50 is a flow chart showing a flow of processes by which a home controller controls a device when a room screen (FIG. 45) including a detail control screen is displayed on a display according to an embodiment of the present disclosure.

FIG. 50 is a flow chart showing a flow of processes by which the home controller 100 controls the device 200 when the room screen 540 (FIG. 45) including the detail control screen 522 is displayed on the display 101 according to an embodiment of the present disclosure.

First, on the detail control screen 522, the touch panel control section 102 detects a start of contact of the contacting object 519 with the display 101 by the user (S6001). Next, the touch panel control section 102 determines whether or not the user has selected another operation screen (an operation screen other than an operation screen corresponding to the displayed detail control screen 522 among the operation screens 541, 542, and 543) (S6002). When the user has selected another operation screen (YES in S6002), the display control section 103 displays the detail control screen 522 of the device 200 corresponding to the selected operation screen on the display 101 in place of the displayed detail control screen 522 (S6003). Subsequently, the process ends. In S6003, for example, when the user selects the operation screen 542 of the second air conditioner in FIG. 45 (the lower right diagram in FIG. 48), the display control section 103 displays the detail control screen 522 of the second air conditioner on the display 101 in place of the detail control screen 522 of the first air conditioner.

On the other hand, in S6002, when the user has not selected another operation screen (NO in S6002), the touch panel control section 102 determines whether or not the user has selected the detail control button 505 of the detail control screen 522 (S6004). S6004 to S6006 are the same as S5804 to S5806 in FIG. 30.

In S6004, when the user has not selected the detail control button 505 (NO in S6004), the touch panel control section 102 determines whether or not the user has selected the return button 507 of the room screen 540 (S6007). When the user has selected the return button 507 (YES in S6007), the display control section 103 displays the original room icon 502 (FIG. 41, 42, or 43) on the display 101 (S6008). Subsequently, the process ends. On the other hand, in S6007, when the user has not selected the return button 507 (NO in S6007), the process ends.

Figure 51:
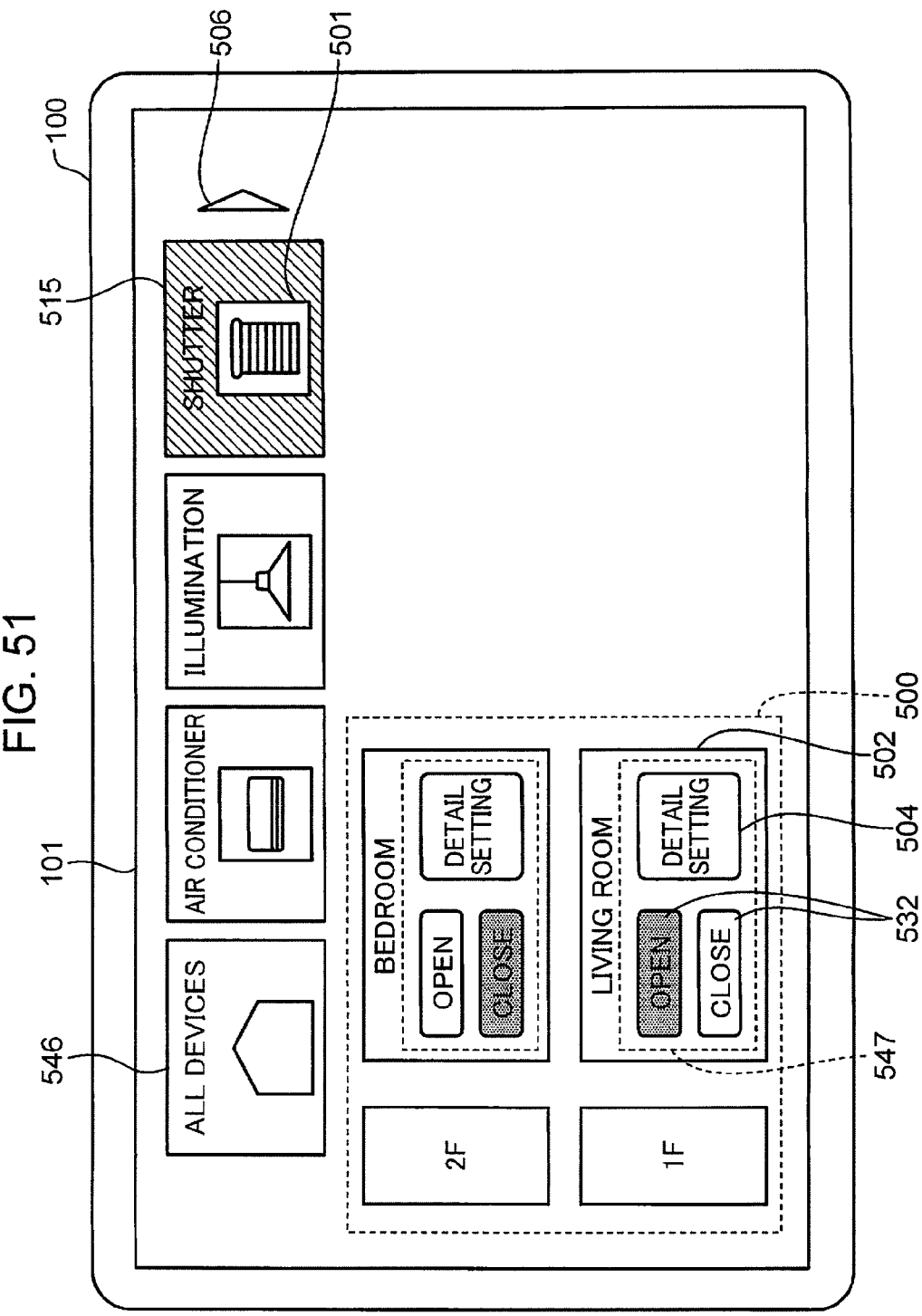
FIG. 51 is a diagram showing yet another example of a display screen (FIG. 6C) on a display when a device type icon is selected on a basic screen according to an embodiment of the present disclosure.

FIG. 51 is a diagram showing yet another example of a display screen (FIG. 6C) of the display 101 when the device type icon 515 is selected on the basic screen.

When the user selects the device type icon 515 of an electric shutter apparatus on the basic screen shown in FIG. 5, the touch panel control section 102 detects the selection thereof. As a result, as shown in FIG. 51, the display control section 103 displays the device type icon 515 of an electric shutter apparatus in, for example, a different color.

The display control section 103 rearranges and displays room icons 502 representing the bedroom and the living room in which an electric shutter apparatus that electrically opens and closes shutters is installed on the display 101. The display control section 103 erases room icons representing other rooms in which an electric shutter apparatus is not installed from the display 101.

In FIG. 51, in a similar manner to FIG. 43, the display control section 103 displays the operation screen 547 (an example of the first operation screen) in the room icon 502 representing a room in which the device 200 (an electric shutter apparatus in FIG. 51) of a type corresponding to the selected device type icon 515 is installed. The operation screen 547 includes a device type collective control button 532 and a detail setting button 504.

Since the device 200 is an electric shutter apparatus, the device type collective control button 532 shown in FIG. 51 is used to open and close a shutter. The device type collective control button 532 includes an "open" button and a "close" button. FIG. 51 shows a state where the shutter of the bedroom has been closed and the shutter of the living room has been opened by the display control section 103.

In FIG. 51, for example, when the user selects the "close" button of the device type collective control button 532 of the living room, the touch panel control section 102 detects the selection thereof. As a result, the device control section 106 generates a control command (an example of the first control command) for closing the shutter of the living room. The device control section 106 transmits the generated control command to an electric shutter apparatus 20B in the living room via the communication control section 107 and the network.

In this case, when a plurality of electric shutter apparatuses 20B are installed in the living room, the device control section 106 transmits the control command to all of the electric shutter apparatuses 20B. In addition, the display control section 103 restores the "open" button of the device type collective control button 532 of the room icon 502 of the living room to a default color and changes the color of the "close" button.

As shown in FIGS. 41 to 43 and 51, in the present embodiment, the device type collective control button 532 respectively includes buttons suitable for the devices 200. In other words, the device type collective control button 532 includes an "on" button and an "off" button in the case of the air conditioner 201 shown in FIGS. 41 to 43 and an "open" button and a "close" button in the case of the electric shutter apparatus 20B shown in FIG. 51. For example, when the device 200 is an electronic lock 20A, the device type collective control button 532 may be configured so as to include an "open" button and a "close" button in a similar manner to the electric shutter apparatus 20B. For example, when the device 200 is an electric rolling screen apparatus or an electric blind apparatus that is a type of the electric curtain apparatus 208, the device type collective control button 532 may be configured so as to include a "raise" button and a "lower" button.

Figure 52:
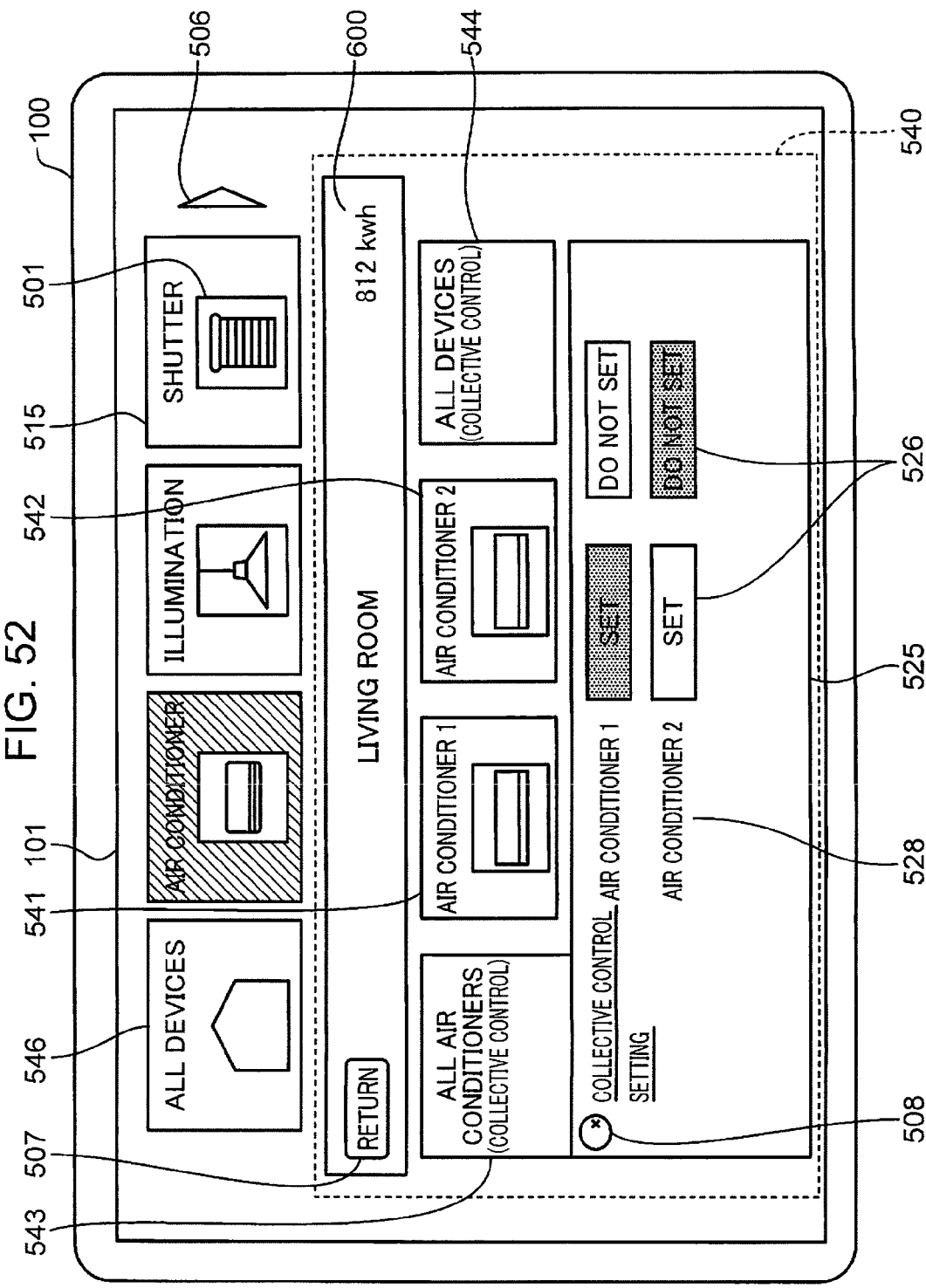
FIG. 52 is a diagram showing another example of a collective control setting screen that is displayed on a display of a home controller according to an embodiment of the present disclosure.

FIG. 52 is a diagram showing another example of the collective control setting screen 525 displayed on the display 101 of the home controller 100.

When the user selects the collective control setting button 533 of the operation screen 543 of all air conditioners in a state where the room screen 540 is displayed as shown in FIG. 18, the touch panel control section 102 detects the selection thereof. As a result, the display control section 103 displays the collective control setting screen 525 shown in FIG. 52 on the display 101 so as to overlap with lower half portions of the operation screens 541 to 544.

The collective control setting screen 525 shown in FIG. 52 includes the close button 508, the setting button 526, and the device name 528. The setting button 526 includes a "set" button and a "do not set" button. The collective control setting screen 525 includes a description that reads "collective control setting" at a left end thereof and is configured so as to be clearly recognizable as the collective control setting screen 525.

The device name 528 is described to the right of where the description reading "collective control setting" is located. As the device name 528, in the example shown in FIG. 52, "air conditioner 1" that represents the first air conditioner is described in a first row and "air conditioner 2" that represents the second air conditioner is described in a second row. The setting button 526 is arranged in correspondence with each of the device names 528.

As shown in FIG. 52, the display control section 103 displays the collective control setting screen 525 and the operation screen 543 of all air conditioners so as to come into contact with each other. In addition, the display control section 103 displays the collective control setting screen 525 and the respective operation screens 541, 542, and 544 so as to be separated from one another. Due to this display state, the user can readily understand that the collective control setting screen 525 shown in FIG. 52 is a screen that corresponds to the operation screen 543 of all air conditioners.

When the user selects, for example, the "do not set" button of the setting button 526 corresponding to the second air conditioner in a state where the collective control setting screen 525 is displayed, the touch panel control section 102 detects the selection thereof. As a result, the display control section 103 changes the color of the "do not set" button of the setting button 526 corresponding to the second air conditioner as shown in FIG. 52. In addition, the device control section 106 removes the second air conditioner from control targets of the device type collective control button 532 shown in FIG. 18.

Once the second air conditioner is removed from the control targets of the device type collective control button 532, even if the touch panel control section 102 detects selection of the "all off" button of the device type collective control button 532 by the user, the device control section 106 does not generate a control command for turning off the power supply of the second air conditioner. In a similar manner, even if the touch panel control section 102 detects selection of the "all on" button of the device type collective control button 532 by the user, the device control section 106 does not generate a control command for turning on the power supply of the second air conditioner.

Figure 53:
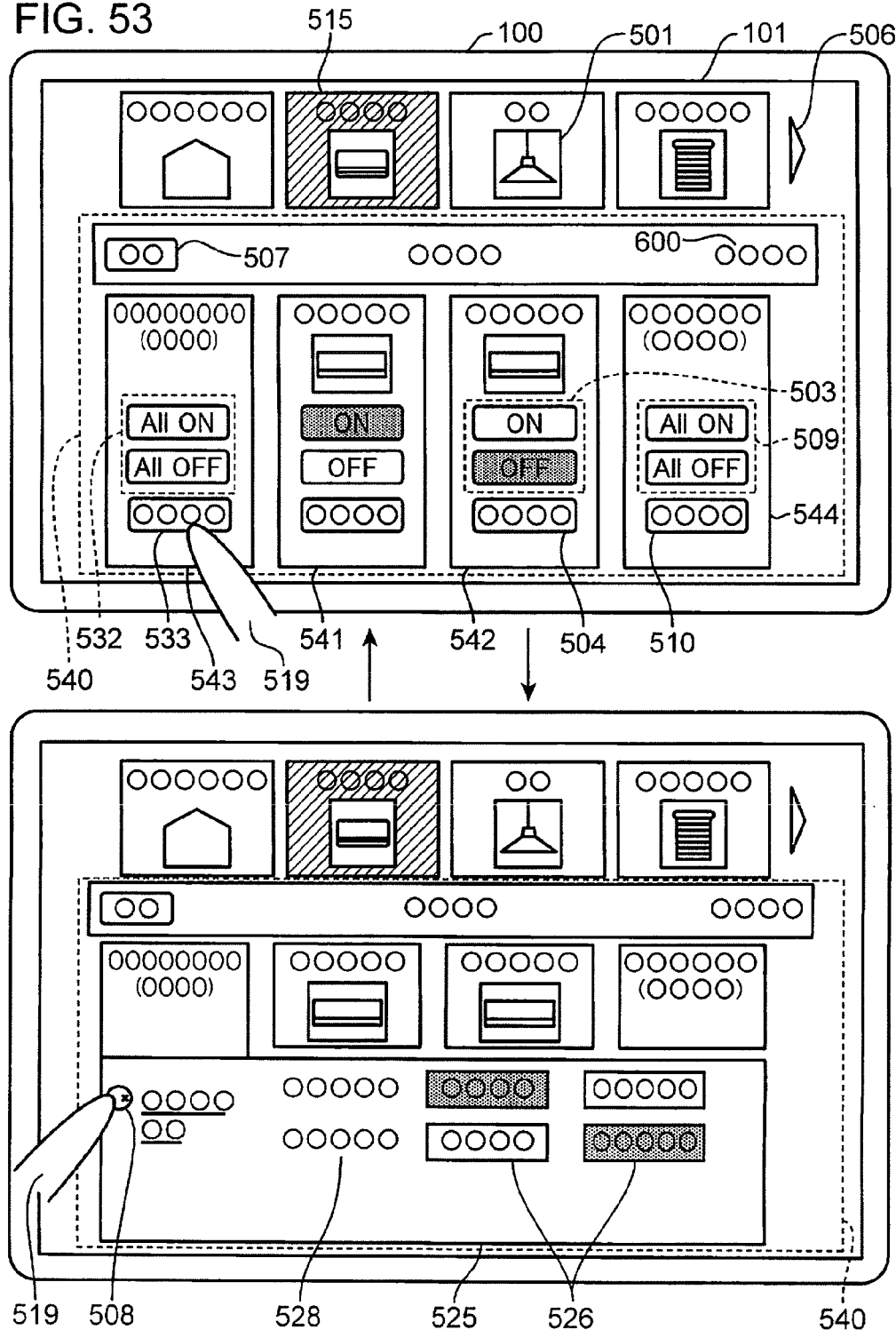
FIG. 53 is a diagram showing an example of transition of a display screen on a display including the collective control setting screen shown in FIG. 52 according to an embodiment of the present disclosure.

FIG. 53 is a diagram showing an example of transition of a display screen on the display 101 including the collective control setting screen 525 shown in FIG. 52. An upper diagram in FIG. 53 shows the display screen shown in FIG. 18 and a lower diagram in FIG. 53 shows the display screen shown in FIG. 52.

In the display state of the operation screens 541 to 544 shown in the upper diagram of FIG. 53 (FIG. 18), when the user brings the contacting object 519 into contact with the collective control setting button 533 of the operation screen 543 for all air conditioners, the touch panel control section 102 detects the contact thereof. As a result, as shown in the lower diagram in FIG. 53 (FIG. 52), the display control section 103 displays the collective control setting screen 525 on the display 101. Accordingly, the display state of the room screen 540 including the operation screens 541 to 544 makes a transition to the display state of the room screen 540 including the collective control setting screen 525.

On the other hand, when the user brings the contacting object 519 into contact with the close button 508 in the display state of the collective control setting screen 525 shown in the lower diagram in FIG. 53 (FIG. 52), the contact is detected by the touch panel control section 102. As a result, as shown in the upper diagram in FIG. 53 (FIG. 18), the display control section 103 displays the operation screens 541 to 544 on the display 101. Accordingly, the display state of the room screen 540 including the collective control setting screen 525 makes a transition to the display state of the room screen 540 including the operation screens 541 to 544.

INDUSTRIAL APPLICABILITY

The present disclosure is useful as a control method and a program of controlling one or more target devices connected to a network.

What is claimed is:

1. A method for controlling an information apparatus, the information apparatus having a display and being connected to a network, one or more target devices, which are installed in a building, being controlled over the network,
the method causing a computer of the information apparatus to:
display on the display one or more device type icons representing types of the respective target devices installed in the building;
display on the display one or more room icons representing each of rooms included in the building, the one or more room icons each being separately displayed and having a same shape;
when it is determined that selection of one of the device type icons among the one or more device type icons is detected, display a first group of one or more room icons each representing a room, in which a target device of a type corresponding to the selected device type icon is installed, and display a second group of one or more room icons each representing a room, in which the target device of the type corresponding to the selected device type icon is not installed, wherein the first group of the one or more room icons is displayed brighter than the second group of one or more room icons;
when it is determined that selection of one of the room icons among the first group of the one or more room icons is detected, display on the display a first operation screen for operating a controlled target device, the controlled target device being installed in a room corresponding to the selected room icon, the type of the controlled target device corresponding to the selected device type icon; and
output a control command for controlling the controlled target device to the network based on an operation on the first operation screen,
wherein, when it is determined that the selection of the one of the room icons among the first group of the one or more room icons is detected, a collective operation screen is displayed alongside the first operation screen on the display, the collective operation screen being used for collectively controlling power supplies of target devices of all types that are installed in the room corresponding to the selected room icon.

2. A method for controlling an information apparatus, the information apparatus having a display and being connected to a network, one or more target devices, which are installed in a building, being controlled over the network,
the method causing a computer of the information apparatus to:
display on the display one or more device type icons representing types of the respective target devices installed in the building;
display on the display one or more room icons representing each of rooms included in the building, the one or more room icons each being separately displayed and having a same shape;
when it is determined that selection of one of the device type icons among the one or more device type icons is detected, display one or more room icons each representing a room, in which a target device of a type corresponding to the selected device type icon is installed, without displaying one or more room icons each representing a room, in which the target device of the type corresponding to the selected device type icon is not installed;

when it is determined that selection of one of the room icons among the one or more room icons is detected, display on the display a first operation screen for operating a controlled target device, the controlled target device being installed in a room corresponding to the selected room icon, the type of the controlled target device corresponding to the selected device type icon; and output a control command for controlling the controlled target device to the network based on an operation on the first operation screen, wherein, before it is determined that the selection of the one of the device type icons among the one or more device type icons is detected, all of the one or more room icons representing each of the rooms included in the building are displayed, and after it is determined that the selection of the one of the device type icons among the one or more device type icons is detected:

the one or more room icons each representing the room, in which the target device of the type corresponding to the selected device type icon is not installed, are caused to disappear;

the one or more room icons each representing the room, in which the target device of the type corresponding to the selected device type icon is installed, are rearranged to be displayed closely to each other using an area, in which the one or more room icons each representing the room, in which the target device of the type corresponding to the selected device type icon is not installed, are not displayed; and the first operation screen is displayed in a vacant area made available by displaying the one or more room icons closely to each other, the one or more room icons each representing the room in which the target device of the type corresponding to the selected device type icon is installed.

3. The method according to claim 1, wherein
an all-types icon for selecting all types of the respective target devices installed in the building is displayed on the display, and
when it is determined that selection of the all-types icon is detected, all of the one or more room icons respectively representing all of the rooms included in the building is displayed on the display.

4. The method according to claim 1, wherein the one or more room icons have a same size.

5. The method according to claim 1, wherein
the one or more room icons include an operation button for causing a second operation screen to be displayed, the second operation screen being used for operating instructions other than instructions operable by the first operation screen, and
when it is determined that selection of the operation button is detected, the second operation screen is displayed on the display.

6. A non-transitory computer-readable recording medium which stores a program for controlling an information apparatus, the information apparatus having a display and being connected to a network, one or more target devices, which are installed in a building, being controlled over the network, the program causing a computer of the information apparatus to:

display on the display one or more device type icons representing types of the respective target devices installed in the building;

display on the display one or more room icons representing each of rooms included in the building, the one or more room icons each being separately displayed and having a same shape;

when it is determined that selection of one of the device type icons among the one or more device type icons is detected, display a first group of one or more room icons each representing a room, in which a target device of a type corresponding to the selected device type icon is installed, and display a second group of one or more room icons each representing a room in which the target device of the type corresponding to the selected device type icon is not installed, wherein the first group of the one or more room icons is displayed brighter than the second group of one or more room icons;

when it is determined that selection of one of the room icons among the first group of the one or more room icons is detected, display on the display a first operation screen for operating a controlled target device, the controlled target device being installed in a room corresponding to the selected room icon, the type of the controlled target device corresponding to the selected device type icon; and output a control command for controlling the controlled target device to the network based on an operation on the first operation screen, wherein, when it is determined that the selection of the one of the room icons among the first group of the one or more room icons is detected, a collective operation screen is displayed alongside the first operation screen on the display, the collective operation screen being used for collectively controlling power supplies of target devices of all types that are installed in the room corresponding to the selected room icon.

* * * * *